(12) United States Patent
Wang

(10) Patent No.: US 12,526,401 B2
(45) Date of Patent: Jan. 13, 2026

(54) METHOD FOR VIDEO ENCODING/DECODING AND BITSTREAM TRANSMISSION

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/758,417

(22) Filed: Jun. 28, 2024

(65) Prior Publication Data
US 2024/0364864 A1 Oct. 31, 2024

Related U.S. Application Data

(63) Continuation of application No. PCT/CN2021/144008, filed on Dec. 31, 2021.

(51) Int. Cl.
H04N 19/105 (2014.01)
H04N 19/132 (2014.01)
(Continued)

(52) U.S. Cl.
CPC ......... *H04N 19/105* (2014.11); *H04N 19/132* (2014.11); *H04N 19/156* (2014.11);
(Continued)

(58) Field of Classification Search
CPC .. H04N 19/105; H04N 19/132; H04N 19/156; H04N 19/159; H04N 19/176;
(Continued)

(56) References Cited

U.S. PATENT DOCUMENTS 11,463,687 B2* 10/2022 Zhang .................. H04N 19/196
11,533,498 B2* 12/2022 Chen .................... H04N 19/137
(Continued)

FOREIGN PATENT DOCUMENTS

CN 111294590 A 6/2020
CN 111385569 A 7/2020
(Continued)

OTHER PUBLICATIONS

Jean Begaint et al., "Locally-weighted template-matching based prediction for cloud-based image compression", Data Compression Conference, DOI 10.1109/DCC.2016.72 @ 2016 IEEE (Year: 2016).*
(Continued)

*Primary Examiner* — Dramos Kalapodas
(74) *Attorney, Agent, or Firm* — Sheppard, Mullin, Richter & Hampton LLP

(57) ABSTRACT

Methods for video encoding/decoding and bitstream transmission are provided. A weight of a template is determined according to a weight derivation mode. At least one number of K prediction modes for a current block is determined. A prediction value is determined according to the K prediction modes and the weight derivation mode. That is, in the disclosure, a template is simulately partitioned according to the weight.

20 Claims, 16 Drawing Sheets

(51) Int. Cl.
  *H04N 19/156* (2014.01)
  *H04N 19/159* (2014.01)
  *H04N 19/176* (2014.01)
  *H04N 19/463* (2014.01)
  *H04N 19/50* (2014.01)
  *H04N 19/52* (2014.01)

(52) U.S. Cl.
  CPC ......... *H04N 19/159* (2014.11); *H04N 19/176* (2014.11); *H04N 19/463* (2014.11); *H04N 19/50* (2014.11); *H04N 19/52* (2014.11)

(58) Field of Classification Search
  CPC ...... H04N 19/463; H04N 19/50; H04N 19/52; H04N 19/00; H04N 19/11; H04N 19/593; H04N 19/70
  See application file for complete search history.

(56) References Cited

U.S. PATENT DOCUMENTS

| | | | | |
|---|---|---|---|---|
| 11,611,743 | B2* | 3/2023 | Zhang | H04N 19/137 |
| 11,876,973 | B2 | 1/2024 | Liao et al. | |
| 12,069,262 | B2* | 8/2024 | Zhang | H04N 19/105 |
| 12,225,187 | B2* | 2/2025 | Sun | H04N 19/137 |
| 12,301,792 | B2* | 5/2025 | Wang | H04N 19/176 |
| 12,316,867 | B2* | 5/2025 | Xiu | H04N 19/70 |
| 12,355,944 | B2 | 7/2025 | Wang | |
| 12,439,053 | B2 | 10/2025 | Liao et al. | |
| 2019/0215521 | A1* | 7/2019 | Chuang | H04N 19/105 |
| 2021/0092392 | A1* | 3/2021 | Reuze | G06F 1/03 |
| 2022/0329824 | A1* | 10/2022 | Liao | H04N 19/176 |
| 2023/0262223 | A1* | 8/2023 | Ghaznavi Youvalari | H04N 19/159 375/240.02 |
| 2023/0300326 | A1* | 9/2023 | Wang | H04N 19/107 |
| 2024/0007647 | A1* | 1/2024 | Liao | H04N 19/543 |

FOREIGN PATENT DOCUMENTS

| | | | | |
|---|---|---|---|---|
| CN | 111741297 | A | 10/2020 | |
| CN | 112055203 | A * | 12/2020 | ........... H04N 19/513 |
| CN | 113273188 | A | 8/2021 | |
| CN | 113497942 | A | 10/2021 | |
| CN | 113545074 | A | 10/2021 | |
| CN | 113766245 | A | 12/2021 | |
| WO | 2019198997 | A1 | 10/2019 | |
| WO | 2021244935 | A1 | 12/2021 | |

OTHER PUBLICATIONS

Qualcomm "EE2-related: Extension of template matching to Affine, CIIP, Gpm merge modes, and boundary sub-blocks" ISO/IEC JTC1/SC29/WG11 JVET-V0118, dated Apr. 22, 2021 (Year: 2021).*
WIPO, International Search Report for International Application No. PCT/CN2021/144008, Sep. 15, 2022. 15 pages with English translation.
WIPO, International Search Report for International Application No. PCT/CN2022/086453, Sep. 21, 2022. 14 pages with English translation.
British Broadcasting Corporation "Non-CE4: CIIP using triangular partitions" Joint Video Experts Team (JVET) of ITU-T SG 16 WP 3 and ISO/IEC JTC 1/SC 29/WG 11 JVET-O 0522, dated Jul. 3-12, 2019. 10 pages.
Qualcomm "EE2-related: Extension of template matching to Affine, CIIP, GPM merge modes, and boundary sub-blocks" ISO/IEC JTC1/SC29/WG11 JVET-V0118, dated Apr. 22, 2021. 7pages.
Non-final rejection issued in corresponding U.S. Appl. No. 18/757,492 dated Nov. 3, 2025. 21 pages.

* cited by examiner

METHOD FOR VIDEO ENCODING/DECODING AND BITSTREAM TRANSMISSION

CROSS-REFERENCE TO RELATED APPLICATION(S)

This application is a continuation of International Application No. PCT/CN2021/144008, filed Dec. 31, 2021, the entire disclosure of which is incorporated herein by reference.

TECHNICAL FIELD

This disclosure relates to the field of video coding technology, and more particularly, to a prediction method and apparatus, a device, a system, and a storage medium.

BACKGROUND

Digital video technology may be applied to various video apparatuses, such as digital televisions, smart phones, computers, electronic readers, or video players, etc. With development of video technology, the data amount in video data is large. In order to facilitate transmission of video data, the video apparatus implements video compression technology, so that video data can be transmitted or stored more efficiently.

There is temporal redundancy or spatial redundancy in a video, and redundancy in the video can be eliminated or reduced through prediction, thereby improving compression efficiency. During prediction, a prediction mode is firstly determined, for example, a first prediction mode and a second prediction mode for a current block are determined through template matching. However, at present, template partitioning is not fine enough, and as a result, when determining the first prediction mode and the second prediction mode according to the template, the prediction modes determined are inaccurate, which leads to poor compression effect.

SUMMARY

In a first aspect, a prediction method is provided in the disclosure. The method is applied to a decoder. The method includes the following. A bitstream is decoded to determine a weight derivation mode for a current block. A weight of a template is determined according to the weight derivation mode. At least one of K prediction modes for the current block is determined according to the weight of the template, where K is a positive integer and K>1. A prediction value is determined according to the K prediction modes and the weight derivation mode.

In a second aspect, a prediction method is provided in embodiments of the disclosure. The method includes the following. A weight derivation mode for a current block is determined. A weight of a template is determined according to the weight derivation mode. At least one of K prediction modes for the current block is determined according to the weight of the template, where K is a positive integer and K>1. A prediction value is determined according to the K prediction modes and the weight derivation mode.

In a third aspect, a method is provided. The method includes: obtaining, by a processor, a bitstream; and transmitting the bitstream, wherein the bitstream is generated by performing steps of: determining, by the processor, a weight derivation mode for a current block; determining, by the processor, a weight of a template according to the weight derivation mode; determining, by the processor, at least one of K prediction modes for the current block according to the weight of the template, wherein K is a positive integer and K>1; and determining, by the processor, a prediction value according to the K prediction modes and the weight derivation mode.

DETAILED DESCRIPTION

The disclosure can be applied to the field of picture coding, video coding, hardware video coding, dedicated circuit video coding, real-time video coding, etc. For example, the solution in the disclosure may be incorporated into audio video coding standards (AVS), such as H.264/audio video coding (AVC) standard, H.265/high efficiency video coding (HEVC) standard, and H.266/versatile video coding (VVC) standard. Alternatively, the solution in the disclosure may be incorporated into other proprietary or industry standards, including ITU-TH.261, ISO/IECMPEG-1Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It should be understood that the techniques in the disclosure are not limited to any particular coding standard or technology.

Figure 1:
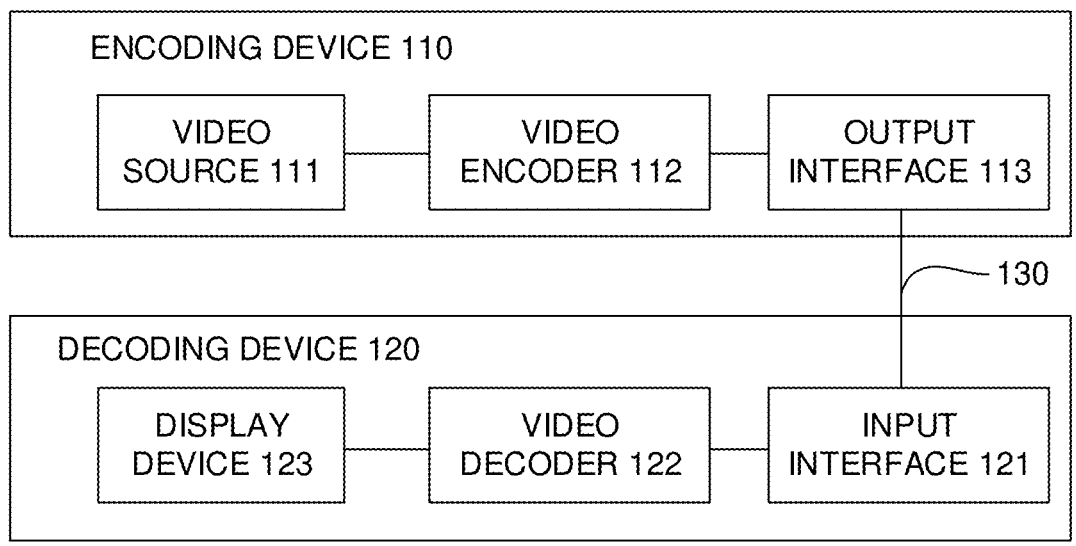
FIG. 1 is a schematic block diagram of a video coding system according to embodiments of the disclosure.

For ease of understanding, a video coding system in embodiments of the disclosure is firstly introduced with reference to FIG. 1.

FIG. 1 is a schematic block diagram of a video coding system 100 according to embodiments of the disclosure. It should be noted that FIG. 1 is only an example, and the video coding system in embodiments of the disclosure includes but is not limited to that illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the disclosure can be understood as a device having a video encoding function, and the decoding device 120 can be understood as a device having a video decoding function, that is, the encoding device 110 and the decoding device 120 in the embodiments of the disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, digital versatile discs (DVDs), flash memory, and the like. In this example, the decoding device 120 may obtain the encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the input interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated together with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the disclosure are not limited to FIG. 1. For example, the technology of the disclosure may also be applied to one-sided video encoding or one-sided video decoding.

In the following, a video encoding framework in embodiments of the disclosure will be introduced.

Figure 2:
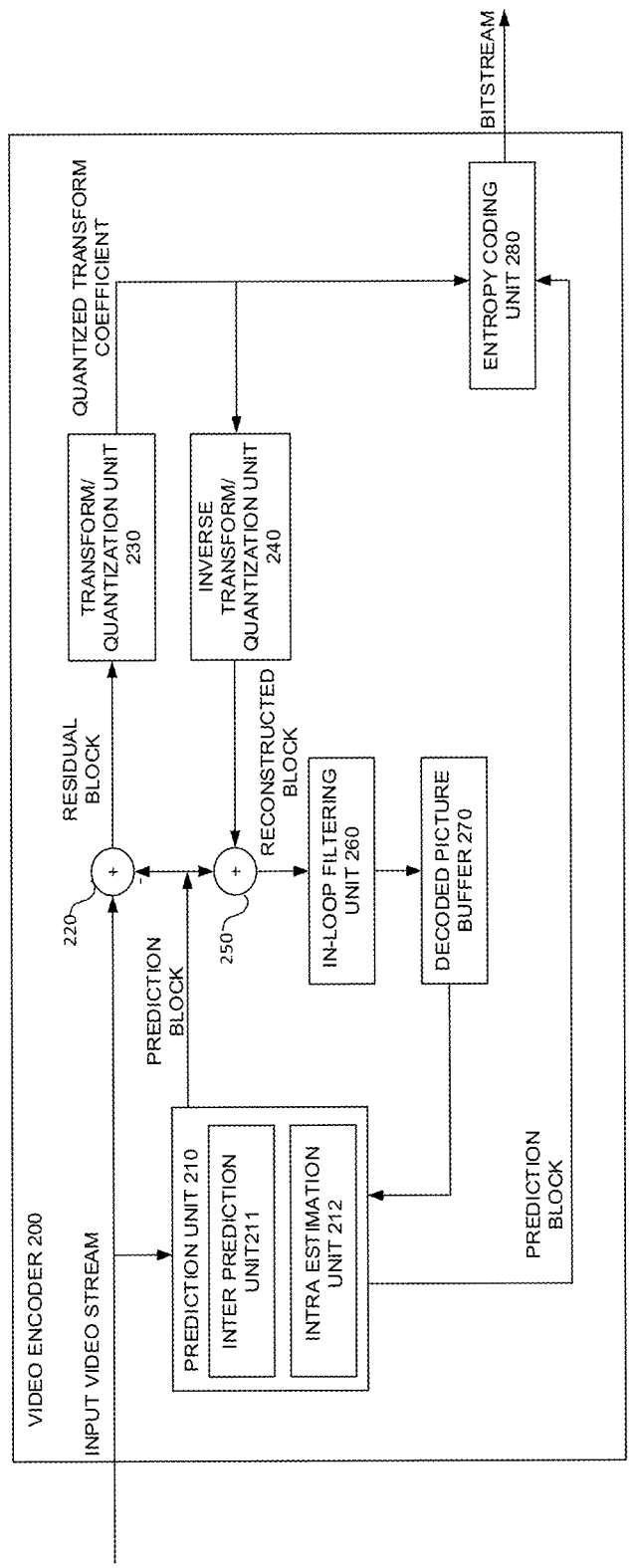
FIG. 2 is a schematic block diagram of a video encoder according to embodiments of the disclosure.

FIG. 2 is a schematic block diagram of a video encoder 200 according to embodiments of the disclosure. It should be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and V represent chrominance (Chroma) for describing colour and saturation. For example, in terms of color format, 4:2:0 represents that every 4 pixels have 4 luma components and 2 chroma components (YYYYCbCr), 4:2:2 represents that every 4 pixels have 4 luma components and 4 chroma component (YYYYCbCrCbCr), and 4:4:4 represents full pixel display (YYYYCbCrCbCrCbCrCbCr).

For example, the video encoder 200 reads video data, and for each picture in the video data, partitions the picture into several coding tree units (CTU). In some examples, the CTU may be called "tree block", "largest coding unit" (LCU), or "coding tree block" (CTB). Each CTU may be associated with a pixel block of the same size as the CTU within the picture. Each pixel may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further partitioned into several coding units (CUs) for coding. The CU may be a rectangular block or a square block. The CU may be further partitioned into a prediction unit (PU) and a transform unit (TU), so that coding, prediction, and transformation are separated, which is more conducive to flexibility in processing. In an example, the CTU is partitioned into CUs in a quadtree manner, and the CU is partitioned into TUs and PUs in a quadtree manner.

The video encoder and video decoder can support various PU sizes. Assuming that a size of a specific CU is 2N×2N, the video encoder and video decoder may support PUs of 2N×2N or N×N for intra prediction, and support symmetric PUs of 2N×2N, 2N×N, N×2N, N×N, or similar size for inter prediction; and the video encoder and video decoder may also support asymmetric PUs of 2N×nU, 2N×nD, nL×2N, or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, an in-loop filtering unit 260, a decoded picture buffer 270, and an entropy coding unit 280. It should be noted that the video encoder 200 may include more, fewer, or different functional components.

Optionally, in the disclosure, a current block may be referred to as a current CU or a current PU. A prediction block may be referred to as a prediction picture block or a picture prediction block. A reconstructed picture block may be referred to as a reconstructed block or a picture reconstructed block.

In some embodiments, the prediction unit 210 includes an inter prediction unit 211 and an intra estimation unit 212. Since there is a strong correlation between neighbouring samples in a video picture, intra prediction is used in the video coding technology to eliminate spatial redundancy between neighbouring samples. Since there is a strong similarity between neighbouring pictures in video, inter prediction is used in the video coding technology to eliminate temporal redundancy between neighbouring pictures, thereby improving encoding efficiency.

The inter prediction unit 211 may be used for inter prediction. The inter prediction may include motion estimation and motion compensation. In inter prediction, reference can be made to picture information of different pictures. In inter prediction, motion information is used to find a reference block from a reference picture, and a prediction block is generated according to the reference block to eliminate temporal redundancy. A frame for which inter prediction is used may be a P frame and/or a B frame, where P frame refers to a forward prediction frame, and B frame refers to bidirectional prediction frame. In inter prediction, the motion information is used to find a reference block from a reference picture, and a prediction block is generated according to the reference block. The motion information includes a reference picture list containing the reference picture, a reference picture index, and a motion vector. The motion vector can be an integer-sample motion vector or a fractional-sample motion vector. If the motion vector is the fractional-sample motion vector, interpolation filtering on the reference picture is required to generate a required fractional-sample block. Here, an integer-sample block or fractional-sample block found in the reference picture according to the motion vector is called a reference block. In some technologies, the reference block may be called a prediction block, and in some technologies, the prediction block will be generated based on the reference block. Generating the prediction block based on the reference block may also be understood as taking the reference block as a prediction block and then processing to generate a new prediction block based on the prediction block.

The intra estimation unit 212 predicts sample information of the current picture block only with reference to information of the same picture, so as to eliminate spatial redundancy. A frame used for intra prediction may be an I frame.

There are multiple prediction modes for intra prediction. Taking the international digital video coding standard H series as an example, there are 8 angular prediction modes and 1 non-angular prediction mode in H.264/AVC standard, which are extended to 33 angular prediction modes and 2 non-angular prediction modes in H.265/HEVC. The intra prediction mode used in HEVC includes a planar mode, direct current (DC), and 33 angular modes, and there are 35 prediction modes in total. The intra prediction mode used in VVC includes planar, DC, and 65 angular modes, and there are 67 prediction modes in total.

It should be noted that with increase of the number of angular modes, intra prediction will be more accurate, which will be more in line with demand for development of high-definition and ultra-high-definition digital video.

The residual unit 220 may generate a residual block of the CU based on a sample block of the CU and a prediction block of a PU of the CU. For example, the residual unit 220 may generate the residual block of the CU such that each sample in the residual block has a value equal to a difference between a sample in the sample block of the CU and a corresponding sample in the prediction block of the PU of the CU.

The transform/quantization unit 230 may quantize a transform coefficient. The transform/quantization unit 230 may quantize a transform coefficient associated with a TU of a CU based on a quantization parameter (QP) value associated with the CU. The video encoder 200 may adjust the degree of quantization applied to a transform coefficient associated with the CU by adjusting the QP value associated with the CU.

The inverse transform/quantization unit 240 may perform inverse quantization and inverse transform respectively on the quantized transform coefficient, to reconstruct a residual block from the quantized transform coefficient.

The reconstruction unit 250 may add samples in the reconstructed residual block to corresponding samples in one or more prediction blocks generated by the prediction unit 210, to generate a reconstructed picture block associated with the TU. By reconstructing sample blocks of each TU of the CU in this way, the video encoder 200 can reconstruct the sample block of the CU.

The in-loop filtering unit 260 is configured to process an inverse-transformed and inverse-quantized sample, compensate distorted information, and provide a better reference for subsequent sample encoding. For example, the in-loop filtering unit 260 may perform deblocking filtering operations to reduce blocking artifacts of the sample block associated with the CU.

In some embodiments, the in-loop filtering unit 260 includes a deblocking filtering unit and a sample adaptive offset/adaptive loop filtering (SAO/ALF) unit, where the deblocking filtering unit is configured for deblocking, and the SAO/ALF unit is configured to remove a ringing effect.

The decoded picture buffer 270 may store reconstructed sample blocks. The inter prediction unit 211 may use reference pictures including reconstructed sample blocks to perform inter prediction on PUs of other pictures. In addition, the intra estimation unit 212 may use the reconstructed sample blocks in the decoded picture buffer 270 to perform intra prediction on other PUs in the same picture as the CU.

The entropy coding unit 280 may receive the quantized transform coefficient from the transform/quantization unit 230. The entropy coding unit 280 may perform one or more entropy coding operations on the quantized transform coefficient to generate entropy coded data.

Figure 3:
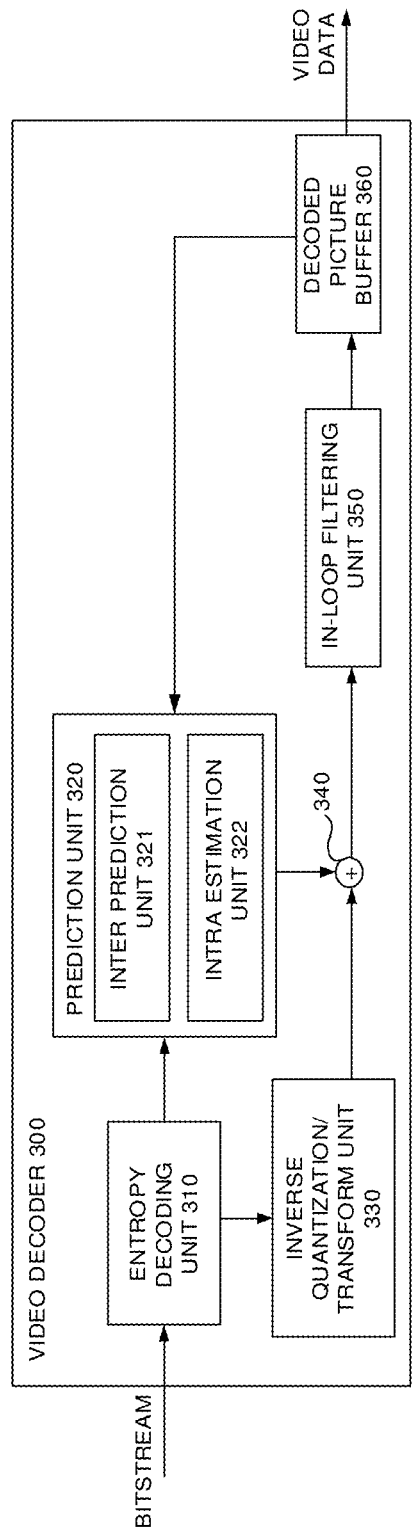
FIG. 3 is a schematic block diagram of a video decoder according to embodiments of the disclosure.

FIG. 3 is a schematic block diagram of a video decoder according to embodiments of the disclosure.

As illustrated in FIG. 3, the video decoder 300 includes an entropy decoding unit 310, a prediction unit 320, an inverse quantization/transform unit 330, a reconstruction unit 340, an in-loop filtering unit 350, and a decoded picture buffer 360. It should be noted that the video decoder 300 may include more, fewer, or different functional components.

The video decoder 300 may receive a bitstream. The entropy decoding unit 310 may parse the bitstream to extract syntax elements from the bitstream. As part of parsing the bitstream, the entropy decoding unit 310 may parse entropy-coded syntax elements in the bitstream. The prediction unit 320, the inverse quantization/transform unit 330, the reconstruction unit 340, and the in-loop filtering unit 350 may decode video data according to the syntax elements extracted from the bitstream, that is, generate decoded video data.

In some embodiments, the prediction unit 320 includes an inter prediction unit 321 and an intra estimation unit 322.

The intra estimation unit 322 may perform intra prediction to generate a prediction block of a PU. The intra estimation unit 322 may use an intra-prediction mode to generate a prediction block of the PU based on a sample block of spatially neighbouring PUs. The intra estimation unit 322 may also determine an intra prediction mode for the PU from one or more syntax elements parsed from the bitstream.

The inter prediction unit 321 can construct a first reference picture list (list 0) and a second reference picture list (list 1) according to the syntax elements parsed from the bitstream. In addition, the entropy decoding unit 310 may parse motion information of the PU if the PU is encoded using inter prediction. The inter prediction unit 321 may determine one or more reference blocks of the PU according to the motion information of the PU. The inter prediction unit 321 may generate a prediction block of the PU based on one or more reference blocks of the PU.

The inverse quantization/transform unit 330 may perform inverse quantization on (that is, dequantize) a transform coefficient associated with a TU. The inverse quantization/transform unit 330 may use a QP value associated with a CU of the TU to determine the degree of quantization.

After inverse quantization of the transform coefficient, the inverse quantization/transform unit 330 may perform one or more inverse transformations on the inverse-quantized transform coefficient in order to generate a residual block associated with the TU.

The reconstruction unit 340 uses the residual block associated with the TU of the CU and the prediction block of the PU of the CU to reconstruct a sample block of the CU. For example, the reconstruction unit 340 may add samples in the residual block to corresponding samples in the prediction block to reconstruct the sample block of the CU to obtain the reconstructed picture block.

The in-loop filtering unit 350 may perform deblocking filtering to reduce blocking artifacts of the sample block associated with the CU.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

A basic process of video coding is as follows. At an encoding end, a picture is partitioned into blocks, and for a current block, the prediction unit 210 performs intra prediction or inter prediction to generate a prediction block of the current block. The residual unit 220 may calculate a residual block based on the prediction block and an original block of the current block, that is, a difference between the prediction block and the original block of the current block, where the residual block may also be referred to as residual information. The residual block can be transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time-domain residual block after being transformed and quantized by the transform/quantization unit 230 may be called a frequency residual block or a frequency-domain residual block. The entropy coding unit 280 receives the quantized transformation coefficient output by the transform/quantization unit 230, and may perform entropy coding on the quantized transformation coefficient to output a bitstream. For example, the entropy coding unit 280 can eliminate character redundancy according to a target context model and probability information of a binary bitstream.

At a decoding end, the entropy decoding unit 310 may parse the bitstream to obtain prediction information, a quantization coefficient matrix, etc. of the current block, and the prediction unit 320 performs intra prediction or inter prediction on the current block based on the prediction information to generate a prediction block of the current block. The inverse quantization/transform unit 330 uses the quantization coefficient matrix obtained from the bitstream to perform inverse quantization and inverse transformation on the quantization coefficient matrix to obtain a residual block. The reconstruction unit 340 adds the prediction block and the residual block to obtain a reconstructed block. The reconstructed blocks form a reconstructed picture. The in-loop filtering unit 350 performs in-loop filtering on the reconstructed picture on a picture basis or on a block basis to obtain a decoded picture. Similar operations are also required at the encoding end for obtaining the decoded picture. The decoded picture may also be referred to as a reconstructed picture, and the reconstructed picture may be a reference picture of a subsequent picture for inter prediction.

It should be noted that block partition information as well as mode information or parameter information for prediction, transformation, quantization, entropy coding, and in-loop filtering, etc. determined at the encoding end is carried in the bitstream when necessary. At the decoding end, the bitstream parsed and existing information is analyzed to determine the block partition information as well as the mode information or the parameter information for prediction, transformation, quantization, entropy coding, in-loop filtering, etc. that is the same as such information at the encoding end, so as to ensure the decoded picture obtained at the encoding end is the same as the decoded picture obtained at the decoding end.

The above is the basic process of video coding under a block-based hybrid coding framework. With development of technology, some modules or steps of the framework or process may be optimized. The disclosure is applicable to the basic process of the video coder under the block-based hybrid coding framework, but is not limited to the framework and process.

In some embodiments, the current block may be a current CU or a current PU, etc. Due to requirements of parallel processing, a picture may be partitioned into slices, etc. Slices in the same picture may be processed in parallel, that is, there is no data dependency between the slices. The term "frame" is a common expression. It can be generally understood that a frame is a picture. In the disclosure, the frame may also be replaced with a picture or a slice, etc.

In the video coding standard VVC currently under development, there is an inter prediction mode called geometric partitioning mode (GPM). In the video coding standard AVS currently under development, there is an inter prediction mode called angular weighted prediction (AWP) mode. Although these two modes have different names and implementation details, they share common principles.

It should be noted that in traditional unidirectional prediction, only one reference block with the same size as the current block is searched for, while in traditional bidirectional prediction, two reference blocks with the same size as the current block are used, where a sample value of each sample in a prediction block is an average of samples at corresponding positions in the two reference blocks, that is, all samples in each reference block account for 50%. Bidirectional weighted prediction allows proportions of the two reference blocks to be different, such as 75% for all samples in a $1^{st}$ reference block and 25% for all samples in a $2^{nd}$ reference block, but proportions of all samples in the same reference block are the same. Other optimization methods, such as decoder-side motion vector refinement (DMVR) technology, bi-directional optical flow (BIO), etc., may cause some changes in reference samples or prediction samples. In addition, in GPM or AWP, two reference blocks with the same size as the current block are also used. However, in some sample positions, 100% of sample values at corresponding positions in the $1^{st}$ reference block are used; in some sample positions, 100% of sample values at corresponding positions in the $2^{nd}$ reference block are used; and in a boundary area, sample values at corresponding positions in these two reference blocks are used according to a certain proportion (weight). The allocation of these weights is determined according to the prediction mode of GPM or AWP. Alternatively, it may be considered that in GPM or AWP, two reference blocks with different sizes from the current block are used, that is, a required part of each reference block is taken as a reference block, in other words, a part with non-zero weights is taken as the reference block, and a part with zero weights is removed.

Figure 4:
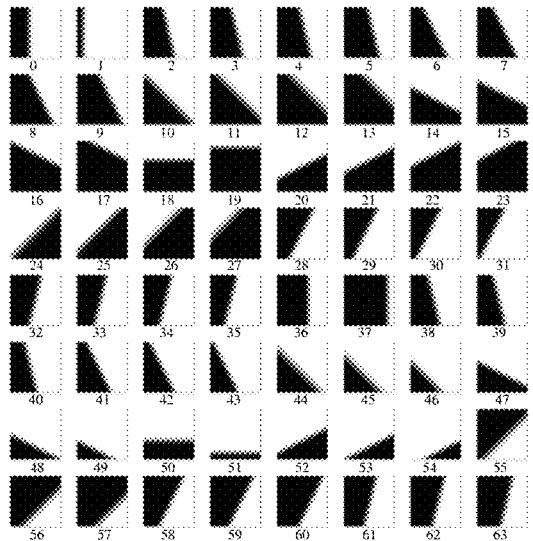
FIG. 4 is a schematic diagram illustrating weight allocation.
Figure 5:
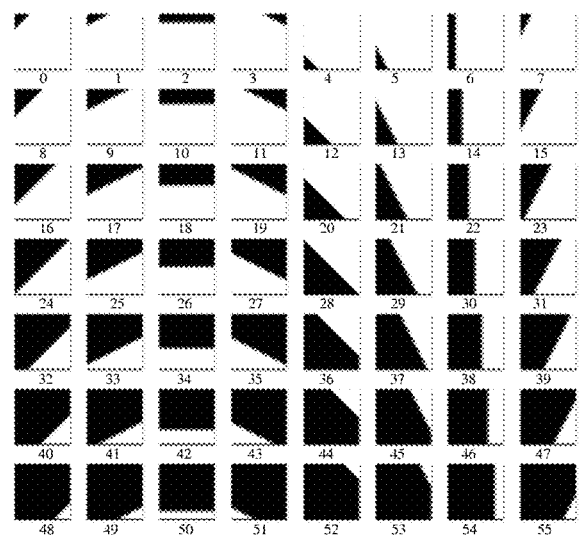
FIG. 5 is a schematic diagram illustrating weight allocation.

Exemplarily, FIG. 4 is a schematic diagram illustrating weight allocation. FIG. 4 is a schematic diagram illustrating weight allocation for multiple partitioning modes of GPM on a 64×64 current block provided in embodiments of the disclosure, where GPM has 64 partition modes. FIG. 5 is a schematic diagram illustrating weight allocation. FIG. 5 illustrates a schematic diagram of weight allocation for multiple partitioning modes of AWP on a 64×64 current block provided in embodiments of the disclosure, where AWP has 56 partitioning modes. In each of FIG. 4 and FIG. 5, for each partitioning mode, a black area represents a weight of 0% for corresponding positions in the $1^{st}$ reference block, while a white area represents a weight of 100% for corresponding positions in the $1^{st}$ reference block, a grey area represents a weight greater than 0% and less than 100%, represented by a colour depth, for corresponding positions in the $1^{st}$ reference block, and a weight for a corresponding position in the $2^{nd}$ reference block is 100% minus a weight for a corresponding position in the $1^{st}$ reference block.

GPM and AWP differ in method for weight derivation. For GPM, an angle and an offset are determined according to each mode, and then a weight matrix for each mode is calculated. For AWP, a one-dimensional weight line is firstly defined, and then a method similar to intra angular prediction is used to fill an entire matrix with the one-dimensional weight line.

It should be noted that in earlier coding technologies, only rectangular partitioning was available, no matter whether it is for CU partitioning, PU partitioning, or TU partitioning. However, with GPM or AWP, the effect of non-rectangular partitioning for prediction is achieved without partitioning. In GPM and AWP, a weight mask is used for two reference blocks, namely the weight map as described above. From the mask, weights of the two reference blocks for generating the prediction block are determined. It may be simply understood as that some positions in the prediction block come from the $1^{st}$ reference block and some positions come from the $2^{nd}$ reference block, and a blending area is obtained by weighting corresponding positions in the two reference blocks, which allows a smoother transition. In GPM and AWP, the current block are not partitioned into two CUs or PUs according to a partition line. Therefore, after prediction, the current block is processed as a whole during transformation, quantization, inverse transformation, and inverse quantization of residuals.

In GPM, a weight matrix is used to simulate geometric shape partitioning, or more precisely, simulate partitioning of prediction. To implement GPM, in addition to the weight matrix, two prediction values are also needed, each determined by one unidirectional motion information. These two unidirectional motion information come from a motion information candidate list, such as a merge motion information candidate list (mergeCandList). In GPM, two indices are used in a bitstream to determine the two unidirectional motion information from mergeCandList.

In inter prediction, motion information is used to represent "motion". Basic motion information includes reference frame (or called reference picture) information and motion vector (MV) information. In common bidirectional prediction, a current block is predicted by using two reference blocks. The two reference blocks may be a forward reference block and a backward reference block. Optionally, the two reference blocks are allowed to be both forward or both backward. Forward means that a moment corresponding to the reference picture is before a current picture, and backward means that the moment corresponding to the reference picture is after the current picture. In other words, forward means that a position of the reference picture in a video is before the current picture, and backward means that the position of the reference picture in the video is after the current picture. In other words, forward means that a picture order count (POC) of the reference picture is less than a POC of the current picture, and backward means that the POC of the reference picture is greater than the POC of the current picture. In order to use bidirectional prediction, it is necessary to find two reference blocks, and accordingly, two groups of reference picture information and motion vector information are needed. Each of the two groups may be understood as one unidirectional motion information, and one bidirectional motion information may be obtained by combining the two groups. During implementation, the unidirectional motion information and the bidirectional motion information may use the same data structure, but the two groups of reference picture information and motion vector information in the bidirectional motion information are both valid, while one of the two groups of reference picture information and motion vector information in the unidirectional motion information is invalid.

In some embodiments, two reference picture lists are supported, and are denoted as RPL0, RPL1, where RPL is an abbreviation for reference picture list. In some embodiments, P slice can only use RPL0, and B slice can use RPL0 and RPL1. For a slice, each reference picture list has several reference pictures, and a coder finds a certain reference picture according to a reference picture index. In some embodiments, the motion information is represented by a reference picture index and a motion vector. For example, for the bidirectional motion information described above, a reference picture index refIdxL0 corresponding to RPL0, a motion vector mvL0 corresponding to RPL0, a reference picture index refIdxL1 corresponding to RPL1, and a motion vector mvL1 corresponding to RPL1 are used. Here, the reference picture index corresponding to RPL0 and the reference picture index corresponding to RPL1 may be understood as the reference picture information described above. In some embodiments, two flag bits are used to indicate whether to use motion information corresponding to RPL0 and whether to use motion information corresponding to RPL1 respectively, and are denoted as predFlagL0 and predFlagL1 respectively, which may also mean that predFlagL0 and predFlagL1 indicate whether the unidirectional motion information is "valid". Although such data structure of the motion information is not explicitly indicated, the motion information is indicated by using a reference picture index, a motion vector, and a flag bit indicating validity corresponding to each RPL. In some standard texts, the term "motion vector" is used rather than "motion information", and it may also be considered that the reference picture index and the flag indicating whether to use corresponding motion information are associated with the motion vector. In the disclosure, "motion information" is still used for the convenience of illustration, but it should be understood that "motion vector" may also be used for illustration.

Motion information used for the current block may be stored, and motion information of previously coded blocks such as neighbouring blocks may be used for subsequent coding blocks of the current picture based on a positional relationship. This utilizes spatial correlation, so this kind of coded motion information is called spatial motion information. Motion information used for each block of the current picture may be stored, and motion information of previously coded picture may be used for subsequent coding pictures based on a reference relationship. This utilizes temporal correlation, so this kind of motion information of coded picture is called temporal motion information. The motion information used for each block in the current picture is usually stored in the following manner: a fixed-size matrix such as a 4×4 matrix is usually taken as a minimum unit, and each minimum unit stores a set of motion information separately. In this way, when coding each block, a minimum unit(s) corresponding to a position of the block may store motion information of the block. As such, when spatial motion information or temporal motion information is used, motion information corresponding to a position may be directly found according to the position. For example, if traditional unidirectional prediction is used for a 16×16 block, all 4×4 minimum units corresponding to the block will store motion information of this unidirectional prediction. If GPM or AWP is used for a block, all minimum units corresponding to the block will store motion information determined according to the mode of GPM or AWP, $1^{st}$ motion information, $2^{nd}$ motion information, and a position of each minimum unit. In one manner, if all 4×4 samples corresponding to a minimum unit come from the $1^{st}$ motion information, the minimum unit stores the $1^{st}$ motion information. If all 4×4 samples corresponding to a minimum unit come from the $2^{nd}$ motion information, the minimum unit stores the $2^{nd}$ motion information. If all 4×4 samples corresponding to a minimum unit come from both the $1^{st}$ motion information and the $2^{nd}$ motion information, in AWP, one of the $1^{st}$ motion information and the $2^{nd}$ motion information will be chosen and stored; and in GPM, two motion information will be combined as bidirectional motion information for storage if the two motion information correspond to to different RPLs, and otherwise, only the $2^{nd}$ motion information will be stored.

Figure 6A:
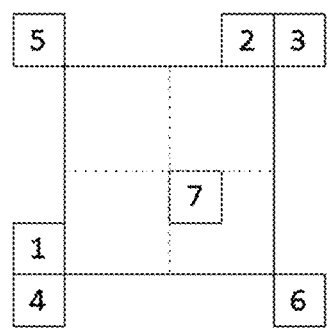
FIG. 6A is a schematic diagram illustrating inter prediction.

Optionally, the aforementioned mergeCandList is constructed based on spatial motion information, temporal motion information, history-based motion information, and some other motion information. Exemplarily, for the mergeCandList, positions 1 to 5 in FIG. 6A are used to derive the spatial motion information, and position 6 or 7 in FIG. 6A is used to derive the temporal motion information. For the history-based motion information, motion information of each block is added to a first-in-first-out list when coding the block, and the addition process may require some checks, such as whether the motion information duplicates existing motion information in the list. In this way, reference may be made the motion information in the history-based list when coding the current block.

In some embodiments, the syntax description for GPM is that as illustrated in Table 1.

TABLE 1

| | |
|---|---|
| regular_merge_flag[x0][y0] | ae(v) |
| if( regular_merge_flag[x0][y0] == 1 ) { | |
|   if( sps_mmvd_enabled_flag ) | |
|     mmvd_merge_flag[x0][y0] | ae(v) |
|   if( mmvd_merge_flag[x0][y0] == 1 ) { | |
|     if( MaxNumMergeCand > 1 ) | |

TABLE 1-continued

```
        mmvd_cand_flag[x0][y0]                              ae(v)
        mmvd_distance_idx[x0][y0]                           ae(v)
        mmvd_direction_idx[x0][y0]                          ae(v)
      } else if( MaxNumMergeCand > 1 )
        merge_idx[x0][y0]                                   ae(v)
    } else {
      if( sps_ciip_enabled_flag && sps_gpm_enabled_flag &&
          sh_slice_type == B &&
          cu_skip_flag[x0][y0] == 0 && cbWidth >= 8 &&
cbHeight >= 8 &&
          cbWidth < (8*cbHeight) && cbHeight < (8*cbWidth) &&
          cbWidth < 128 && cbHeight < 128 )
        ciip_flag[x0][y0]                                   ae(v)
      if( ciip_flag[x0][y0] && MaxNumMergeCand > 1 )
        merge_idx[x0][y0]                                   ae(v)
      if( !ciip_flag[x0][y0] ) {
        merge_gpm_partition_idx[x0][y0]                     ae(v)
        merge_gpm_idx0[x0][y0]                              ae(v)
        if( MaxNumGpmMergeCand > 2 )
          merge_gpm_idx1[x0][y0]                            ae(v)
      }
    }
```

As illustrated in Table 1, in a merge mode, if regular_merge_flag is not equal to 1, either combined inter-intra prediction (CIIP) or GPM may be used for the current block. If CIIP is not used for the current block, then GPM will be used, as indicated by the syntax "if(!ciip_flag[x0][y0])" in Table 1.

As illustrated in the above Table 1, in GPM, transmission of three information in a bitstream, namely merge_gpm_partition_idx, merge_gpm_idx0, and merge_gpm_idx1, is required, where x0 and y0 are used to determine coordinates (x0, y0) of a top-left luma sample of the current block relative to a top-left luma sample of the picture. merge_gpm_partition_idx is used to determine a partitioning shape of GPM, which is a "simulated partitioning" as described above. merge_gpm_partition_idx represents a weight derivation mode or an index of the weight derivation mode in embodiments of the disclosure. merge_gpm_idx0 represents an index of the $1^{st}$ motion information in the candidate list, and merge_gpm_idx1 represents an index of the $2^{nd}$ motion information in the candidate list. merge_gpm_idx1 needs to be transmitted only when a length of the candidate list (MaxNumGpmMergeCand) is greater than 2; otherwise, merge_gpm_idx1 may be determined directly.

In some embodiments, a decoding process of GPM includes the following steps.

Information input for the decoding process includes: coordinates (xCb, yCb) of a top-left luma location of the current block relative to a top-left luma location of the picture, a width (cbWidth) of a current luma component, a height (cbHeight) of a current luma component, luma motion vectors mvA and mvB in 1/16 fractional-sample accuracy, chroma motion vectors mvCA and mvCB, reference picture indices refIdxA and refIdxB, and prediction list flags predListFlagA and predListFlagB.

Exemplarily, the motion information may be represented by a combination of motion vectors, reference picture indices, and prediction list flags. In some embodiments, two reference picture lists are supported, each of which may have multiple reference pictures. In unidirectional prediction, only one reference block in one reference picture in one reference picture list is used for reference, while in bidirectional prediction, two reference blocks each in one reference picture in one of the two reference picture lists are used for reference. In GPM, two unidirectional predictions are used. In mvA and mvB, mvCA and mvCB, refIdxA and refIdxB, predListFlagA and predListFlagB, "A" may be understood as a first prediction mode, and "B" may be understood as a second prediction mode. Optionally, "X" is used to represent "A" or "B", so that predListFlagX indicates whether a $1^{st}$ reference picture list or a $2^{nd}$ reference picture list is used for X, refIdxX indicates a reference picture index in the reference picture list used for X, mvX indicates a luma motion vector used for X, and mvCX indicates a chroma motion vector used for X. It should be noted that, the motion information described in the disclosure may be considered as represented by a combination of motion vectors, reference picture indices, and prediction list flags.

Information output for the decoding process includes: an (cbWidth)×(cbHeight) array predSamplesL of luma prediction samples; an (cbWidth/SubWidthC)×(cbHeight/SubHeightC) array of chroma prediction samples for the component Cb, if necessary; and an (cbWidth/SubWidthC)×(cbHeight/SubHeightC) array of chroma prediction samples for the component Cr, if necessary.

Exemplarily, the luma component is taken as an example. The processing of the chroma component is similar to that of the luma component.

Let each of predSamplesLAL and predSamplesLBL have a size of (cbWidth)×(cbHeight), which are prediction sample arrays obtained based on two prediction modes. predSamplesL is derived as follows. predSamplesLAL and predSamplesLBL are determined separately according to the luma motion vectors mvA and mvB, chroma motion vectors mvCA and mvCB, reference picture indices refIdxA and refIdxB, and prediction list flags predListFlagA and predListFlagB. In other words, prediction is performed according to motion information of the two prediction modes, and the detailed process thereof is not described herein. Generally, GPM is a merge mode, so that both the two prediction modes of GPM may be considered as merge modes.

According to merge_gpm_partition_idx[xCb][yCb], a "partition" angle index variable angleIdx and a distance index variable distanceIdx of GPM are determined based on Table 2.

TABLE 2

Correspondence among angleIdx, distanceIdx, and merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

TABLE 2-continued

Correspondence among angleIdx, distanceIdx, and merge_gpm_partition_idx

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

It should be noted that, GPM may be used for each of the three components components (Y, Cb, Cr). Therefore, the process of generating a GPM prediction sample array for a component is encapsulated in a sub-process called "weighted sample prediction process for GPM". This sub-process is invoked for all the three components, with different parameters for each component. Here, the luma component is taken as an example. A prediction array for a current luma block, predSamplesL[xL][yL] (where xL=0...cbWidth−1, yL=0...cbHeight−1), is derived from the weighted sample prediction process for GPM. nCbW is set to cbWidth, and nCbH is set to cbHeight. The prediction sample arrays predSamplesLAL and predSamplesLBL generated using the two prediction modes, as well as angleIdx and distanceIdx, are used as inputs.

In some embodiments, the weighted sample prediction and derivation process for GPM includes the following steps.

Inputs to this process are: a width nCbW of the current block, a height nCbH of the current block, two (nCbW)×(nCbH) prediction sample arrays predSamplesLA and predSamplesLB, a "partition" angle index variable angleIdx of GPM, a distance index variable distanceIdx of GPM, and a colour component index variable cIdx. Here, a luma component is taken as an example, so that cIdx=0, which indicates the luma component.

Output of this process is the (nCbW)×(nCbH) array pbSamples of prediction sample values of GPM.

Exemplarily, variables nW, nH, shift1, offset1, displacementX, displacementY, partFlip, and shiftHor are derived as follows:

$$nW = (cIdx == 0) \: ? \: nCbW : nCbW * SubWidthC;$$

$$nH = (cIdx == 0) \: ? \: nCbH : nCbH * SubHeightC;$$

$$shift1 = \text{Max}(5, 17 - BitDepth),$$

where BitDepth represents a coding bit depth;

$$offset1 = 1 \ll (shift1 - 1),$$

where "$\ll$" represents shift left;

$$displacementX = angleIdx;$$

$$displacementY = (angleIdx + 8) \% 32;$$

$$partFlip = (angleIdx >= 13 \: \&\& \: angleIdx <= 27) \: ? \: 0 : 1;$$

$$shiftHor = (angleIdx \% 16 == 8 || (angleIdx \% 16 \: != 0 \: \&\& \: nH >= nW)) \: ? \: 0 : 1.$$

Variables offsetX and offsetY are derived as follows:

If shiftHor = 0:

$$offsetX = (-nW) \gg 1$$

$$offsetY = ((-nH) \gg 1) +$$
$$(angleIdx < 16 \: ? \: (distanceIdx * nH) \gg 3 : -((distanceIdx * nH) \gg 3))$$

If shiftHor = 1:

$$offsetX = ((-nW) \gg 1) +$$
$$(angleIdx < 16 \: ? \: (distanceIdx * nW) \gg 3 : -((distanceIdx * nW) \gg 3))$$

$$offsetY = (-nW) \gg 1.$$

Variables xL and yL are derived as follows:

$$xL = (cIdx == 0) \: ? \: x : x * SubWidthC;$$

$$yL = (cIdx == 0) \: ? \: y : y * SubWidthC.$$

Variable wValue specifying a weight of a prediction sample at a current position is derived as follows:

wValue is a weight of a predicted sample predSamplesLA[x][y] at (x, y) in a prediction array for the first prediction mode, and (8−wValue) is a weight of a predicted sample predSamplesLB[x][y] at (x, y) in the prediction array for the first prediction mode.

The distance matrix disLut is determined according to Table 3.

TABLE 3

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

$$weightIdx = (((xL + offsetX) \ll 1) + 1) * disLut[displacementX] +$$
$$(((yL + offsetY) \ll 1) + 1) * disLut[displacementX];$$

$$weightIdxL = partFlip ? 32 + weightIdx : 32 - weightIdx;$$

$$wValue = Clip3(0, 8, (weightIdxL + 4) \gg 3).$$

The prediction sample values pbSamples[x][y] are derived as follows:

$$pbSamples[x][y] =$$
$$Clip3(0, (1 \ll BitDepth) - 1, (predSamplesLA[x][y] * wValue +$$
$$predSamplesLB[x][y] * (8 - wValue) + offset1) \gg shift1).$$

It should be noted that, for each position in the current block, a weight is derived and then a GPM prediction value pbSamples[x][y] is calculated. In this case, although the weights wValue do not have to be written in matrix form, it may be understood that if each wValue for each position is stored in a matrix, then a weight matrix is formed. The principle of calculating the GPM prediction value by separately calculating the weight for each sample and weighting, and the principle of calculating the GPM prediction sample array by calculating all the weights and then uniformly weighting, are the same. However, the expression of "weight matrix" in various elaborations in the disclosure is for the sake of better understanding, and drawings based on a weight matrix are more intuitive. In fact, elaborations can also be made based the weight of each position. For example, a weight matrix derivation mode may also be referred to as a weight derivation mode.

Figure 6B:
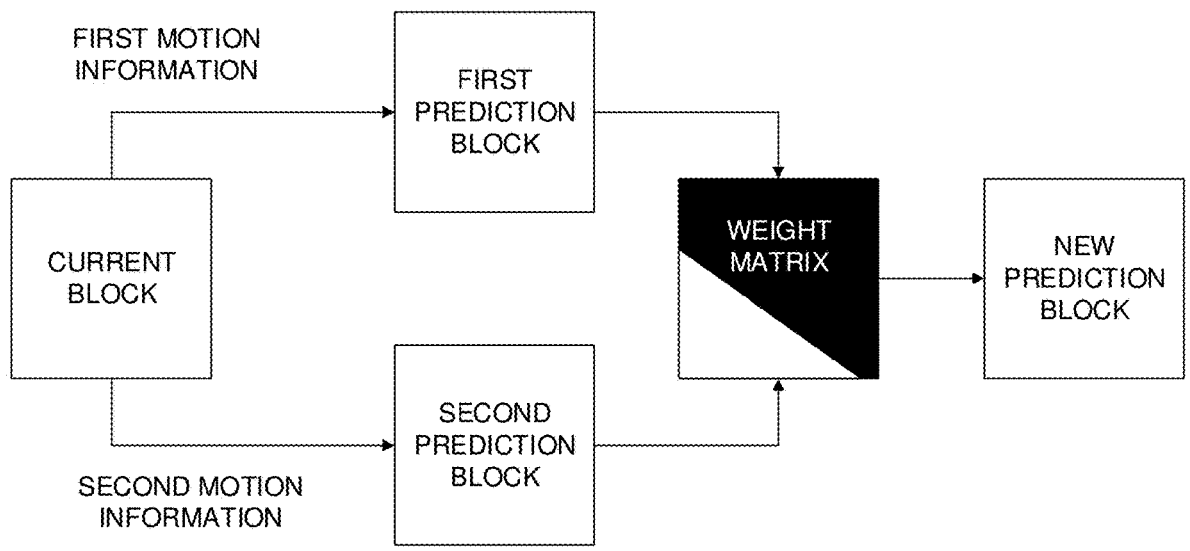
FIG. 6B is a schematic diagram illustrating weighted inter prediction.

In some embodiments, as illustrated in FIG. 6B, a GPM decoding process may be expressed as follows. A bitstream is parsed to determine whether a GPM technology is adopted for the current block. If the GPM technology is adopted for the current block, a weight derivation mode (or a "partitioning" mode or a weight matrix derivation mode), first motion information, and second motion information are determined. A first prediction block is determined according to the first motion information, a second prediction block is determined according to the second motion information, a weight matrix is determined according to the weight matrix derivation mode, and a prediction block of the current block is determined according to the first prediction block, the second prediction block, and the weight matrix.

It should be noted that in embodiments of the disclosure, GPM or AWP is a type of prediction technique. A flag indicating whether GPM or AWP is used needs to be transmitted in the bitstream, where the flag indicates whether GPM or AWP is used for the current block. If GPM or AWP is used, the encoder needs to transmit the specific mode used, that is, one of the 64 partitioning modes of GPM or one of the 56 partitioning modes of AWP, as well as index values of two unidirectional motion information, in the bitstream. That is, for the current block, the decoder may obtain information regarding whether GPM or AWP is used by parsing the bitstream. If it is determined that GPM or AWP is used, the decoder may parse to obtain prediction mode parameters of GPM or AWP and the index values of the two motion information. For example, if the current block is partitioned into two partitions, a first index value corresponding to a first partition and a second index value corresponding to a second partition may be obtained through parsing.

Specifically, for a GPM mode, if GPM is used, the prediction mode parameter of GPM will be transmitted in the bitstream, such as the specific partitioning mode of GPM. Generally, GPM includes 64 partitioning modes. For an AWP mode, if AWP is used, the prediction mode parameter of AWP will be transmitted in the bitstream, such as the specific partitioning mode of AWP. Generally, AWP includes 56 partitioning modes.

In an inter prediction mode such as GPM and AWP, two unidirectional motion information are required to search for two reference blocks. At present, this is implemented as follows. At an encoder side, a unidirectional motion information candidate list is constructed using relevant information of the coded part before the current block, unidirectional motion information is selected from the unidirectional motion information candidate list, and indices of these two unidirectional motion information in the unidirectional motion information candidate list are signalled into the bitstream. At a decoder side, the same method applies, that is, a unidirectional motion information candidate list is constructed using relevant information of the decoded part before the current block, and this unidirectional motion information candidate list must be identical to the one constructed at the encoder side. As such, the indices of the two unidirectional motion information are parsed out from the bitstream, and these two unidirectional motion information are found from the unidirectional motion information candidate list as the two unidirectional motion information required for the current block.

In other words, the unidirectional motion information described herein may include motion vector information, which is the value of (x, y), and corresponding reference picture information, which is a reference picture list and a reference picture index value in the reference picture list. In one manner, reference picture index values in two reference picture lists are recorded, where index values in one list are valid, such as 0, 1, 2, etc., and index values in the other list are invalid, i. e. −1. The reference picture list with valid reference picture index values is the reference picture list used for the motion information of the current block. A corresponding reference picture may be found in the reference picture list based on the reference picture index value. Each reference picture list has a corresponding motion vector, and a motion vector for a valid reference picture list is valid, while a motion vector for an invalid reference picture list is invalid. The decoder may use the reference picture information in the unidirectional motion information to find the required reference picture, and may find the reference block in the reference picture based on a position of the current block and the motion vector, that is, the value of (x, y), so as to determine an inter prediction value of the current block.

Figure 7A:
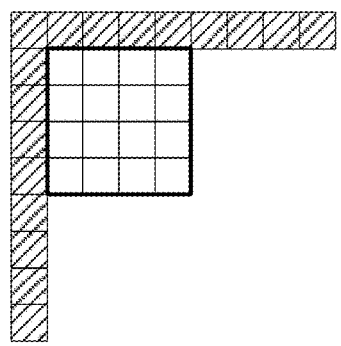
FIG. 7A is a schematic diagram illustrating intra prediction.

In intra prediction, reconstructed samples around the current block that have been coded are used as reference samples to predict the current block. FIG. 7A is a schematic diagram illustrating intra prediction. As illustrated in FIG. 7A, the current block is 4×4 in size, and samples on the left column and the above row of the current block are used as reference samples of the current block and are used for intra prediction of the current block. These reference samples may all be available, i. e. they have all been coded. Alternatively, some of the reference samples may not be available. For example, if the current block is on the leftmost of a picture, the reference samples on the left of the current block are not available. For another example, when coding the current block, the samples on the bottom left of the current block have not yet been coded, and in this case, reference samples on the bottom left are also not available. For the case where reference samples are not available, available reference samples, some values, or some methods may be used for filling, or no filling may be performed.

Figures 7B, 8A, 8B, 8C:
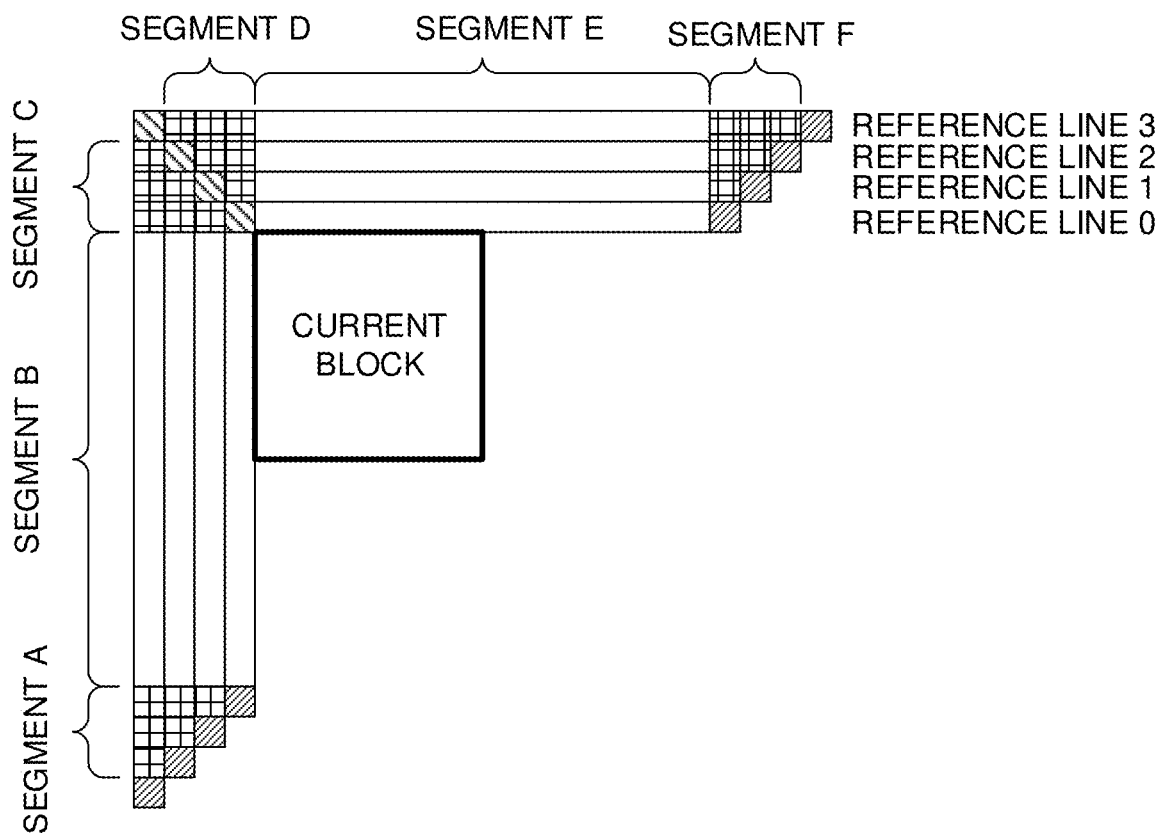
FIG. 7B is a schematic diagram illustrating intra prediction.
FIG. 8A to FIG. 8I each are a schematic diagram illustrating intra prediction.
Figure 8D:
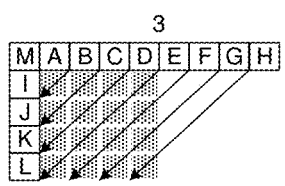
Figure 8E:
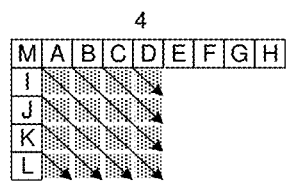
Figure 8F:
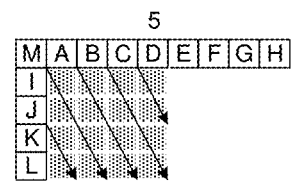
Figure 8G:
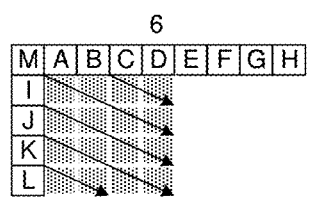
Figure 8H:
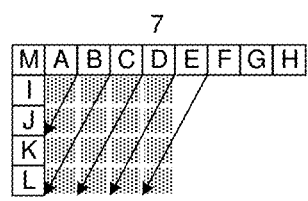
Figure 8I:
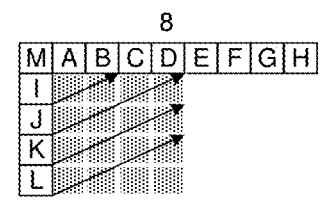

FIG. 7B is a schematic diagram illustrating intra prediction. As illustrated in FIG. 7B, with a multiple reference line (MRL) intra prediction method, more reference samples may be used to improve coding efficiency. For example, four reference rows/columns are used as the reference samples of the current block.

Further, there are multiple prediction modes for intra prediction. FIG. 8A-FIG. 8I each are a schematic diagram illustrating intra prediction. As illustrated in FIG. 8A-FIG. 8I, in H.264, there are nine modes for intra prediction of 4×4 blocks. In mode 0 illustrated in FIG. 8A, samples above the current block are copied to the current block vertically as prediction values. In mode 1 illustrated in FIG. 8B, reference samples on the left of the current block are copied to the current block horizontally as prediction values. In mode 2 (DC) illustrated in FIG. 8C, an average value of eight samples (A-D and I-L) is taken as the prediction value of all samples. In mode 3 to mode 8 illustrated in FIG. 8D-FIG. 8I, reference samples are copied to corresponding positions in the current block according to a certain angle, and since some positions in the current block may not correspond exactly to the reference sample, a weighted average of reference samples or interpolated factional samples of the reference samples may be required.

Figure 9:
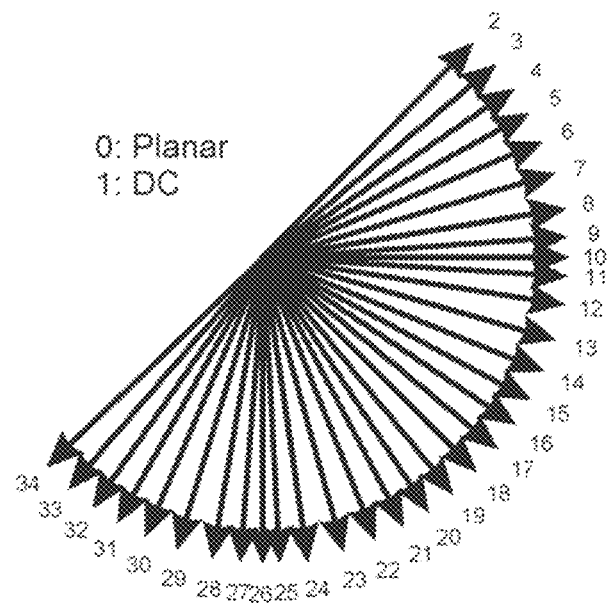
FIG. 9 is a schematic diagram illustrating intra prediction modes.
Figure 10:
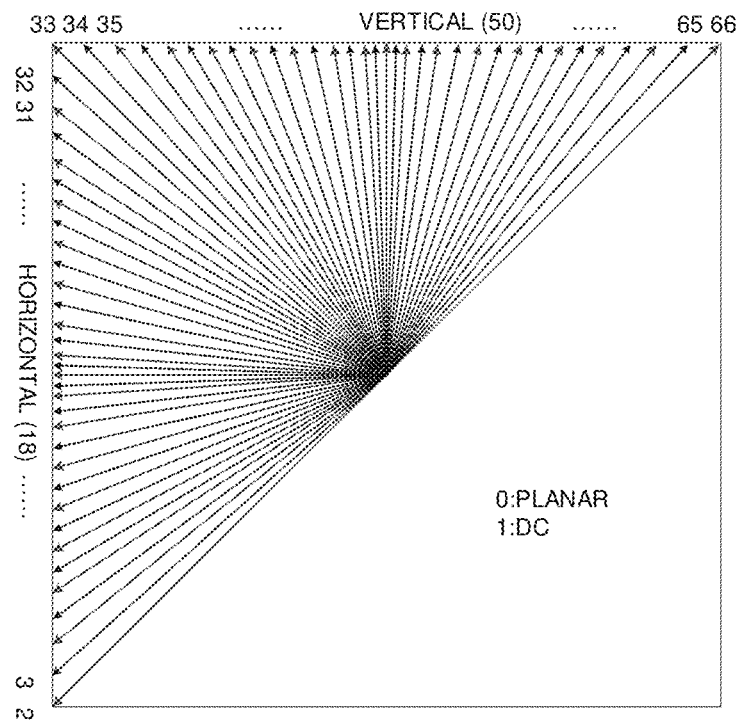
FIG. 10 is a schematic diagram illustrating intra prediction modes.
Figure 11:
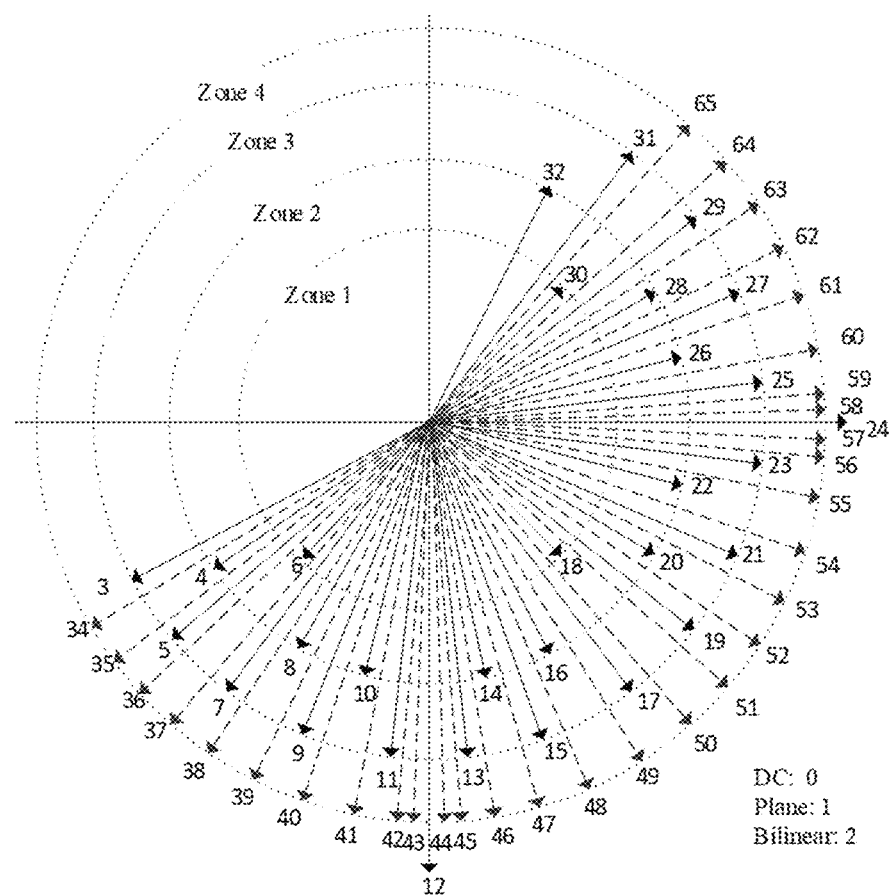
FIG. 11 is a schematic diagram illustrating intra prediction modes.

In addition, there are other modes such as the planar mode. With development of technology and increase in block size, there are an increasing number of angular prediction modes. FIG. 9 is a schematic diagram illustrating intra prediction modes. As illustrated in FIG. 9, in HEVC, a total of 35 prediction modes are used, including planar, DC, and 33 angular modes. FIG. 10 is a schematic diagram illustrating intra prediction modes. As illustrated in FIG. 10, in VVC, a total of 67 prediction modes are used, including planar, DC, and 65 angular modes. FIG. 11 is a schematic diagram illustrating intra prediction modes. As illustrated in FIG. 11, in AVS3, a total of 66 prediction modes are used, including DC, planar, bilinear, and 63 angular modes.

Furthermore, there are some techniques to improve the prediction, such as fractional sample interpolation which improves reference samples, filtering of prediction samples, etc. For example, in multiple intra prediction filter (MIPF) in AVS3, prediction values are generated by using different filters for different block sizes. For different positions of samples within the same block, a filter is used to generate prediction values for samples that are closer to the reference samples, while another filter is used to generate prediction values for samples that are away from the reference samples. With aid of technology for filtering prediction samples, such as intra prediction filter (IPF) in AVS3, the prediction values may be filtered based on the reference samples.

In intra prediction, an intra mode coding technology using a most probable mode (MPM) list may be used to improve coding efficiency. The mode list is constructed with intra prediction modes for surrounding coded blocks, intra prediction modes derived from the intra prediction modes for the surrounding coded blocks such as a neighbourhood mode, and some commonly-used or high-probability intra prediction modes such as DC, planar, and bilinear modes. Reference to the intra prediction modes for the surrounding coded blocks utilizes spatial correlation because textures have a certain spatial continuity. The MPM(s) may be used as a prediction for intra prediction modes. That is, it is assumed that the probability of using the MPM for the current block is higher than not using the MPM. Therefore, during binarization, fewer codewords will be assigned to the MPM to reduce overhead and improve coding efficiency.

In GPM, two inter-prediction blocks are combined by using a weight matrix. In practice, usage of the weight matrix can be extended to combining any two prediction blocks, such as two inter-prediction blocks, two intra-prediction blocks, and one inter-prediction block and one intra-prediction block. A prediction block(s) of intra block copy (IBC) or palette may also be used as one or two of the prediction blocks in screen content coding.

In the disclosure, intra, inter, IBC, and palette are referred to as different prediction manners. For ease of elaboration, they are referred to as prediction modes. The prediction mode means that a coder may generate information of a prediction block of the current block according to the prediction mode. For example, in intra prediction, the prediction mode may be a certain intra prediction mode, such as DC, planar, and various intra angular prediction modes. One or more auxiliary information may also be added, for example, an optimization method for intra reference samples, an optimization method (for example, filtering) after a preliminary prediction block is generated, and the like. For example, in inter prediction, the prediction mode may be a skip mode, a merge mode, a merge with motion vector difference (MMVD) mode, or a common inter mode (MVP+MVD). The inter prediction mode may be unidirectional prediction, bidirectional prediction, or multi-hypothesis prediction. If unidirectional prediction is used for the inter prediction mode, motion information that is one unidirectional motion information needs to be determined, and a prediction block can be determined according to the motion information. If bidirectional prediction is used for the inter prediction mode, one bidirectional motion information or two unidirectional motion information needs to be determined, and a prediction block can be determined according to the motion information. If multi-hypothesis prediction is used for the inter prediction mode, multiple unidirectional motion information needs to be determined, and a prediction block can be determined according to the motion information. The skip mode, the merge mode, the MMVD mode, and the common inter mode each can support unidirectional prediction, bidirectional prediction, or multi-hypothesis prediction. If the prediction mode is an inter prediction mode, motion information can be determined, and a prediction block can be determined according to the motion information. Template matching can be used on the basis of the skip mode, the merge mode, the MMVD mode, and the common inter mode, and such a prediction mode can still be referred to as the skip mode, the merge mode, the MMVD mode, and the common inter mode, or a template matching-based skip mode, a template matching-based merge mode, a template matching-based MMVD mode, and a template matching-based common inter mode.

In the skip mode or the merge mode, an MVD does not need to be transmitted in a bitstream, and in the skip mode, an MVD and a residual also do not need to be transmitted in the bitstream. The MMVD may be considered as a special merge mode, in which some specific MVDs are represented by some flag bits, and these specific MVDs each only have several possible preset values. An example is an MMVD mode in VVC, in which the direction of the MVD is represented by mmvd_direction_idx. The possible value of mmvd_direction_idx is 0, 1, 2, and 3, where 0 indicates that the horizontal component of the MMVD is a positive value and the vertical direction is 0, 1 indicates that the horizontal component of the MMVD is a negative value and the vertical direction is 0, 2 represents that the horizontal component of the MMVD is 0 and the vertical direction is a positive value, and 3 represents that the horizontal component of the MMVD is 0 and the vertical direction is a negative value. The absolute value of the above positive or negative value is represented by mmvd_distance_idx, and the possible value of mmvd_distance_idx is 0-7, which represent 1, 2, 4, 8, 16, 32, 64, and 128 respectively when ph_mmvd_fullpel_only_flag==0, and represent 4, 8, 16, 32, 64, 128, 256, and 512 respectively when ph_mmvd_fullpel_only_flag==1. The MVD of the common inter mode can represent theoretically any possible MVD in a valid range.

In this way, information that needs to be determined for GPM may be expressed as one weight derivation mode and two prediction modes. The weight derivation mode is used to determine a weight matrix or weights, and the two prediction modes are each used determine a prediction block or prediction value. The weight derivation mode is sometimes referred to as a partitioning mode, but since it is simulated partitioning, the disclosure tends to refer to the partitioning mode as a weight derivation mode.

Optionally, the two prediction modes may come from the same or different prediction modes, where the prediction mode includes but is not limited to intra prediction, inter prediction, IBC, and palette.

A specific example is as follows. GPM is adopted for the current block and this example is used for an inter-coded block, the intra prediction and the merge mode in the inter prediction are allowed to be used. As illustrated in Table 4, a syntax element intra_mode_idx is added, so as to indicate which prediction mode is an intra prediction mode. For example, if intra_mode_idx=0, it indicates that two prediction modes each are an inter prediction mode, that is, mode0IsInter=1 and mode1IsInter=1. If intra_mode_idx=1, it indicates that a first prediction mode is an intra prediction mode and a second prediction mode is an inter prediction mode, that is, mode0IsInter=0 and mode1IsInter=1. If intra_mode_idx=2, it indicates that the first prediction mode is an inter prediction mode and the second prediction mode is an intra prediction mode, that is, mode0IsInter=1 and mode1IsInter=0. If intra_mode_idx=3, it indicates that the two prediction modes each are an intra prediction mode, that is, mode0IsInter=0, and mode1IsInter=0.

TABLE 4

```
{
    merge_gpm_partition_idx[x0][y0]                          ae(v)
    intra_mode_idx[x0][y0]                                   ae(v)
    if( mode0IsInter )
        merge_gpm_idx0[x0][y0]                               ae(v)
        if( (!mode0IsInter && mode1IsInter) ||
    (MaxNumGpmMergeCand > 2 && mode0IsInter &&
    mode1IsInter))
            merge_gpm_idx1[x0][y0]                           ae(v)
}
```

Figure 12:
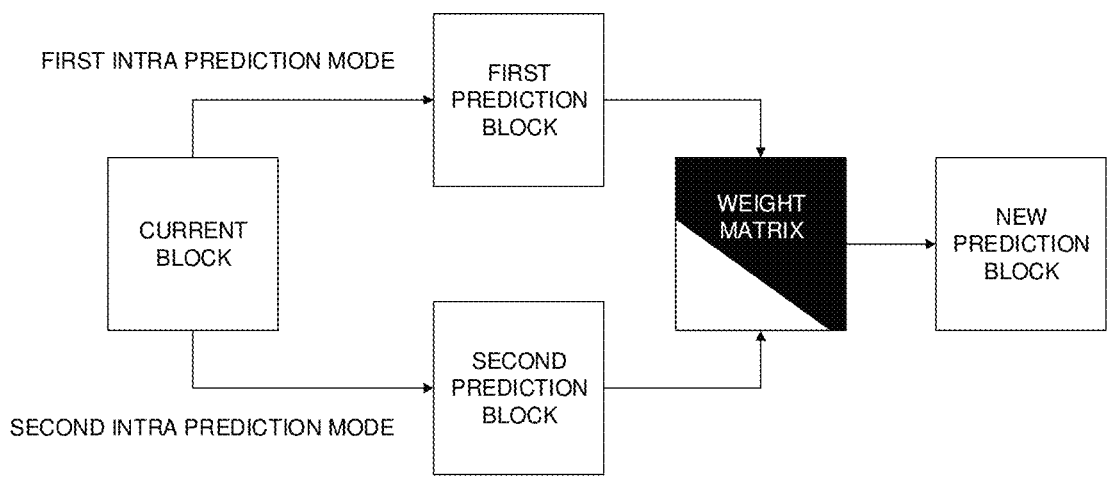
FIG. 12 is a schematic diagram illustrating weighted intra prediction.

In some embodiments, as illustrated in FIG. 12, a GPM decoding process may be expressed as follows. A bitstream is parsed to determine whether a GPM technology is adopted for the current block. If the GPM technology is adopted for the current block, a weight derivation mode (or a "partitioning" mode or a weight matrix derivation mode), a first intra prediction mode, and a second intra prediction mode are determined. A first prediction block is determined according to the first intra prediction mode, a second prediction block is determined according to the second intra prediction mode, a weight matrix is determined according to the weight matrix derivation mode, and a prediction block of the current block is determined according to the first prediction block, the second prediction block, and the weight matrix.

Template matching is originally used in inter prediction. In template matching, by utilizing correlation between neighbouring samples, some regions neighbouring the current block are taken as a template. Before coding the current block, blocks on the left and the top of the current block have already been coded according to a coding order. However, when implemented by an existing hardware decoder, it may not be ensured that blocks on the left and the top of the current block have already been decoded before decoding the current block, where the current block is an inter block. For example, in HEVC, when generating a prediction block for an inter-coding block, neighbouring reconstructed samples are not required, and therefore, a prediction process for the inter block may be performed in parallel. However, for an intra-coding block, reconstructed samples on the left and on the top are required as reference samples. Theoretically, samples on the left and on the top are available, that is, this can be realized by making corresponding adjustments on hardware design. Samples on the right and on the bottom are unavailable based on a coding order in an existing standard such as VVC.

Figure 13:
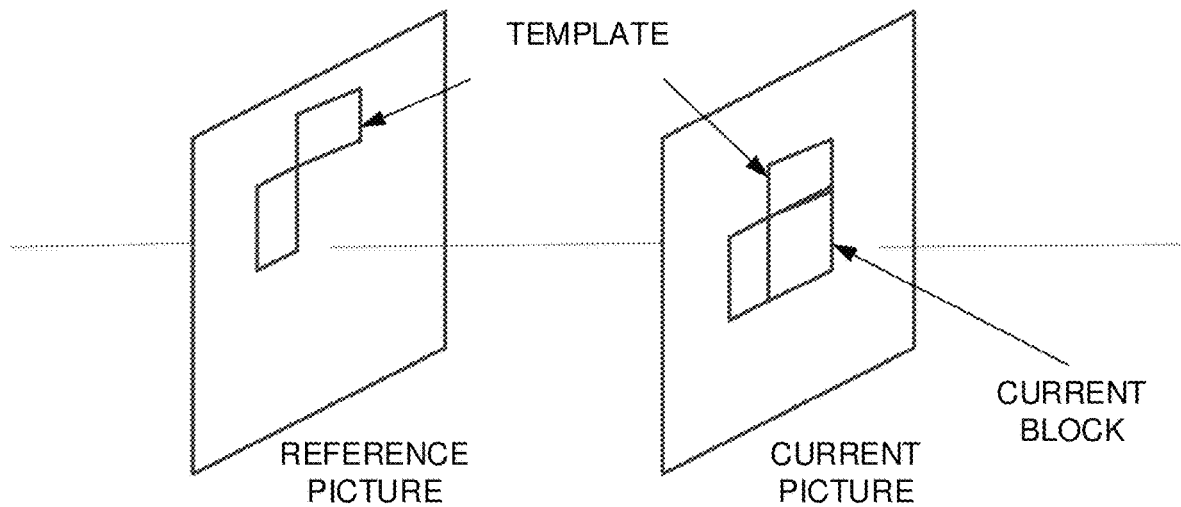
FIG. 13 is a schematic diagram illustrating template matching.

As illustrated in FIG. 13, rectangular regions on the left and the top of the current block are set as a template, where a height of the left part of the template is usually the same as a height of the current block, and a width of the top part of the template is usually the same as a width of the current block. The template may also have a different height or width from the current block. A best matching position of the template is found in a reference picture, so as to determine motion information or a motion vector of the current block. This process may be generally described as follows. In a certain reference picture, search within a certain range starting from a start position. A search rule may be preset, such as a search range and a search step size. Upon moving to a position each time, a degree of matching between a template corresponding to the position and a template neighbouring the current block is calculated. The degree of matching may be measured according to some distortion costs, such as a sum of absolute difference (SAD) and a sum of absolute transformed difference (SATD). A transform used in the SATD is usually a Hadamard transform or a mean-square error (MSE). A lower value of the SAD, the SATD, or the MSE indicates a higher degree of matching. A cost is calculated based on a prediction block of the template corresponding to the position and a reconstructed block of the template neighbouring the current block. In addition to searching for a position of an integer sample, searching for a position of a fractional sample may also be performed. The motion information of the current block is determined according to a position with the highest degree of matching found through searching. Due to correlation between neighbouring samples, motion information suitable for the template may also be motion information suitable for the current block. Template matching may not be applicable to some blocks, and therefore, whether template matching is used for the current block may be determined according to some methods, for example, a control switch is used for the current block to indicate whether to use template matching. Such template matching is also called decoder side motion vector derivation (DMVD). Both an encoder and a decoder may perform searching based on a template to derive motion information or find better motion information based on original motion information. In order to ensure consistency between encoding and decoding, the encoder and the decoder perform searching based on the same rule instead of transmitting a specific motion vector or motion vector difference. With template matching, it is possible to improve compression performance, but the decoder still needs to perform searching, which causes increase in decoder complexity.

The above is a method for applying template matching to inter prediction. Template matching may also be applied to intra prediction, for example, a template is used to determine an intra prediction mode. For the current block, a region within a certain range from the top and the left of the current block may be used as a template, such as a left rectangular region and a top rectangular region illustrated in the foregoing figure. When coding the current block, reconstructed samples in the template are available. This process may be generally described as follows. A set of candidate intra prediction modes is determined for the current block, where the candidate intra prediction modes constitute a subset of all available intra prediction modes, or the candidate intra prediction modes may be a universal set of all available intra prediction modes, which may be determined based on the trade-off between performance and complexity. The set of candidate intra prediction modes may be determined according to an MPM or some rules, such as equidistant screening. A cost, such as the SAD, the SATD, and the MSE, of each candidate intra prediction mode for the template is calculated. Prediction is performed on the template according to the mode to obtain a prediction block, and the cost is calculated according to the prediction block and a reconstructed block of the template. A mode with lower cost may match the template better, and due to similarity between neighbouring samples, an intra prediction mode that matches well with the template may also be an intra prediction mode that matches well with the current block. One or more modes with low cost are selected. The foregoing two steps may be repeated. For example, after one or more modes with low cost are selected, a set of candidate intra prediction modes is determined, cost is calculated for the newly determined set of candidate intra prediction modes, and one or more modes with lower cost are selected. This may also be understood as a rough selection and a fine selection. The one intra prediction mode finally chosen is determined as the intra prediction mode for the current block, or several intra prediction modes finally chosen are taken as candidates of the intra prediction mode for the current block. The set of candidate intra prediction modes may also be sorted by means of template matching. For example, an MPM list is sorted, that is, for each mode in the MPM list, a prediction block is obtained for the template according to the mode and a cost thereof is determined, and these modes are sorted in an ascending order of cost. Generally, a mode at the front in the MPM list leads to lower overhead in a bitstream, which can also improve compression efficiency.

Template matching may be used to determine two prediction modes of GPM. If template matching is used for GPM, one control switch may be used for the current block to control whether template matching is used for the two prediction modes for the current block, or two control switches may be used respectively to control whether template matching is used for each of the two prediction modes.

Another aspect is how to use template matching. For example, if GPM is used in the merge mode, for example, in GPM in VVC, merge_gpm_idxX is used to determine motion information from mergeCandList, where X=0 or 1. For $X^{th}$ motion information, one method is to perform optimization by means of template matching based on the foregoing motion information. That is, the motion information is determined from mergeCandList according to merge_gpm_idxX. If template matching is used for the motion information, template matching is used to perform optimization based on the motion information. Another method is to determine the motion information directly by searching based on default motion information, instead of using merge_gpm_idxX to determine the motion information from mergeCandList.

If an $X^{th}$ prediction mode is an intra prediction mode and template matching is used for an $X^{th}$ prediction mode for the current block, template matching may be used to determine an intra prediction mode, and an index of the intra prediction mode does not need to be indicated in a bitstream. Alternatively, a candidate set or an MPM list is determined by means of template matching, and an index of the intra prediction mode needs to be indicated in a bitstream.

In GPM, after determining the weight derivation mode, a region occupied by each prediction mode may be determined. Here, the region occupied may be understood as a region in which a weight corresponding to the prediction mode is the maximum, or a region in which the weight corresponding to the prediction mode is greater than or equal to a threshold. The reason why compression performance can be improved with aid of GPM is that the two parts "partitioned" based on GPM are different, and therefore, when determining a prediction mode of GPM by means of template matching, the template may also be partitioned. In the related art, the template may be classified into three types, i.e. left, top, and both (left and top). Partitioning of the template depends on a weight derivation mode. Exemplarily, as illustrated in Table 5, in the related art, partitioning of the template depends on a "partition" angle or a "partition" angle index angleIdx.

TABLE 5

| "Partition" angle index | Template corresponding to first prediction mode | Template corresponding to second prediction mode |
| --- | --- | --- |
| 0 | TM_A | TM_AL |
| 1 | / | / |
| 2 | TM_A | TM_AL |
| 3 | TM_A | TM_AL |
| 4 | TM_A | TM_L |
| 5 | TM_AL | TM_L |
| 6 | / | / |
| 7 | / | / |
| 8 | TM_AL | TM_L |
| 9 | / | / |
| 10 | / | / |
| 11 | TM_AL | TM_L |
| 12 | TM_AL | TM_AL |
| 13 | TM_A | TM_AL |
| 14 | TM_A | TM_AL |
| 15 | / | / |
| 16 | TM_A | TM_AL |
| 17 | / | / |
| 18 | TM_A | TM_AL |
| 19 | TM_A | TM_AL |
| 20 | TM_A | TM_L |
| 21 | TM_AL | TM_L |
| 22 | / | / |
| 23 | / | / |
| 24 | TM_AL | TM_L |
| 25 | / | / |
| 26 | / | / |
| 27 | TM_AL | TM_L |
| 28 | TM_AL | TM_AL |
| 29 | TM_A | TM_AL |
| 30 | TM_A | TM_AL |
| 31 | / | / |

For example, the template on the left is denoted as TM_A, the template on the top is denoted as TM_L, and both (left and top) templates are denoted as TM_AL. A relationship between templates and "partition" angle indices is illustrated in Table 5. Some angle indices such as 1, 6, and 7 are not used in the current GPM, and therefore there is no corresponding template, which is denoted by /.

Template partitioning according to the weight derivation mode does take into consideration a difference between the two parts "partitioned" by means of GPM, but such partitioning is not fine enough. The reason is that the template is partitioned only into two parts, i. e. the left and the top, but it can be seen from the weight map that a boundary line may fall into various positions. The boundary line may be regarded as a line consisting of samples whose weight is a median value in a weight matrix. In the current GPM, the boundary line is a straight line, and if there is no integer sample whose weight is a median value in an actual weight matrix, fractional samples may be used for replacement, or samples with other weights may also be used. If prediction mode matching is performed by using the template illustrated in Table 5, a prediction mode matched is inaccurate, which results in low prediction accuracy and poor encoding effect.

In order to solve the foregoing technical problem, in embodiments of the disclosure, a template weight is determined according to a weight derivation mode, and then at least one of K prediction modes is determined according to the template weight. That is, in the disclosure, a template is simulately partitioned according to the weight. Template partitioning may differ under different block shapes, but in the method of the disclosure, there is no need to set various rules for blocks of various shapes, thereby improving accuracy and convenience of template partitioning. Since a prediction mode is derived based on a template partitioned accurately, it is possible to ensure accuracy of the prediction mode derived, thereby improving encoding effect.

A video decoding method provided in embodiments of the disclosure will be described below with reference to FIG. 14 by taking a decoding end as an example.

Figure 14:
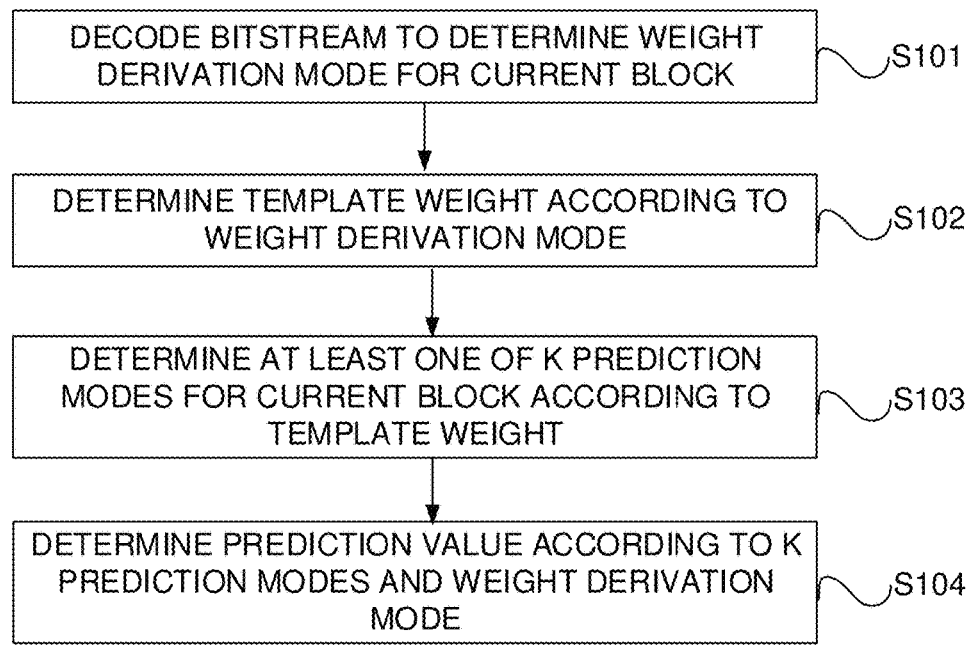
FIG. 14 is a schematic flowchart of a prediction method provided in an embodiment of the disclosure.

FIG. 14 is a schematic flowchart of a prediction method provided in an embodiment of the disclosure. The embodiment of the disclosure is applied to the video decoder illustrated in each of FIG. 1 and FIG. 3. As illustrated in FIG. 14, the method of the embodiment of the disclosure includes the following.

S101, a bitstream is decoded to determine a weight derivation mode for a current block.

It should be noted that, in the disclosure, the weight derivation mode is used to determine a weight used for the current block. Specifically, the weight derivation mode may be a mode for deriving a weight. For a block of a given length and width, each weight derivation mode may be used to derive one weight matrix. For blocks of the same size, weight matrices derived from different weight derivation modes may be different.

Exemplarily, in the disclosure, AWP has 56 weight derivation modes, and GPM has 64 weight derivation modes.

In the disclosure, the manner in which the weight derivation mode for the current block is determined at a decoding end includes, but is not limited to, the following manners.

Manner 1: At the decoding end, a weight derivation mode which is the same as that at an encoding end is chosen by default, for example, a weight derivation mode whose index is 44 is chosen at both the decoding end and the encoding end.

Manner 2: At the encoding end, an index of a weight derivation mode used for an encoding process is carried in the bitstream. In this way, at the decoding end, the weight derivation mode for the current block can be obtained by decoding the bitstream.

Manner 3: The weight derivation mode is determined in the same manner as the encoding end. For example, at the decoding end, all possible combinations of K prediction modes and the weight derivation mode are attempted, where K is a positive integer and K>1, and a weight derivation mode corresponding to the minimum cost is selected and determined as the weight derivation mode for the current block.

Taking K=2 as an example, the K prediction modes include a first prediction mode and a second prediction mode. Assuming that there are 66 available prediction modes, then there are 66 possibilities for the first prediction mode, and since the second prediction mode is different from the first prediction mode, there are 65 possibilities for the second prediction mode. Assuming that there are 64 weight derivation modes (taking GPM as an example), then in the disclosure, any two different prediction modes and any one weight derivation mode may be used, and there are totally 66×65×64 possibilities. If it is specified that a pulse code modulation (PCM) prediction mode is not used, there are 65×64×63 possibilities. As can be seen, in the disclosure, the prediction modes that can be selected from and the number of weight derivation modes that can be used may also be restricted, and then the number of such possible combinations is reduced accordingly.

Further, in embodiments of the disclosure, at the decoding end, cost may be calculated for all possible combinations to determine a combination with the minimum cost.

If K=2, each combination is a combination of the first prediction mode, the second prediction mode, and the weight derivation mode.

Optionally, in order to reduce time consumption of cost calculation, preliminary selection may be made on all the foregoing possible combinations, for example, preliminary selection is made by using an SAD, an SATD, etc. as an approximate cost to determine a specified number of candidate combinations of the first prediction mode, the second prediction mode, and the weight derivation mode. Then, more elaborate cost calculation is performed for fine selection, to determine a combination of the first prediction mode, the second prediction mode, and the weight derivation mode with the minimum cost. In this way, the number of attempts is reduced by using some fast algorithms during preliminary selection. For example, if an angular prediction mode leads to high cost, several neighbouring prediction modes of the prediction mode will not be attempted.

It can be understood that in the disclosure, during both preliminary selection and fine selection, a first prediction value will be determined according to the first prediction mode, a second prediction value will be determined according to the second prediction mode, the weights will be derived according to the weight derivation mode, and the prediction value in the disclosure will be determined according to the first prediction value, the second prediction value, and the weights. During SAD and SATD preliminary selection, the SAD and SATD are determined by using the current block and the prediction value corresponding to the current block. It should be noted that, deriving the weight according to the weight derivation mode may be understood as deriving a weight corresponding to each sample in the current block, or may be understood as deriving a weight matrix corresponding to the current block. When determining the prediction value of the current block based on the weights, the first prediction value and the second prediction value corresponding to each sample in the current block are determined, and the prediction value corresponding to each sample is determined according to the first prediction value, the second prediction value, and the weights corresponding to each sample, where the prediction value corresponding to each sample in the current block constitute the prediction value of the current block. Optionally, the prediction of the current block may be determined based on the weights on the block basis. For example, the first prediction value and the second prediction value of the current block are determined, and the first prediction value and the second prediction value of the current block are weighted according to the weight matrix of the current block to obtain a new prediction value of the current block.

In some embodiments, at the decoding end, before determining the weight derivation mode for the current block, whether to use two different prediction modes for weighted prediction of the current block needs to be determined. If it is determined at the decoding end that two different prediction modes are used for weighted prediction of the current block, S101 is performed to determine the weight derivation mode for the current block.

In a possible implementation, at the decoding end, whether to use two different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether two different prediction modes can be used for prediction of the current block.

It can be understood that, in the embodiment of the disclosure, the prediction mode parameter may be understood as a flag bit indicating whether the GPM mode or the AWP mode is used. Specifically, at the encoding end, a variable may be used as the prediction mode parameter, so that the prediction mode parameter may be set by setting a value of the variable. Exemplarily, in the disclosure, if the GPM mode or the AWP mode is used for the current block, at the encoding end, a value of the prediction mode parameter may be set to indicate that the GPM mode or the AWP mode is used for the current block. Specifically, the value of the variable may be set to 1 at the encoding end. Exemplarily, in the disclosure, if the GPM mode or the AWP mode is not used for the current block, at the encoding end, the value of the prediction mode parameter may be set to indicate that the GPM mode or the AWP mode is not used for the current block. Specifically, the value of the variable may be set to 0 at the encoding end. Further, in the embodiment of the disclosure, after setting of the prediction mode parameter is completed, at the encoding end, the prediction mode parameter may be signalled into the bitstream and transmitted to the decoding end, so that at the decoding end, the prediction mode parameter may be obtained after parsing the bitstream.

Based on this, at the decoding end, the bitstream is decoded to obtain the prediction mode parameter, whether the GPM mode or the AWP mode is used for the current block is determined according to the prediction mode parameter, and if the GPM mode or the AWP mode is used for the current block, i. e. K different prediction modes are used for prediction, the weight derivation mode for the current block is determined.

It should be noted that, in the embodiment of the disclosure, the GPM mode or the AWP mode is a prediction method. Specifically, K different prediction modes are determined for the current block, K prediction values are determined according to the K different prediction modes, and then weights are determined to combine the K prediction values according to the weights, so as to obtain a new prediction value.

The K different prediction modes for the current block include the following examples.

Example 1: The K different prediction modes each are an intra prediction mode.

Example 2: The K different prediction modes each are an inter prediction mode.

Example 3: At least one of the K different prediction modes is an intra prediction mode, and at least one of the K different prediction modes is an inter prediction mode.

Example 4: At least one of the K different prediction modes is an intra prediction mode, and at least one of the K different prediction modes is a non-intra and non-inter prediction mode, for example, an intra block copy (IBC) prediction mode or a palette prediction mode.

Example 5: At least one of the K different prediction modes is an inter prediction mode, and at least one of the K different prediction modes is a non-intra and non-inter prediction mode, for example, an IBC prediction mode or a palette prediction mode.

Example 6: None of the K different prediction modes is an intra prediction mode or an inter prediction mode. For example, one is an IBC prediction mode, and another is a palette prediction mode.

It should be noted that, there is no limitation on the types of the foregoing K different prediction modes in embodiments of the disclosure.

Figure 15:
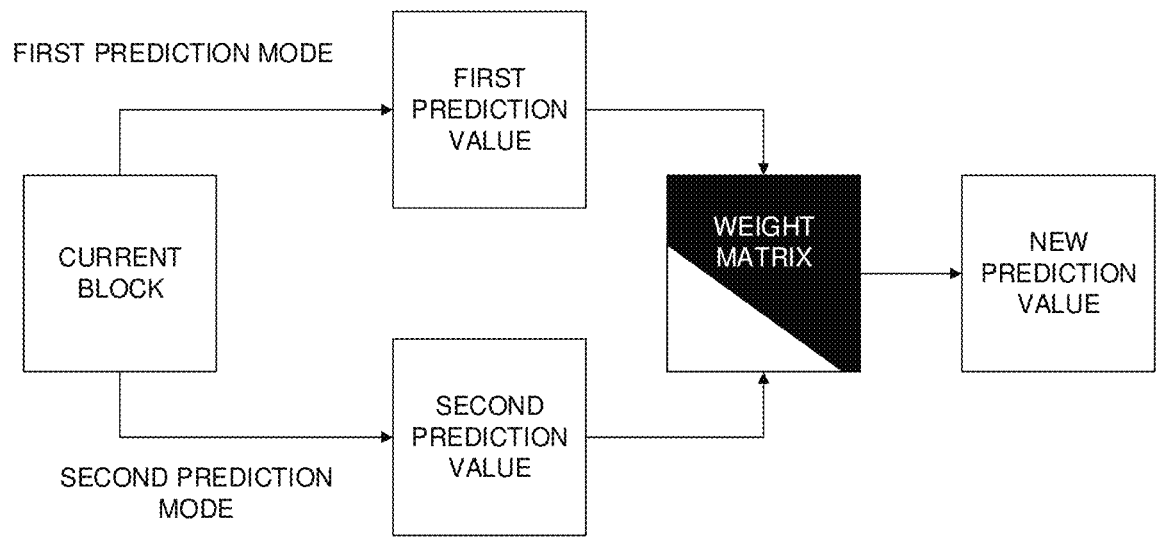
FIG. 15 is a schematic diagram illustrating prediction of a current block by using two prediction modes.

FIG. 15 is a schematic diagram illustrating prediction of the current block by using two prediction modes. As illustrated in FIG. 15, when predicting the current block, the first prediction mode may be used to determine the first prediction value, the second prediction mode may be used to determine the second prediction value, and then the first prediction value and the second prediction value may be combined based on weights, so as to obtain a new prediction value.

In some embodiments, limitations may be imposed on a size of the current block when applying the GPM mode or the AWP mode.

It may be understood that, in the prediction method provided in the embodiment of the disclosure, it is necessary to use the K different prediction modes to generate the K prediction values, which are then weighted to obtain a new prediction value, in order to reduce complexity while considering the trade-off between compression performance and complexity, the GPM mode or the AWP mode may not be used for blocks with certain sizes in the embodiment of the disclosure. Therefore, in the disclosure, at the decoding end, a size parameter of the current block may be firstly determined, and then whether to use the GPM mode or the AWP mode for the current block is determined according to the size parameter.

It should be noted that, in the embodiment of the disclosure, the size parameter of the current block may include a height and a width of the current block, and therefore, at the decoding end, the use of the GPM mode or the AWP mode may be restricted based on the height and the width of the current block.

Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold.

Exemplarily, in the disclosure, if the width of the current block is less than a third threshold and the height of the current block is greater than a fourth threshold, it is determined that the GPM mode or the AWP mode is used for the current block. As can be seen, one possible limitation is to use the spatial angular weighted prediction (SAWP) mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

Further, in the embodiment of the disclosure, limitation on the size of a block for which the GPM mode or the AWP mode can be used may also be implemented through limitations on the sample parameter.

Exemplarily, in the disclosure, at the decoding end, a sample parameter of the current block may be firstly determined, and then whether the GPM mode or the AWP mode can be used for the current block may be determined according to the sample parameter and a fifth threshold. As can be seen, one possible limitation is to use the GPM mode or the AWP mode only when the number of samples in the block is greater than (or greater than or equal to) the fifth threshold. The value of the fifth threshold may be 8, 16, 32, etc.

That is, in the disclosure, the GPM mode or the AWP mode can be used for the current block only when the size parameter of the current block satisfies a size requirement.

Exemplarily, in the disclosure, a flag at a picture level may be used to determine whether the disclosure is applied to the current decoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture level but above a CU level (such as tile, slice, patch, LCU, etc.) may be used to determine whether the disclosure is applied to that region.

S102, a weight(s) of a template (also referred to as "template weight") is determined according to the weight derivation mode.

In template matching, by utilizing correlation between neighbouring samples, some regions neighbouring the current block are taken as a template. Before coding the current block, blocks on the left and the top of the current block have already been decoded according to a coding order. In inter prediction, a best matching position of the template is found in a reference picture to determine motion information or a motion vector of the current block. In intra prediction, an intra prediction mode for the current block is determined by using the template.

There is no limitation on the shape of the template of the current block in the disclosure.

In some embodiments, the template includes at least one of a top decoded region, a left decoded region, or a top-left decoded region of the current block.

Optionally, a width of the top decoded region is the same as a width of the current block, a height of the left decoded region is the same as a height of the current block, a width of the top-left decoded region is the same as a width of the left decoded region, and a height of the top-left decoded region is the same as a height of the top decoded region.

Figure 16:
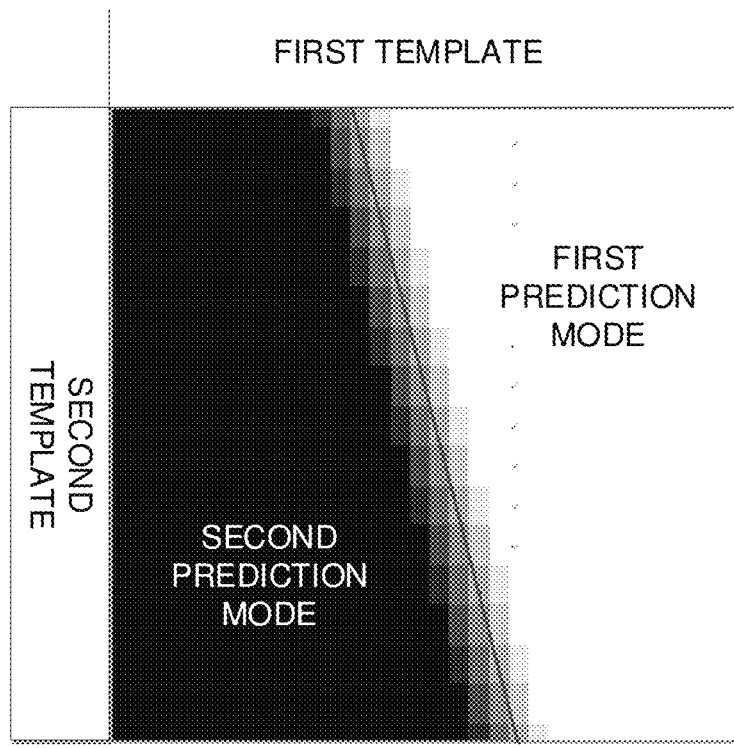
FIG. 16 is a schematic diagram illustrating template partitioning.

As illustrated in Table 5 above, a template corresponding to the first prediction mode and a template corresponding to the second prediction mode each are a top decoded region of the current block, or a left decoded region of the current block, or a left decoded region and a top decoded region of the current block. In this way, during template matching, the template corresponding to the first prediction mode is used to determine the first prediction mode, and the template corresponding to the second prediction mode is used to determine the second prediction mode. For example, as illustrated in FIG. 16, taking a weight derivation mode whose GPM index is 2 as an example, a white area in a weight matrix of the current block is a weight corresponding to a prediction value of the first prediction mode, and a black area is a weight corresponding to a prediction value of the second prediction mode. As illustrated in FIG. 16, a first template corresponding to the first prediction mode is a top decoded region of the current block, a second template corresponding to the second prediction mode is a left decoded region of the current block, but a template close to the second prediction mode further includes part of the top decoded region besides the left region. Therefore, in the related art, template partitioning is not fine enough, and as a result, if a prediction mode is determined based on a template that is not fine enough, prediction mode determination will be inaccurate and prediction error will be high.

Figure 17A:
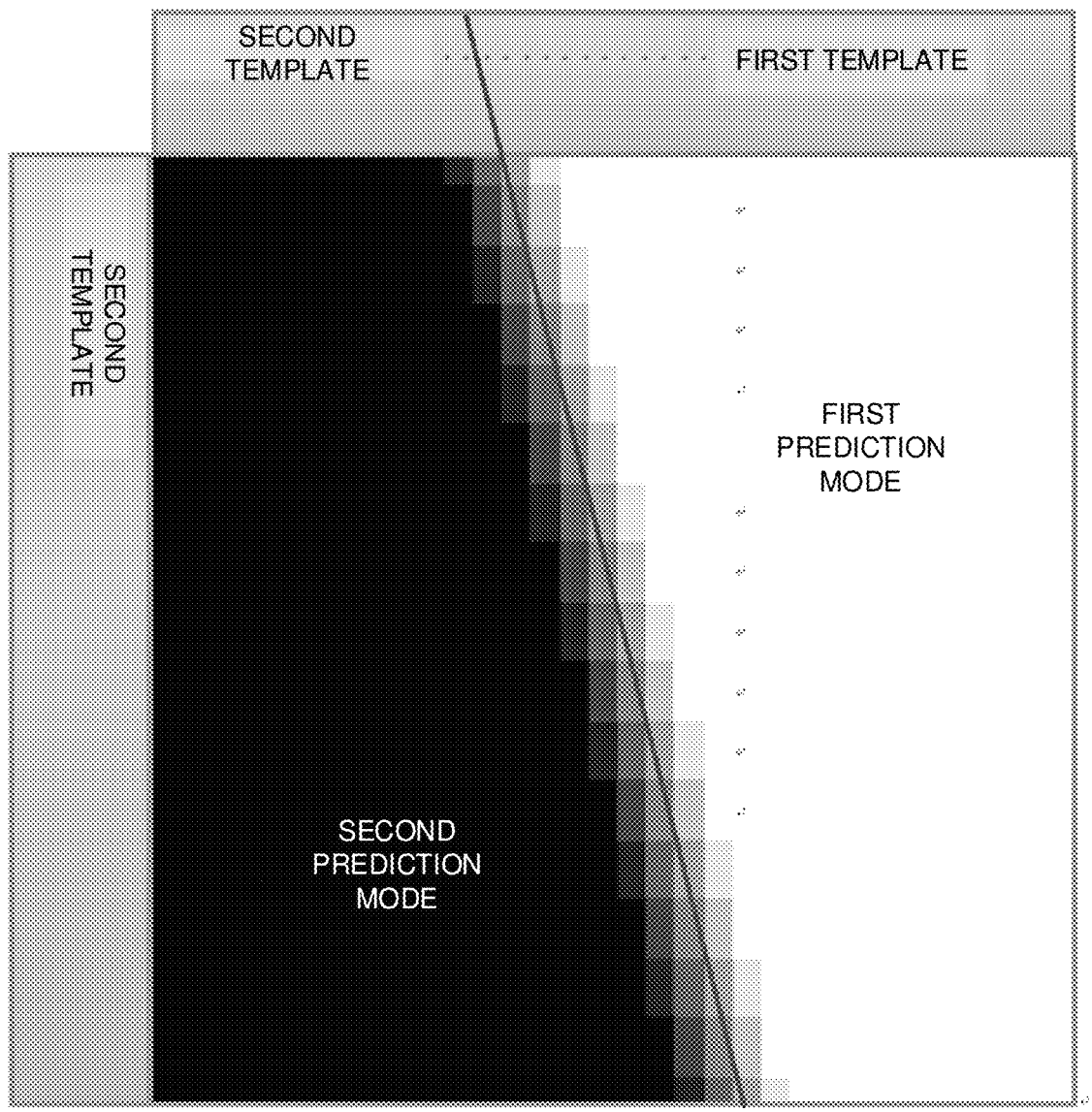
FIG. 17A is another schematic diagram illustrating template partitioning.

In order to solve the technical problem, in the disclosure, a finer partitioning of template can be achieved with aid of the weight derivation mode. For example, as illustrated in FIG. 17A, in the disclosure, a boundary line of a weight matrix corresponding to the weight derivation mode for the current block is extended to a template region for template partitioning. For example, a template on the right of the boundary line is referred to as a first template, and a template on the left of the boundary line is referred to as a second template. The first template corresponds to the first prediction mode, the second prediction mode corresponds to the second template, a weight of the first template is determined according to a weight corresponding to the first prediction mode, and a weight of the second template is determined according to a weight corresponding to the second prediction mode, for example, the weight of the first template is the same as the weight corresponding to the first prediction mode, and the weight of the second template is the same as the weight corresponding to the second prediction mode. During template matching, the first template may be used to derive the first prediction mode, and the second template may be used to derive the second prediction mode, thereby determining a prediction mode accurately and improving decoding effect.

In some embodiments, the first template and the second template partitioned according to the above method may not be rectangular. For example, as illustrated in FIG. 17A, the first template and the second template each have an oblique edge, and cost calculation for an irregular template is relatively complex.

Figure 17B:
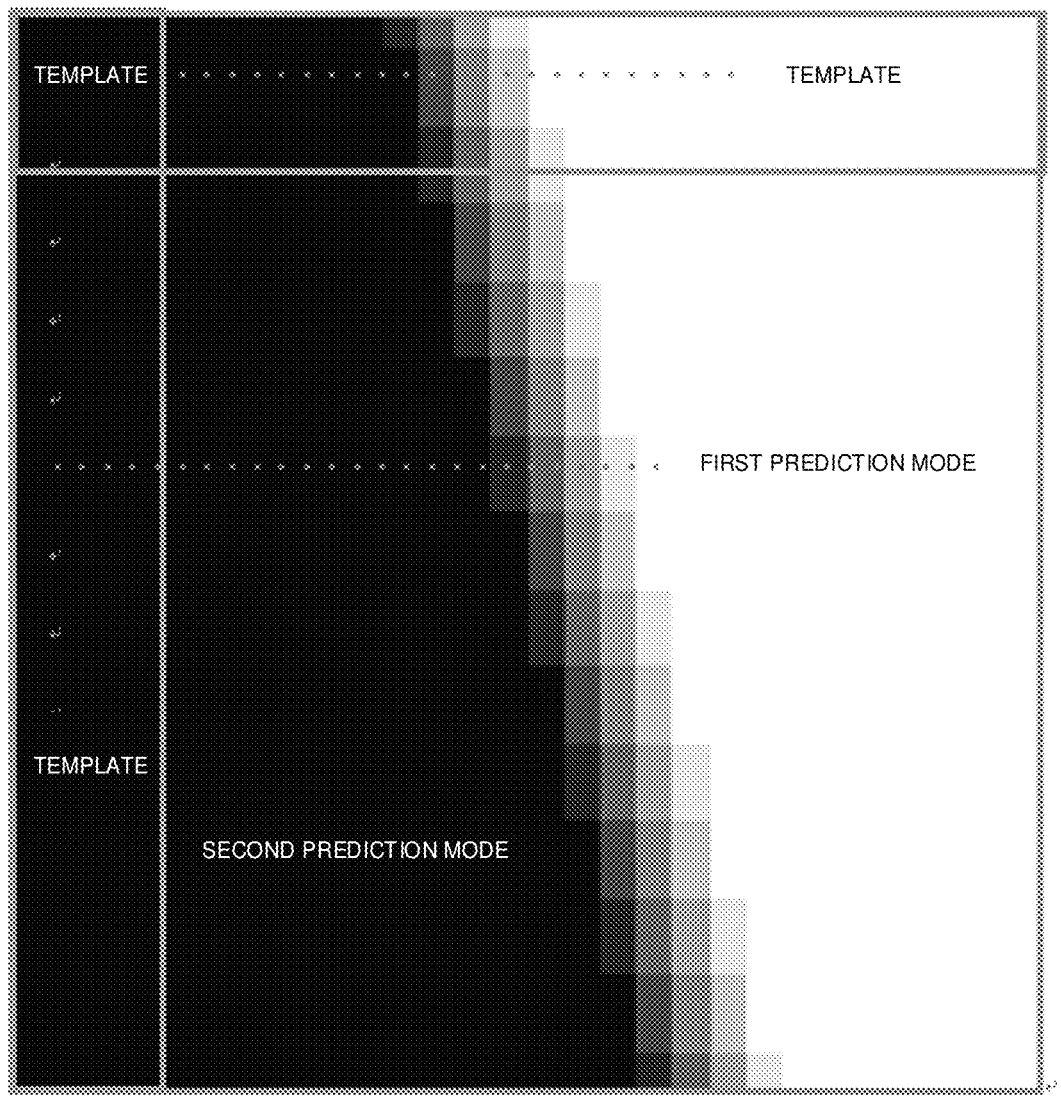
FIG. 17B is another schematic diagram illustrating template partitioning.

In order to reduce complexity of template matching, in some embodiments, the weight matrix may be directly extended to a template region, for example, extended leftwards and upwards to cover the template, so as to determine the template weight. For example, as illustrated in FIG. 17B, a small rectangular region in the top-left of the current block may be added to the template, so that the template and the current block can constitute a rectangle. Alternatively, only the left part and the top part may be used as the template. As illustrated in FIG. 17B, the top-left region is exemplarily added, and regions in the left, the top-left, and the top in an upside-down L-shaped region are a template region, and a bottom-right rectangular region is the current block. In this case, part of the weight matrix extended to the top-left becomes a weight matrix of the template. In this way, the template does not need to be actually partitioned, but is simulately partitioned according to weights, that is, template partitioning is simulated according to a weight derivation mode, or a template weight is determined according to a weight derivation mode, and a cost of template matching is determined according to the template weight. Template partitioning may differ under different block shapes, but in the disclosure, there is no need to set various rules for blocks of various shapes, for example, there is no need to set a correspondence between prediction modes and templates as illustrated in Table 5. In addition, with regard to accuracy of "partitioning", the simulated partitioning in the disclosure is more precise and accurate than a method in which only a left region and a top region are differentiated.

In some embodiments, the left region and the top region of the current block illustrated in FIG. 17B may be used as the template of the current block, without considering the top-left matrix region.

During template matching, only one component (Y, Cb, Cr or R, G, B) may be used, for example, Y may be used in a YUV format because Y is dominant. Alternatively, all components may be used. For ease of illustration, one component is taken as an example for illustration in the disclosure, for example, template matching is performed exemplarily on a Y component, and the same applies to other components.

In the embodiment of the disclosure, the process of deriving the template weight according to the weight derivation mode may be combined with the process of deriving a weight of a prediction value, for example, the template weight and the weight of the prediction value are derived at the same time, where the weight of the prediction value may be understood as a weight corresponding to the prediction value. For example, the first prediction value is obtained according to the first prediction mode, the second prediction value is obtained according to the second prediction mode, a first weight of the first prediction value is determined according to the weight derivation mode, a second weight of the second prediction value is determined according to the weight derivation mode, and a sum of a product of the first prediction value and the first weight and a product of the second prediction value and the second weight is determined as a new prediction value.

In the disclosure, in order to distinguish from the template weight, the first weight and the second weight each are referred to as a weight of a prediction value.

In some embodiments, S102 includes the following steps S102-A and S102-B.

S102-A, an angle index and a distance index are determined according to the weight derivation mode.

S102-B, the template weight is determined according to the angle index, the distance index, and a size of the template.

In the disclosure, the template weight may be derived in the same manner as deriving a weight of a prediction value. For example, the angle index and the distance index are firstly determined according to the weight derivation mode, where the angle index may be understood as an angle index of a boundary line of each weight derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the template weight is determined according to the angle index, the distance index, and the size of the template.

The manner for deriving the template weight according to the weight derivation mode in S102-B includes, but is not limited to, the following manners.

Manner I: The template weight is determined directly according to the angle index, the distance index, and the size of the template. In this case, S102-B includes the following steps S102-B11 to S102-B13.

S102-B11, a first parameter of a sample in the template is determined according to the angle index, the distance index, and the size of the template.

S102-B12, a weight of the sample in the template is determined according to the first parameter of the sample in the template.

S102-B13, the template weight is determined according to the weight of the sample in the template.

In this implementation, the weight of the sample in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined in the following manner.

Figure 18:
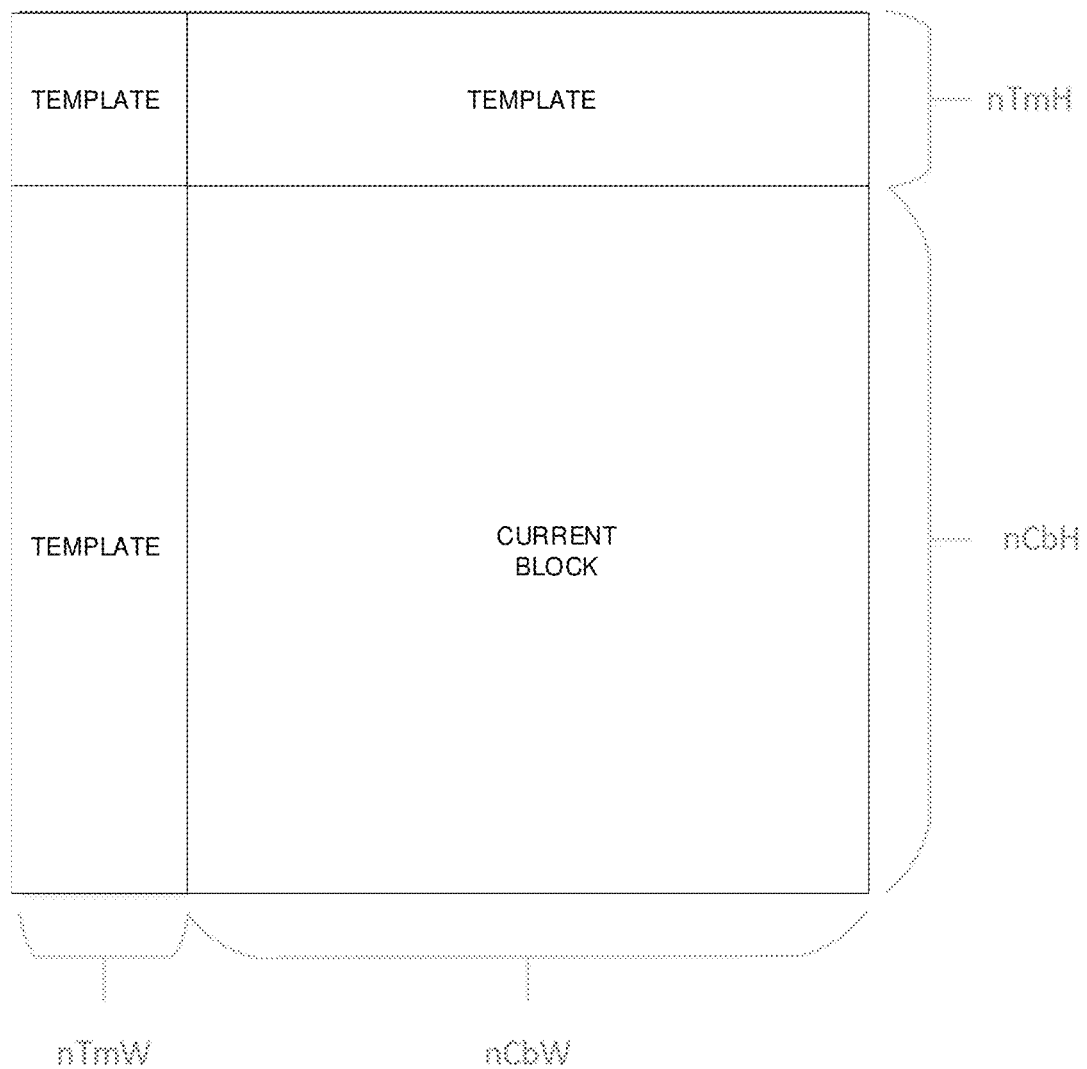
FIG. 18 is a schematic diagram illustrating a size of a template.

Inputs to the process of deriving the template weight are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

$$nW = (cIdx == 0)\,?\,nCbW : nCbW * SubWidthC$$

$$nH = (cIdx == 0)\,?\,nCbH : nCbH * SubHeightC$$

$$shift1 = \mathrm{Max}(5, 17 - BitDepth),$$

where BitDepth represents a coding bit depth;

$$offset1 = 1 \ll (shift1 - 1)$$

-continued $$displacementX = angleIdx$$

$$displacementY = (angleIdx + 8) \% 32$$

$$partFlip = (angleIdx >= 13 \&\& angleIdx <= 27)?0:1$$

$$shiftHor = (angleIdx \%16 == 8 || (angleIdx \%16 != 0 \&\& nH >= nW))?0:1$$

Offsets offsetX and offsetY are derived as follows:

if $shiftHor = 0$:

$$offsetX = (-nW) \gg 1$$

$$offsetY = ((-nH) \gg 1) +$$
$$\bigl(angleIdx < 16?(distanceIdx * nH) \gg 3: - ((distanceIdx * nH) \gg 3)\bigr)$$

otherwise (i.e. $ShiftHor = 1$):

$$offsetX = ((-nW) \gg 1) +$$
$$\bigl(angleIdx < 16?(distanceIdx * nW) \gg 3: - ((distanceIdx * nW) \gg 3)\bigr)$$

$$offsetY = (-nH) \gg 1$$

A weight matrix wTemplateValue[x][y] (where x=−nTmW ... nCbW−1, y=−nTmH ... nCbH−1, except for the case where x≥0 and y≥0) of the template is derived as follows (it should be noted that in this example, the coordinate of a top-left corner of the current block is (0, 0)):

variables xL and yL are derived as follows:

$$xL = (cIdx == 0)?x:x * SubWidthC$$

$$yL = (cIdx == 0)?y:y * SubHeightC$$

disLut is determined according to Table 3 above;

the first parameter weightIdx is derived as follows:

$$weightIdx = (((xL + offsetX) \ll 1) + 1) * disLut[displacementX] +$$
$$(((yL + offsetY) \ll 1) + 1) * disLut[displacementY]$$

After the first parameter weightIdx is determined according to the foregoing method, a weight of a sample (x, y) in the template is determined according to weightIdx.

In the disclosure, the manner for determining the weight of the sample in the template according to the first parameter of the sample in the template in S102-B12 includes, but is not limited to, the following manners.

Manner 1: A second parameter of the sample in the template is determined according to the first parameter of the sample in the template, and the weight of the sample in the template is determined according to the second parameter of the sample in the template.

The second parameter is also used for determining a weight. In some embodiments, the second parameter is also referred to as a weight index for a first component, and the first component may be a luma component, a chroma component, or the like.

For example, the weight of the sample in the template is determined according to the following formula:

$$weightIdxL = partFlip?32 + weightIdx:32 - weightIdx$$

$$wTemplateValue[x][y] = Clip3(0, 8, (weightIdxL + 4) \gg 3)$$

wTemplateValue[x][y] is the weight of the sample (x, y) in the template. weightIdxL is the second parameter of the sample (x, y) in the template, and is also referred to as a weight index for the first component (for example, a luma component). wTemplateValue[x] [y] is the weight of the sample (x, y) in the template. partFlip is an intermediate variable, and is determined according to the angle index angleIdx, for example, partFlip=(angleIdx>=13 && angleIdx<=27)?0:1 as described above, that is, partFlip=1 or 0. If partFlip=0, weightIdxL=32−weightIdx; and if partFlip=1, weightIdxL=32+weightIdx. It should be noted that, 32 herein is merely an example, and the disclosure is not limited thereto.

Manner 2: The weight of the sample in the template is determined according to the first parameter of the sample in the template, a first preset value, and a second preset value.

In order to reduce complexity of calculating the template weight, in manner 2, the weight of the sample in the template is limited to the first preset value or the second preset value, that is, the weight of the sample in the template is either the first preset value or the second preset value, thereby reducing complexity of calculating the template weight.

The value of each of the first preset value and the second preset value is not limited in the disclosure.

Optionally, the first preset value is 1.

Optionally, the second preset value is 0.

In an example, the weight of the sample in the template may be determined according to the following formula:

$$wTemplateValue[x][y] = \bigl(partFlip?weightIdx: - weightIdx\bigr) > 0?1:0$$

wTemplateValue[x][y] is the weight of the sample (x, y) in the template. In the foregoing "1:0", 1 is the first preset value and 0 is the second preset value.

In manner I above, the weight of each sample in the template is determined according to the weight derivation mode, and a weight matrix formed by the weight of each sample in the template is used as the template weight.

Manner II: A weight of the current block and the template weight are determined according to the weight derivation mode. That is, in manner II, a merge region consisting of the current block and the template is taken as a whole, and a weight of a sample in the merge region is derived according to the weight derivation mode. Based on this, S102-B includes the following steps S102-B21 and S102-B22.

S102-B21, a weight of a sample in a merge region consisting of the current block and the template is determined according to the angle index, the distance index, the size of the template, and a size of the current block.

S102-B22, the template weight is determined according to the size of the template and the weight of the sample in the merge region.

In manner II, the current block and the template are taken as a whole, the weight of the sample in the merge region consisting of the current block and the template is determined according to the angle index, the distance index, the size of the template, and the size of the current block, and then according to the size of the template, a weight corresponding to the template among the weights of the samples in the merge region is determined as the template weight, for example, as illustrated in FIG. 18, a weight corresponding to an L-shaped template region in the merge region is determined as the template weight.

In manner II, in a weight determination process, the template weight and the weight of a prediction value are determined, i. e. the weight of the prediction value is a weight corresponding to the merge region other than the template weight, so that a subsequent prediction process can be performed according to the weight of the prediction value, and the weight of the prediction value does not need to be determined again, thereby reducing the steps for prediction and improving prediction efficiency.

There is no limitation on the implementation of determining the weight of the sample in the merge region consisting of the current block and the template according to the angle index, the distance index, the size of the template, and the size of current block in the disclosure.

In some embodiments, determining the weight of the sample in the merge region in S102-B21 includes the following steps S102-B211 to S102-B212.

S102-B211, a first parameter of the sample in the merge region is determined according to the angle index, the distance index, and a size of the merge region.

S102-B212, the weight of the sample in the merge region is determined according to the first parameter of the sample in the merge region.

In this implementation, the weight of the sample in the merge region is determined according to the angle index, the distance index, and the size of the merge region, and a weight of each sample in the merge region forms a weight matrix.

In a possible implementation, an offset and the first parameter may be determined in the following manner.

Inputs to the process of deriving the weight of the merge region are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

$$nW = (cIdx == 0)? nCbW : nCbW * SubWidthC$$

$$nH = (cIdx == 0)? nCbH : nCbH * SubHeightC$$

$$shift1 = \text{Max}(5, 17 - BitDepth),$$

where *BitDepth* represents a coding bit depth;

$$offset1 = 1 \ll (shift1 - 1)$$

$$displacementX = angleIdx$$

$$displacementY = (angleIdx + 8)\ \%32$$

$$partFlip = (angleIdx >= 13\ \&\&\ angleIdx <= 27)?0:1$$

$$shiftHor = (angleIdx\ \%16 == 8 || (angleIdx\ \%16 != 0\ \&\&\ nH >= nW))?0:1$$

Offsets offsetX and offsetY are derived as follows:

if *shiftHor* = 0:

$$offsetX = (-nW) \gg 1$$

$$offsetY = ((-nH) \gg 1) +$$

$$\bigl(angleIdx < 16?(distanceIdx * nH) \gg 3: -((distanceIdx * nH) \gg 3)\bigr)$$

otherwise (i.e. *ShiftHor* = 1):

$$offsetX = ((-nW) \gg 1) +$$

$$\bigl(angleIdx < 16?(distanceIdx * nW) \gg 3: -((distanceIdx * nW) \gg 3)\bigr)$$

$$offsetY = (-nH) \gg 1$$

The weight wValueMatrix[x][y] (where x=−nTmW ... nCbW−1, y=−nTmH ... nCbH−1) of the sample in the merge region is derived as follows (it should be noted that in this example, the coordinate of a top-left corner of the current block is (0, 0)):

variables xL and yL are derived as follows:

$$xL = (cIdx == 0)?x : x * SubWidthC$$

$$yL = (cIdx == 0)?y : y * SubHeightC$$

disLut is determined according to Table 3;
the first parameter weightIdx is derived as follows:

$$weightIdx = (((xL + offsetX) \ll 1) + 1) * disLut[displacementX] +$$

$$(((yL + offsetY) \ll 1) + 1) * disLut[displacementY]$$

After the first parameter weightIdx is determined according to the foregoing method, a weight of a sample (x, y) in the merge region is determined according to weightIdx.

In the disclosure, the manner for determining the weight of the sample in the merge region according to the first parameter of the sample in the merge region in S102-B212 includes, but is not limited to, the following manners.

Manner 1: A second parameter of the sample in the merge region is determined according to the first parameter of the sample in the merge region, and the weight of the sample in the merge region is determined according to the second parameter of the sample in the merge region.

For example, the weight of the sample in the merge region is determined according to the following formula:

$$weightIdx = (((xL + offsetX) \ll 1) + 1) * disLut[displacementX] +$$

$$(((yL + offsetY) \ll 1 + 1) * disLut[displacementY]$$

$$weightIdxL = partFlip?32 + weightIdx:32 - weightIdx$$

$$wValueMatrix[x][y] = Clip3(0, 8, (weightIdxL + 4) \gg 3)$$

wValueMatrix[x][y] is the weight of the sample (x, y) in the merge region. weightIdxL is the second parameter of the sample (x, y) in the merge region. wTemplateValue[x][y] is the weight of the sample (x, y) in the merge region.

Manner 2: The weight of the sample in the merge region is determined according to the first parameter of the sample in the merge region, a first preset value, and a second preset value.

Exemplarily, the weight of the sample in the merge region is the first preset value or the second preset value.

In order to reduce complexity of calculating the weight of the merge region, in manner 2, the weight of the sample in the merge region is limited to the first preset value or the second preset value, that is, the weight of the sample in the merge region is either the first preset value or the second preset value, thereby reducing complexity of calculating the weight of the merge region.

The value of each of the first preset value and the second preset value is not limited in the disclosure.

Optionally, the first preset value is 1.

Optionally, the second preset value is 0.

In an example, the weight of the sample in the merge region may be determined according to the following formula:

$$wTemplateValue[x][y] = (partFlip\,?\,weightIdx: -weightIdx) > 0\,?\,1:0$$

wValueMatrix[x][y] is the weight of the sample (x, y) in the merge region. In the foregoing "1:0", 1 is the first preset value and 0 is the second preset value.

In manner II above, the weight of each sample in the merge region consisting of the current block and the template is determined according to the weight derivation mode, and then a weight corresponding to the template in the merge region is determined as the template weight according to the size of the template. In addition, in manner II, a weight of a prediction value is also determined, and it is unnecessary to perform subsequent steps of determining the weight of the prediction value, thereby reducing the steps for prediction and improving prediction efficiency.

After the template weight is determined according to the foregoing steps, S103 is performed.

S103, at least one of the K prediction modes for the current block is determined according to the template weight.

The template weight in the disclosure may be understood as a template weight in determining the first prediction mode. For example, as illustrated in FIG. 17B, the black area in the template has less contribution to determination of the first prediction mode, for example, the weight is 0, and has more contribution to determination of the second prediction mode, for example, the weight is 1. The white area in FIG. 17B has more contribution to determination of the first prediction mode, for example, the weight is 1, and has less contribution to determination of the second prediction mode, for example, the weight is 0. The gray area in FIG. 17B has contribution to determination of both the first prediction mode and the second prediction mode.

Based on this, at least one of the K prediction modes may be determined according to the weight of the sample in the template. For example, the template weight is determined as a weight corresponding to the first prediction mode, and a weight corresponding to the second prediction mode may be understood as a weight obtained by subtracting the weight corresponding to the first prediction mode from a preset maximum weight value. Then the first prediction mode is determined according to the template and the weight corresponding to the first prediction mode, and the second prediction mode is determined according to the template and the weight corresponding to the second prediction mode.

In some embodiments, if a $j^{th}$ prediction mode in the K prediction modes is determined through template matching, determining at least one of the K prediction modes according to the template weight in S103 includes the following steps S103-A1 to S103-A4.

S103-A1, at least one candidate prediction mode is obtained.

The at least one candidate prediction mode may be understood as a candidate prediction mode corresponding to the $j^{th}$ prediction mode. In some embodiments, different prediction modes may correspond to different candidate prediction modes. In some embodiments, if two prediction modes are of the same type, for example, the two prediction modes each are an intra prediction mode, the two prediction modes may correspond to the same candidate prediction mode.

In the embodiment of the disclosure, at the decoding end, before determining the $j^{th}$ prediction mode, whether the $j^{th}$ prediction mode is determined through template matching is firstly determined.

In a possible implementation, the bitstream carries flag A, where flag A indicates whether the $j^{th}$ prediction mode is determined through template matching. Exemplarily, if the value of flag A is 1, it indicates that the $j^{th}$ prediction mode is determined through template matching; and if the value of the flag is 0, it indicates that the $j^{th}$ prediction mode is not determined through template matching.

Based on this, at the decoding end, the bitstream is decoded to obtain flag A, and the value of flag A is determined. If the value of flag A is 1, it is determined that the $j^{th}$ prediction mode is determined through template matching. In this case, at the decoding end, the method according to the embodiment of the disclosure is performed, that is, the at least one candidate prediction mode is obtained, a cost of the candidate prediction mode is determined, and the $j^{th}$ prediction mode is determined according to the cost of the candidate prediction mode.

In a possible implementation, both the encoding end and the decoding end determine by default that the $j^{th}$ prediction mode is determined through template matching. In this way, at the decoding end, when determining the $j^{th}$ prediction mode, the $j^{th}$ prediction mode is determined through template matching by default. Then at least one candidate prediction mode is obtained, a cost of the candidate prediction mode is determined, and the $j^{th}$ prediction mode is determined according to the cost of the candidate prediction mode.

In some embodiments, if the $j^{th}$ prediction mode is an inter prediction mode, the at least one candidate prediction mode includes one or more inter prediction modes, for example, includes at least one of skip, merge, a common inter prediction mode, unidirectional prediction, bidirectional prediction, or multi-hypothesis prediction.

In some embodiments, if the $j^{th}$ prediction mode is an intra prediction mode, the at least one candidate prediction mode includes at least one of a DC mode, a planar mode, or an angular mode. Optionally, the at least one candidate prediction mode includes an intra prediction mode in an MPM list.

In some embodiments, the at least one candidate prediction mode may further include modes such as IBC, palette, etc.

There is no limitation on the type(s) and the number of prediction modes in the at least one candidate prediction mode in the disclosure.

Optionally, the at least one candidate prediction mode is a preset mode.

Optionally, the at least one candidate prediction mode is a mode in the MPM list.

Optionally, the at least one candidate prediction mode is a set of candidate prediction modes determined according to some rules, such as equidistant selection.

S103-A2, a prediction value(s) of the template is obtained by predicting the template with the candidate prediction mode.

Exemplarily, for each candidate prediction mode in the at least one candidate prediction mode, the template is predicted with the candidate prediction mode to determine the prediction value of the template, where the prediction value of the template may be understood as a matrix formed by a prediction value of each sample in the template.

In some embodiments, the prediction value is also referred to as a prediction sample.

S103-A3, a cost of the candidate prediction mode is determined according to the prediction value of the template, a reconstructed value of the template, and the template weight.

Exemplarily, for each candidate prediction mode in the at least one candidate prediction mode, the cost of the candidate prediction mode is determined according to a prediction value of a sample corresponding to the candidate prediction mode, the reconstructed value of the template, and the template weight. For example, a loss between the prediction value of the sample and the reconstructed value is determined according to the prediction value of the sample and the reconstructed value, and the cost of the candidate prediction mode is determined according to the loss and the template weight.

In some embodiments, S103-A3 includes the following.

S103-A31, a template weight corresponding to the $j^{th}$ prediction mode is determined according to the template weight.

S103-A32, the cost of the candidate prediction mode is determined according to the prediction value of the template, the reconstructed value of the template, and the template weight corresponding to the $j^{th}$ prediction mode.

For example, if the $j^{th}$ prediction mode is the first prediction mode, the template weight determined may be determined as a template weight corresponding to the first prediction mode.

The manner for determining the cost of the candidate prediction mode in S103-A32 includes, but is not limited to, the following manners.

Manner I: The cost of the candidate prediction mode is determined by means of a matrix. Specifically, a loss is determined according to the prediction value of the template and the reconstructed value of the template, and the loss is recorded as a first loss. Since the prediction value of the template and the reconstructed value of the template are matrices, the first loss obtained is a matrix, for example, an absolute value of a difference between the prediction value of the template and the reconstructed value of the template is determined as the first loss. Then, the cost of the candidate prediction mode is determined according to the loss and the template weight corresponding to the $j^{th}$ prediction mode, where the template weight corresponding to the $j^{th}$ prediction mode is also a matrix. In this way, determination of the cost of the candidate prediction mode according to the loss and the template weight corresponding to the $j^{th}$ prediction mode is an operation between matrices, for example, a product of the first loss and the template weight corresponding to the $j^{th}$ prediction mode is determined as the cost of the candidate prediction mode.

Manner II: The cost of the candidate prediction mode is determined on a sample basis, that is, the foregoing S103-A32 includes the following.

S103-A321, for an $i^{th}$ sample in the template, a first loss between an $i^{th}$ prediction value corresponding to the $i^{th}$ sample in the prediction value of the template and an $i^{th}$ reconstructed value corresponding to the $i^{th}$ sample in the reconstructed value of the template is determined.

S103-A322, a cost of the candidate prediction mode at the $i^{th}$ sample is determined according to the first loss at the $i^{th}$ sample and a weight of the $i^{th}$ sample in the template weight corresponding to the $j^{th}$ prediction mode.

S103-A323, the cost of the candidate prediction mode is determined according to costs of the candidate prediction mode at samples in the template.

In manner II, for each sample in the template, a first loss of the candidate prediction mode at the sample is determined according to a prediction value of the sample and a reconstructed value of the sample, and the cost of the candidate prediction mode at the sample is determined according to the first loss at the sample and a weight of the sample.

For ease of illustration, taking the $i^{th}$ sample in the template as an example, the $i^{th}$ sample may be understood as any sample in the template, that is, the process of determining a cost at each sample in the template is the same, and reference can be made to the $i^{th}$ sample. Specifically, the prediction value of the template is obtained by predicting the template with the candidate prediction mode, the prediction value corresponding to the $i^{th}$ sample in the prediction value of the template is recorded as an $i^{th}$ prediction value, and the reconstructed value corresponding to the $i^{th}$ sample in the reconstructed value of the template is recorded as an $i^{th}$ reconstructed value. Then, the first loss of the candidate prediction mode at the $i^{th}$ sample is determined according to the $i^{th}$ prediction value and the $i^{th}$ reconstructed value. According to the above method, a first loss(es) of the candidate prediction mode at each sample or at multiple samples in the template is determined, and then the cost of the candidate prediction mode is determined according to the first loss at each sample or the multiple samples in the template. For example, a sum of costs of the candidate prediction mode at samples in the template is determined as the cost of the candidate prediction mode, or an average value of costs of the candidate prediction mode at samples in the template is determined as the cost of the candidate prediction mode. Determination of the cost of the candidate prediction mode according to the first loss at at least one sample in the template is not limited in the disclosure.

Exemplarily, taking an SAD cost as an example, the cost of the candidate prediction mode at the $i^{th}$ sample (x, y) in the template may be determined according to the following formula (1):

$$tempValueA[x][y] = \qquad (1)$$
$$abs(predTemplateSamplesCandA[x][y] - recTemplateSamples[x][y]) *$$
$$wTemplateValue[x][y]$$

Exemplarily, the cost of the candidate prediction mode is determined according to the following formula (2):

$$costCandA = \sum tempValueA[x][y] \qquad (2)$$

abs(predTemplateSamplesCandA[x][y]−recTemplateSamples[x][y]) is an absolute value of a difference between the prediction value predTemplateSamplesCandA of sample (x, y) in the template and a reconstructed sample recTemplateSamples. The absolute value of the difference is referred to as the first loss corresponding to sample (x, y). The value is multiplied by a weight wTemplateValue[x][y] of the sample in a weight corresponding to the candidate prediction mode, so as to obtain tempValueA[x][y]. tempValueA[x][y] may be considered as the cost of the candidate prediction mode at sample (x, y). A total cost costCandA of the candidate prediction mode in the template is a sum of a cost at each sample in the template.

It should be noted that, the cost of the candidate prediction mode is determined exemplarily according to the SAD. Optionally, the cost of the candidate prediction mode may also be determined according to cost calculation methods such as SATD and MSE.

According to the foregoing method, the cost of the candidate prediction mode may be determined, and then the following step S103-A4 is performed.

S103-A4, the $j^{th}$ prediction mode is determined according to the cost of the at least one candidate prediction mode.

In the embodiment of the disclosure, if the $j^{th}$ prediction mode is determined through template matching, then according to the foregoing method, a cost of each candidate prediction mode is determined, and the $j^{th}$ prediction mode is determined according to the cost of each candidate prediction mode.

Example 1: A candidate prediction mode with the minimum cost among the at least one candidate prediction mode is determined as the $j^{th}$ prediction mode.

Example 2: One or more candidate prediction modes are selected from the at least one candidate prediction mode according to the cost of the candidate prediction mode, and the $j^{th}$ prediction mode is determined from the one or more candidate prediction modes.

In a possible implementation of example 2, at the decoding end, one candidate prediction mode is selected from the one or more candidate prediction modes as the $j^{th}$ prediction mode.

Specifically, the $j^{th}$ prediction mode is determined from the one or more candidate prediction modes according to an indication from the encoding end. For example, the number of the one or more candidate prediction modes is M, and the encoding end sorts the M candidate prediction modes according to costs. For example, the M candidate prediction modes are sorted in an ascending order of cost, or the M candidate prediction modes are sorted in a descending order of cost. One candidate prediction mode B is determined from the sorted M candidate prediction modes as the $j^{th}$ prediction mode. Then, at the encoding end, an identifier of candidate prediction mode B is signalled into the bitstream, where the identifier of candidate prediction mode B may be a sequence number of candidate prediction mode B in the M candidate prediction modes, or may be a mode index number of candidate prediction mode B. In this way, at the decoding end, the identifier of candidate prediction mode B is obtained by decoding the bitstream, and then according to the identifier of candidate prediction mode B, a candidate prediction mode corresponding to the identifier of candidate prediction mode B in the M determined candidate prediction modes is determined as the $j^{th}$ prediction mode.

In another possible implementation of example 2, at the decoding end, an alternative prediction mode for the current block is obtained, a cost for predicting the template with the alternative prediction mode is determined, and according to the cost, one prediction mode is selected from the alternative prediction mode and the one or more candidate prediction modes as the $j^{th}$ prediction mode.

Optionally, the alternative prediction mode for the current block includes one or more of a prediction mode for a reconstructed decoding block neighbouring the current block and/or a preset prediction mode.

It can be understood that, in the disclosure, the preset prediction mode may include one or more of multiple different modes such as a DC mode, a bilinear mode, and a planar mode.

Specifically, at the decoding end, the alternative prediction mode for the current block is obtained, for example, one or more of the prediction mode for a reconstructed coding block neighbouring the current block and/or the preset prediction mode is taken as the alternative prediction mode for the current block. Then, a cost for predicting the template with each alternative prediction mode is determined, for example, the current block is predicted with the alternative prediction mode to obtain a prediction value, and the prediction value is compared with the reconstructed value of the template to obtain a cost of the alternative prediction mode, where the cost of the alternative prediction mode may be a cost such as an SAD or an SATD. According to the cost of the alternative prediction mode and costs of the one or more candidate prediction modes, one prediction mode is selected from the alternative prediction mode and the one or more candidate prediction modes as the $j^{th}$ prediction mode, for example, a prediction mode with the minimum cost among the alternative prediction mode and the one or more candidate prediction modes is determined as the $j^{th}$ prediction mode.

It should be noted that, the alternative prediction mode for the current block is different from the one or more candidate prediction modes determined. That is, at the decoding end, a prediction mode which is the same as the one or more candidate prediction modes is removed from the prediction mode for a reconstructed coding block neighbouring the current block and/or the preset prediction mode, and the rest of the prediction modes is determined as the alternative prediction mode for the current block.

It can be understood that, for inter prediction, during template matching, "searching" may be performed on the basis of initial motion information. For each prediction mode, one motion information needs to be determined. Some pieces of motion information may be determined within a certain range around the initial motion information, so as to determine some prediction modes. For example, one initial motion information is given, where a motion vector thereof is (xInit, yInit). A search range is set, for example, a rectangular region from xInit−sR to xInit+sR in a horizontal direction and from yInit−sR to yInit+sR in a vertical direction, where sR may be 2, 4, 8, etc. Each motion vector in the rectangular region may be combined with other information, such as a reference picture index and a prediction list flag, of the initial motion information to determine one motion information, thereby determining one prediction mode. The at least one candidate prediction mode may include the determined prediction mode. For example, if GPM is used in a merge mode and the first prediction mode is determined through template matching, merge_gpm_idx0 may be used to determine one initial motion information from mergeCandList. Then (2*sR+1)*(2*sR+1) pieces of motion information are determined according to the foregoing method, so as to determine some prediction modes, where these prediction modes each are a merge mode or are referred to as a template matching-based merge mode.

It should be noted that, if a set consisting of the at least one candidate prediction mode includes a large number of prediction modes, considering complexity, cost determination may not be performed for each candidate prediction mode in the at least one candidate prediction mode. In some embodiments, the process of determining the $j^{th}$ prediction mode according to the cost of the at least one candidate prediction mode may be extended to several rounds of processes from coarse selection to fine selection. For example, in an inter prediction mode, the motion vector supports fractional-sample accuracy, such as ¼, ⅛, or ¹⁄₁₆ accuracy. Therefore, a prediction mode with the lowest cost among a prediction mode with an integer-sample motion vector may be firstly chosen, and then a prediction mode with the lowest cost is selected from the prediction mode chosen and a prediction mode with a fractional-sample motion vector whose motion vector is near a motion vector of the mode chosen. For example, in an intra prediction mode, one or more intra prediction modes are firstly selected at a certain granularity according to the cost of the candidate prediction mode, and then screening is performed on the one or more intra prediction modes and neighbouring intra prediction modes of finer granularity.

In the embodiment of the disclosure, if the $j^{th}$ prediction mode in the K prediction modes is determined through template matching, at least one candidate prediction mode is obtained, a prediction value of the template in the candidate prediction mode is obtained by predicting the template with the candidate prediction mode, the cost of the candidate prediction mode is obtained according to a prediction value of the template and a reconstructed value of the template in the candidate prediction mode, and the $j^{th}$ prediction mode is obtained according to the cost of the candidate prediction mode.

In the foregoing embodiment, the process of determining the $j^{th}$ prediction mode in the K prediction modes is taken as an example for illustration, and the process of determining other prediction modes in the K prediction modes is consistent with the process of determining the $j^{th}$ prediction mode, and reference can be made thereto. For example, K=2. The first prediction mode and the second prediction mode are determined according to the method. Then, at the decoding end, the first prediction value is obtained according to the first prediction mode, the second prediction value is obtained according to the second prediction mode, and the first prediction value and the second prediction value are weighted to obtain a new prediction value.

According to the embodiment of the disclosure, after a $K^{th}$ prediction mode is determined according to the foregoing method, step S104 is performed, so as to determine a prediction value according to the K prediction modes and the weight derivation mode.

S104, a prediction value is determined according to the K prediction modes and the weight derivation mode.

Specifically, weights of prediction values are determined according to the weight derivation mode, K prediction values are determined according to the K prediction modes, the K prediction values are weighted according to the weights of prediction values, and a weighted result is determined as a new prediction value.

In the disclosure, the manner for determining the weights of the prediction values according to the weight derivation mode includes, but is not limited to, the following manners.

Manner I: If the template weight is determined according to the weight derivation mode but a weight corresponding to a sample in the current block is not yet determined during determination of the template weight, the foregoing step S104 includes the following steps.

S104-A1, K prediction values are determined according to the K prediction modes.

S104-A2, weights of the prediction values are determined according to the weight derivation mode.

S104-A3, the prediction value is determined according to the K prediction modes and the weights of the prediction values.

It should be noted that, in the disclosure, the weight derivation mode is used to determine weights of prediction values used for the current block. Specifically, the weight derivation mode may be a mode for deriving the weights of the prediction values. For a block of a given length and width, each weight derivation mode may be used to derive one weight matrix of prediction values. For blocks of the same size, weight matrices of prediction values derived from different weight derivation modes may be different.

Exemplarily, in the disclosure, there are 56 weight derivation modes for AWP in AVS3 and 64 weight derivation modes for GPM in VVC.

It can be understood that, in the embodiment of the disclosure, at the decoding end, when determining the prediction value based on the K prediction modes and the weights of the prediction values, the K prediction values may be firstly determined according to the K prediction modes, and then the K prediction values are weighted according to the weights of the prediction values, so as to obtain a new prediction value.

In manner I, it can be understood that, determination of the template weight according to the weight derivation mode and determination of the weights of the prediction values according to the weight derivation mode are two independent processes and do not interfere with each other. For example, the template weight is determined according to the weight derivation mode, and at least one of the K prediction modes is determined according to the template weight. The weights of the prediction values are determined according to the weight derivation mode, and then a final prediction value is obtained according to the K prediction modes and the weights of the prediction values.

In some embodiments, the weights of the prediction values may also be determined in the following manner II.

Manner II: If a weight of a sample in a merge region consisting of a template region and the current block is determined according to the weight derivation mode during determination of the template weight, S104 includes the following steps.

S104-B1, K prediction values are determined according to the K prediction modes.

S104-B2, weights of the K prediction values are determined according to the weight of the sample in the merge region.

S104-B3, a new prediction value is determined according to the K prediction values and the weights of the K prediction values.

In manner II, during weight derivation, the weight of the sample in the merge region is derived according to the weight derivation mode, and the merge region includes the current block and a template region of the current block, so that weights corresponding to the current block in the merge region are determined as the weights of the prediction values, and a weight corresponding to the template region in the merge region is determined as the template weight. That is, in manner II, the template region and the current block are taken as a whole, so that the template weight and the weights of the prediction values are derived in one step, thereby reducing steps for weight derivation and improving prediction effect.

In some embodiments, the foregoing prediction process is performed on a sample basis, and accordingly, the weight is a weight corresponding to a sample. In this case, when predicting the current block, sample A in the current block is predicted with each of the K prediction modes, so as to obtain K prediction values at sample A for the K prediction modes; weights of the K prediction values at sample A are determined according to the weight derivation mode; and the K prediction values are weighted so as to obtain a final prediction value of sample A. The foregoing steps are performed on each sample in the current block, and a final prediction value of each sample in the current block can be obtained, where the final prediction value of each sample in the current block forms a final prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights of prediction values corresponding to sample A, to obtain a final prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to weights of prediction values to obtain a new prediction value. For example, sample A is predicted with the first intra prediction mode to obtain a first prediction value of sample A, sample A is predicted with the second intra prediction mode to obtain a second prediction value of sample A, and the first prediction value and the second prediction value are weighted according to weights of prediction values corresponding to sample A, so as to obtain a new prediction value of sample A.

In an example, for example, K=2 as an example, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to weights of prediction values to obtain a new prediction value. For example, sample A is predicted with the first intra prediction mode to obtain a first prediction value of sample A, sample A is predicted with the second intra prediction mode to obtain a second prediction value of sample A, and the first prediction value and the second prediction value are weighted according to weights of prediction values corresponding to sample A, so as to obtain a new prediction value of sample A.

In some embodiments, if the $j^{th}$ prediction mode in the K prediction modes is an inter prediction mode, determining the prediction value according to the K prediction modes and the weight derivation mode in step S104 includes the following steps.

S104-C1, motion information is determined according to the $j^{th}$ prediction mode.

S104-C2, a $j^{th}$ prediction value is determined according to the motion information.

S104-C3, (K−1) prediction values are determined according to prediction modes other than the $j^{th}$ prediction mode in the K prediction modes.

S104-C4, weights of the K prediction values are determined according to the weight derivation mode.

S104-C5, a new prediction value is determined according to the $j^{th}$ prediction value, the (K−1) prediction values, and the weights of the prediction values.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to weights of prediction values to obtain a new prediction value. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. With regard to weights of prediction values of each sample in the current block, the first prediction value and the second prediction value of the current block are weighted on a sample basis, so as to obtain a new prediction value of the current block. For example, for sample A in the current block, a first prediction value corresponding to sample A in the first prediction value of the current block and a second prediction value corresponding to sample A in the second prediction value of the current block are weighted according to weights of prediction values of sample A, so as to obtain a new prediction value of sample A.

In some embodiments, if K>2, weights of prediction values corresponding to two prediction modes in the K prediction modes may be determined according to the weight derivation mode, and a weight(s) of a prediction value(s) corresponding to other prediction mode(s) in the K prediction modes may be a preset value(s). For example, K=3, a weight of a prediction value corresponding to the first prediction mode and a weight of a prediction value corresponding to the second prediction mode are derived according to the weight derivation mode, and a weight of a prediction value corresponding to a third prediction mode is a preset value. In some embodiments, if a total prediction-value weight (that is, total weight of prediction values) corresponding to the K prediction modes is constant, for example, is 8, a weight of a prediction value corresponding to each of the K prediction modes may be determined according to a preset weight proportion. Assuming that the weight of the prediction value corresponding to the third prediction mode accounts for ¼ of the total prediction-value weight, it may be determined that the weight of the prediction value of the third prediction mode is 2, and the remaining ¾ of the total prediction-value weight is allocated to the first prediction mode and the second prediction mode. Exemplarily, if a weight of the prediction value corresponding to the first prediction mode derived according to the weight derivation mode is 3, it is determined that the weight of the prediction value corresponding to the first prediction mode is (¾)*3, and the weight of the prediction value corresponding to the second prediction mode is (¾)*5.

In some embodiments, at the decoding end, before performing the method in the embodiment of the disclosure, whether template matching is applicable to the current block needs to be determined. If it is determined at the decoding end that template matching is applicable to the current block, steps S101 to S104 are performed. If it is determined at the decoding end that template matching is not applicable to the current block, the K prediction modes are determined in other manners.

Exemplarily, at the decoding end, whether template matching is applicable to the current block is determined in the following manners.

Manner I: At the decoding end, whether template matching is applicable to the current block is determined according to the distribution of the template weight.

Since a current coding order is from left to right and from top to bottom, a template that is available for the current block is on the left and the top of the current block, while the right and the bottom are unavailable, and the top-right and the bottom-left are available in some cases but unavailable in other cases. It can be noted that in some weight derivation modes of GPM, a corresponding template or a reconstructed neighbouring region does not exist for a prediction mode. For example, in a weight matrix with a GPM index of 55, 56, or 57 for a square block, a white area in the weight matrix exists only at a bottom-right corner, and there is no template neighbouring the white area directly or there is no reconstructed region neighbouring the white area. In addition, there are also some modes for which there is a directly neighbouring template or a neighbouring reconstructed region, but the neighbouring region is very small, such as a white area in a weight matrix with a GPM index of 59, or 60 for a square block. In the embodiment of the disclosure, a template neighbouring the current block directly or a reconstructed region neighbouring the current block directly is referred to as an available region. If there is no available region or the available region is very small, application of template matching or texture characteristics to a corresponding prediction mode will lead to adverse effect in addition to failure to improve compression efficiency. The reason is that this prediction mode is different from characteristics of the whole or most of a template or a neighbouring reconstructed region.

That is, in the embodiment of the disclosure, template matching or texture characteristics of neighbouring reconstructed samples is applied to a prediction mode with a relatively large available template region, and is not applied to a prediction mode with a relatively small available template region. For example, in FIG. 17B, an available template region corresponding to the first prediction mode is a white area and a gray area in the template, and an available template region corresponding to the second prediction mode is a black area and a gray area in the template. It can be seen from FIG. 17B that if the available template region corresponding to the first prediction mode is large, for example, greater than a preset value, it is determined at the decoding end that template matching is applicable to the first prediction mode. Similarly, it can be seen from FIG. 17B that if the available template region corresponding to the second prediction mode is relatively large, for example, greater than a preset value, it is determined at the decoding end that template matching is also applicable to the second prediction mode.

In a possible implementation, whether template matching is applicable to the current block may be determined according to the template weight.

In an example, if the number of samples with a weight greater than a first threshold in the template is greater than or equal to a preset threshold, it is determined that template matching is applicable to the current block, and then step S103 is performed to determine the at least one of the K prediction modes for the current block according to the template weight.

Optionally, the first threshold may be 0.

Optionally, the first threshold is a median value of weights, for example, 4.

Optionally, the preset threshold is a fixed value.

Optionally, the preset value is determined according to the size of the current block, for example, 1/m1 of the total number of samples in the current block, where m1 is a positive number.

Optionally, the preset value is determined according to the size of the template, for example, 1/m2 of the total number of samples in the template, where m2 is a positive number.

In another example, if the number of samples with a weight greater than the first threshold in the template is less than the preset threshold, the at least one of the K prediction modes for the current block is determined according to the weight derivation mode.

In the embodiment of the disclosure, at the decoding end, after determining the template weight according to the weight derivation mode according to the above step S102, whether template matching is applicable to the current block is determined according to a template weight corresponding to a sample in the template weight. Exemplarily, if the number of samples with a weight greater than the first threshold in the template is greater than or equal to the preset threshold, it indicates that an available template region corresponding to the first prediction mode in the template is large, and if the first prediction mode is determined through template matching, prediction effect may be improved. If the number of samples with a weight greater than the first threshold in the template is less than the preset threshold, it indicates that the available template region corresponding to the first prediction mode in the template is relatively small or does not exist. In this case, if the first prediction mode is determined through template matching, it will lead to adverse effect in addition to failure to improve compression efficiency.

Manner II: At the decoding end, the bitstream is decoded to obtain a first flag, where the first flag indicates whether to use template matching to derive a prediction mode; and whether to use template matching to derive a prediction mode for the current block is determined according to the first flag.

In manner II, if the first flag is signalled into the bitstream at the encoding end, the first flag indicates whether to use template matching to derive the prediction mode for the current block. If it is determined at the encoding end that template matching is used to derive the prediction mode for the current block, the first flag is set to 1, and the first flag set to 1 is signalled into the bitstream. If it is determined at the encoding end that template matching is not used to derive the prediction mode for the current block, the first flag is set to 0, and the first flag set to 0 is signalled into the bitstream. In this way, at the decoding end, after obtaining the bitstream, the first flag is obtained by decoding the bitstream, and whether to use template matching to derive the prediction mode for the current block is determined according to the first flag.

Exemplarily, if the first flag indicates to use template matching to derive the prediction mode, the template weight is determined according to the weight derivation mode. For example, at the decoding end, the bitstream is decoded to obtain the first flag, and if the value of the first flag is 1, it is determined at the decoding end that template matching is to be used to derive the prediction mode for the current block, and then S102 is performed to determine the template weight according to the weight derivation mode.

Exemplarily, if the first flag indicates not to use template matching to derive the prediction mode, the at least one of the K prediction modes for the current block is determined according to the weight derivation mode. For example, at the decoding end, the bitstream is decoded to obtain the first flag. If the value of the first flag is 0, it is determined at the decoding end that template matching is not to be used to derive the prediction mode for the current block, and then the K prediction modes are determined in other manners, for example, the at least one of the K prediction modes for the current block is determined according to the weight derivation mode.

In the disclosure, the positions where the weight values change form a straight line (or curved line), or in the blending area as illustrated in FIG. 4 and FIG. 5, the positions where the weight values are the same form a straight line (or curved line). Such straight line may be called a boundary line. The boundary line itself also has an angle. The angle horizontal to the right may be set to 0 degrees, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a block, the corresponding texture is likely to show different characteristics on two sides of the boundary line, such as textures with two different angles on two sides of the boundary line respectively, or an angular texture on one side of the boundary line and a flat texture on the other side of the boundary line. Since the boundary line itself also has an angle, it may be assumed that the boundary line is obtained through angular prediction with a point, which may be close to some textures of the current block, so there is correlation between this straight line and the two prediction modes for the current block.

Specifically, in the disclosure, assuming that the boundary line is obtained through angular prediction with a point, at least one angular prediction mode may be found, which may be used to approximately create the boundary line. For example, a horizontal boundary line matches a horizontal prediction mode, such as mode 18 in VVC. A vertical boundary line matches a vertical intra prediction mode, such as mode 50 in VVC. A 45-degree boundary line may match a 45-degree intra prediction mode from bottom-left to top-right such as mode 66 in VVC, or a 225-degree intra prediction mode from top-right to bottom-left such as mode 2 in VVC. Thus, the weight derivation mode may match some intra prediction mode(s).

It should be noted that, in the disclosure, the weight derivation mode may also be the index of the weight, for example, the 56 modes of AWP may be considered as 56 weight derivation modes, and the 64 modes of GPM in VVC may be considered as 64 weight derivation modes.

In some embodiments, in addition to the intra angular prediction mode corresponding to the weight boundary line, some intra angular prediction modes related to the weight boundary line are also more likely to be used, such as intra prediction modes corresponding to angles near the boundary line or perpendicular to the boundary line.

In some embodiments, if the K prediction values each are obtained by predicting with an intra prediction mode, K different intra prediction modes should be used in GPM.

In some embodiments, if at least one of the K prediction values is obtained by predicting with an intra prediction mode and at least one of the K prediction values is obtained by predicting with another prediction method, only a small number of intra prediction modes need to be used in GPM. In this case, a smaller range of intra prediction modes may be provided for GPM to select from, thus saving overhead of a flag indicating which intra prediction mode is selected.

In some embodiments, in GPM, one prediction value is derived from intra prediction, and another prediction value is derived from inter prediction. Assume the intra prediction mode used in the disclosure is determined according to the weight derivation mode by default. For example, if the boundary line of the weight derivation mode is in the horizontal direction, such as modes with indexes 18, 19, 50, and 51 of GPM as illustrated in FIG. 4, the intra prediction mode is determined to be the horizontal mode 18. For another example, if the boundary line of the weight derivation mode is in the vertical direction, such as modes with indexes 0, 1, 36, and 37 of GPM as illustrated in FIG. 4, the intra prediction mode is determined to be the vertical mode 50.

In other words, in the disclosure, before determining the at least one of the K prediction modes according to the weight derivation mode, types of the K prediction modes need to be determined. The prediction mode can be determined according to the weight derivation mode only if the prediction mode is an intra prediction mode.

Based on the above, before determining the at least one of the K prediction modes according to the weight derivation mode, the method in the embodiment of the disclosure further includes the following.

Step 11-0, the bitstream is decoded to obtain a type flag, where the type flag indicates whether the K prediction modes each are an intra prediction mode.

Step 11-1, types of the K prediction modes are determined according to the type flag.

Hereinafter, K=2 is taken as an example.

Exemplarily, if the value of the type flag is a first value, it indicates that the first prediction mode and the second prediction mode are inter prediction modes. In this case, mode0IsInter=1, mode1IsInter=1, where mode0IsInter indicates whether the first prediction mode is an inter prediction mode, and mode1IsInter indicates whether the second prediction mode is an inter prediction mode. If the first prediction mode is an inter prediction mode, mode0IsInter=1. If the second prediction mode is an inter prediction mode, mode1IsInter=1.

Exemplarily, if the value of the type flag is a second value, it indicates that the first prediction mode is an intra prediction mode and the second prediction mode is an inter prediction mode, and in this case, mode0IsInter=0 and mode1IsInter=1.

Exemplarily, if the value of the type flag is a third value, it indicates that the first prediction mode is an inter prediction mode and the second prediction mode is an intra prediction mode, and in this case, mode0IsInter=1 and mode1IsInter=0.

Exemplarily, if the value of the type flag is a fourth value, it indicates that the first prediction mode and the second prediction mode are intra prediction modes, and in this case, mode0IsInter=0 and mode1IsInter=0.

The value of each of the first value, the second value, the third value, and the fourth value is not limited in the disclosure.

Optionally, the first value is 0.
Optionally, the second value is 1.
Optionally, the third value is 2.
Optionally, the fourth value is 3.

In an example, the type flag may be represented by the field "intra_mode_idx".

In the disclosure, at the encoding end, after determining the type of the first prediction mode and the type of the second prediction mode according to the type flag, the type flag needs to be signalled into the bitstream during encoding. At the decoding end, the bitstream is decoded to obtain the type flag, and the type of the first prediction mode and the type of the second prediction mode are determined according to the type flag.

Optionally, in the manner as illustrated in Table 4, merge_gpm_partition_idx is the weight derivation mode or a weight derivation index, intra_mode_idx is the type flag, merge_gpm_idx0 is an index value of $1^{st}$ motion information in a candidate list, and merge_gpm_idx1 is an index value of $2^{nd}$ motion information in the candidate list.

In the disclosure, at the decoding end, after determining the type of the first prediction mode and the type of the second prediction mode according to the type flag, if at least one of the first prediction mode and the second prediction mode is an intra prediction mode, the at least one of the first prediction mode and the second prediction mode is determined according to the weight derivation mode.

That is, in the disclosure, an intra prediction mode is determined according to the weight derivation mode. For example, if the first prediction mode and the second prediction mode are intra prediction modes, the first prediction mode and the second prediction mode are determined according to the weight derivation mode. For another example, if one of the first prediction mode and the second prediction mode is an intra prediction mode, the intra prediction mode is determined from the first prediction mode and the second prediction mode according to the weight derivation mode.

In the disclosure, the manner for determining the at least one of the K prediction modes according to the weight derivation mode includes, but is not limited to, the following manners.

Manner I: If the at least one of the K prediction modes is an intra prediction mode, an angle index is determined according to the weight derivation mode, and an intra prediction mode corresponding to the angle index is determined as one of the K prediction modes.

The angle index indicates an angle index of a boundary line of weights.

In some embodiments, the angle index is represented by the field "angleIdx".

Table 2 above shows a correspondence between merge_gpm_partition_idx and angleIdx. With reference to Table 2, the angle index may be derived according to the weight derivation mode.

In the disclosure, there is a correspondence between angle indices and intra prediction modes, that is, different angle indices correspond to different intra prediction modes.

Exemplarily, the correspondence between angle indices and intra prediction modes is that as illustrated in Table 6.

TABLE 6

| angleIdx | Intra prediction mode |
| --- | --- |
| 0 | 50 |
| 2 | 42 |
| 3 | 38 |
| 4 | 34 |
| 5 | 30 |
| ... | ... |

In manner I, taking K=2 as an example, if the first prediction mode or the second prediction mode is an intra prediction mode, the angle index is determined according to the weight derivation mode, for example, the angle index corresponding to the weight derivation mode is derived according to Table 2. Then, the intra prediction mode corresponding to the angle index is determined according to Table 6 above, for example, the angle index is 2, and the intra prediction mode corresponding to the angle index is 42, and then the intra prediction mode 42 is determined as the first prediction mode or the second prediction mode.

Manner II: If the at least one of the K prediction modes is an intra prediction mode, an intra prediction mode corresponding to the weight derivation mode is determined, and the at least one of the K prediction modes is determined from the intra prediction mode corresponding to the weight derivation mode.

In manner II, taking K=2 as an example, if the first prediction mode and/or the second prediction mode is an intra prediction mode, the first prediction mode and/or second prediction mode is determined from the intra prediction mode corresponding to the weight derivation mode. For example, the first second prediction mode and/or the second prediction mode may be an intra prediction mode that is on or near the same line as a weight partition line (also known as the boundary line). Alternatively, the first prediction mode and/or second prediction mode may be an intra prediction mode that is perpendicular or near perpendicular to the weight partition line. For example, if the weight boundary line is horizontal, such as mode 18, 19, 50, or 51 in GPM in FIG. 4, the first prediction mode and/or second prediction mode may be horizontal mode 18 and vertical mode 50.

As can be seen from the above, there are many types of intra prediction modes corresponding to the weight derivation mode, including an intra prediction mode parallel to the boundary line of weights, an intra prediction mode perpendicular to the boundary line, and the like. In the disclosure, a flag(s) may be used to indicate which mode in the intra prediction modes corresponding to the weight derivation mode is selected as an intra prediction mode in the K prediction modes.

Exemplarily, taking K=2 as an example, if the first prediction mode is an intra prediction mode, a second flag is used to indicate a correspondence between the first prediction mode and the intra prediction modes corresponding to the weight derivation mode. For example, the second flag indicates that the first prediction mode is the intra prediction mode parallel to the boundary line of weights, or indicates that the first prediction mode is the intra prediction mode perpendicular to the boundary line of weights.

Exemplarily, if the second prediction mode is an intra prediction mode, a third flag is used to indicate a correspondence between the second prediction mode and the intra prediction modes corresponding to the weight derivation mode. For example, the third flag indicates that the second prediction mode is the intra prediction mode parallel to the boundary line of weights, or indicates that the second prediction mode is the intra prediction mode perpendicular to the boundary line of weights.

Based on this, in manner II, the manner for determining the first prediction mode and/or the second prediction mode according to the intra prediction mode corresponding to the weight derivation mode includes, but is not limited to, the following examples.

Example 1, if the first prediction mode is an intra prediction mode, the second flag is obtained, and an intra prediction mode corresponding to the second flag in the intra prediction modes corresponding to the weight derivation mode is determined as the first prediction mode.

Example 2, if the second prediction mode is an intra prediction mode, the third flag is obtained, and an intra prediction mode corresponding to the third flag in the intra prediction modes corresponding to the weight derivation mode is determined as the second prediction mode.

In some embodiments, the intra prediction mode corresponding to the weight derivation mode includes at least one of the intra prediction mode parallel to the boundary line of weights or the intra prediction mode perpendicular to the boundary line.

Optionally, if the second flag has a fifth value, such as 0, it indicates that the first prediction mode is the intra prediction mode parallel to the boundary line of weights in the intra prediction modes corresponding to the weight derivation mode. If the second flag has a sixth value, such as 1, it indicates that the first prediction mode is the intra prediction mode perpendicular to the boundary line of weights in the intra prediction modes corresponding to the weight derivation mode.

Optionally, if the third flag has the fifth value, such as 0, it indicates that the second prediction mode is the intra prediction mode parallel to the boundary line of weights in the intra prediction modes corresponding to the weight derivation mode. If the third flag has the sixth value, such as 1, it indicates that the second prediction mode is the intra prediction mode perpendicular to the boundary line of weights in the intra prediction modes corresponding to the weight derivation mode.

In some embodiments, the intra prediction mode corresponding to the weight derivation mode includes at least one of: the intra prediction mode parallel to the boundary line of weights, the intra prediction mode perpendicular to the boundary line, or a planar mode.

Optionally, if the second flag has the fifth value, such as 0, it indicates that the first prediction mode is the intra prediction mode parallel to the boundary line of weights in the intra prediction modes corresponding to the weight derivation mode. If the second flag has the sixth value, such as 1, it indicates that the first prediction mode is the intra prediction mode perpendicular to the boundary line of weights in the intra prediction modes corresponding to the weight derivation mode. If the second flag has a seventh value, such as 2, it indicates that the first prediction mode is the planar mode.

Optionally, if the third flag has the fifth value, such as 0, it indicates that the second prediction mode is the intra prediction mode parallel to the boundary line of weights in the intra prediction modes corresponding to the weight derivation mode. If the third flag has the sixth value, such as 1, it indicates that the second prediction mode is the intra prediction mode perpendicular to the boundary line of weights in the intra prediction modes corresponding to the weight derivation mode. If the third flag has the seventh value, such as 2, it indicates that the second prediction mode is the planar mode.

In an example, the field "intra_gpm_idx0" is used to represent the second flag.

In an example, the field "intra_gpm_idx1" is used to represent the third flag.

In the disclosure, if the first prediction mode is an intra prediction mode, the first prediction mode is determined according to the second flag as described above. If the second prediction mode is an intra prediction mode, the second prediction mode is determined according to the third flag as described above.

Exemplarily, the second flag (intra_gpm_idx0) and/or the third flag (intra_gpm_idx1) are those as illustrated in Table 7.

TABLE 7

```
{
    merge_gpm_partition_idx[x0][y0]            ae(v)
    intra_mode_idx[x0][y0]                     ae(v)
    if( mode0IsInter )
        merge_gpm_idx0[x0][y0]                 ae(v)
        if( (!mode0IsInter && mode1IsInter) ||
    (MaxNumGpmMergeCand > 2 && mode0IsInter &&
    mode1IsInter))
        merge_gpm_idx1[x0][y0]                 ae(v)
    if(! mode0IsInter)
        intra_gpm_idx0[x0][y0]                 ae(v)
        if(! mode1IsInter)
            intra_gpm_idx1[x0][y0]             ae(v)
}
```

At the decoding end, the bitstream illustrated in Table 7 is decoded to obtain the second flag and/or the third flag, the first prediction mode is determined according to the second flag and/or the second prediction mode is determined according to the third flag, and then a prediction value is determined according to the first prediction mode, the second prediction mode, and weights.

In some embodiments, if the first prediction mode and the second prediction mode each are an intra prediction mode, the second flag and the third flag have different values. To ensure that the value of the second flag is different from the value of the third flag, a feasible way is to set the value of the second flag (intra_gpm_idx1) to be 0 or 1, and if intra_gpm_idx1 is greater than intra_gpm_idx0, intra_gpm_idx1 is incremented by 1.

With reference to the foregoing method, the at least one of K prediction modes is determined according to the weight derivation mode, the K preset values are determined according to the K prediction modes, and a new prediction value is obtained according to the K prediction values and the weights of the prediction values.

In the prediction method provided in the embodiment of the disclosure, at the decoding end, the bitstream is decoded to determine the weight derivation mode for the current block, the template weight is determined according to the weight derivation mode, the at least one of K prediction modes for the current block is determined according to the template weight, and the prediction value is determined according to the K prediction modes and the weight derivation mode. That is, in the disclosure, a template is simulately partitioned according to the weight. Template partitioning may differ under different block shapes, but in the method of the disclosure, there is no need to set various rules for blocks of various shapes, thereby improving accuracy and convenience of template partitioning. Since a prediction mode is derived based on a template partitioned accurately, it is possible to ensure accuracy of the prediction mode derived, thereby improving encoding effect.

A decoding end is taken as an example above to introduce the prediction method in the disclosure, and an encoding end is taken as an example for illustration below.

Figure 19:
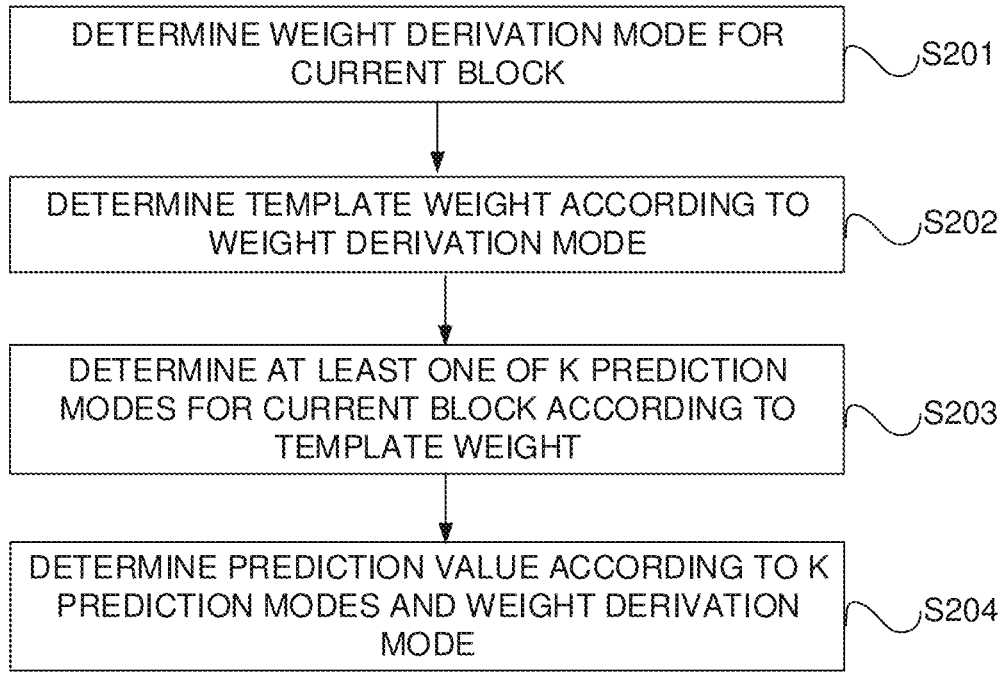
FIG. 19 is a schematic flowchart of a prediction method provided in an embodiment of the disclosure.

FIG. 19 is a schematic flowchart of a prediction method according to an embodiment of the disclosure. The embodiment of the disclosure is applied to the video encoder illustrated in FIG. 1 and FIG. 2. As illustrated in FIG. 19, the method according to the embodiment of the disclosure includes the following.

S201, a weight derivation mode for a current block is determined.

It should be noted that, in the embodiment of the disclosure, the video picture may be partitioned into multiple picture blocks, and the current block is a current picture block to-be-encoded, which may be referred to as a coding block (CB). Here, each coding block may include a first colour component, a second colour component, and a third colour component. Specifically, in this disclosure, if first prediction is performed, and the first colour component is a luma component, i. e. the colour component to-be-predicted is the luma component, the coding block to-be-predicted may be referred to as a luma block. Alternatively, if second prediction is performed, and the second colour component is a chroma component, i. e. the colour component to-be-predicted is the chroma component, the coding block to-be-predicted may be referred to as a chroma block.

It should be noted that, in the disclosure, the weight derivation mode is used to determine a weight used for the current block. Specifically, the weight derivation mode may be a mode for deriving a weight. For a block of a given length and width, each weight derivation mode may be used to derive one weight matrix. For blocks of the same size, weight matrices derived from different weight derivation modes may be different.

Exemplarily, in the disclosure, AWP has 56 weight derivation modes, and GPM has 64 weight derivation modes.

In the disclosure, the manner in which the weight derivation mode for the current block is determined at the encoding end includes, but is not limited to, the following manners.

Manner 1: The weight derivation mode is a default mode, for example, at the encoding end, it is determined by default that the weight derivation mode is a weight derivation mode with an index of 44.

Manner 2: The weight derivation mode is determined according to a cost. For example, at the encoding end, all possible combinations of K prediction modes and the weight derivation mode are attempted, where K is a positive integer and K>1, and a weight derivation mode corresponding to the minimum cost is selected and determined as the weight derivation mode for the current block.

Taking K=2 as an example, the K prediction modes include a first prediction mode and a second prediction mode. Assuming that there are 66 available prediction modes, then there are 66 possibilities for the first prediction mode, and since the second prediction mode is different from the first prediction mode, there are 65 possibilities for the second prediction mode. Assuming that there are 64 weight derivation modes (taking GPM as an example), then in the disclosure, any two different prediction modes and any one weight derivation mode may be used, and there are totally 66×65×64 possibilities. If it is specified that a PCM prediction mode is not used, there are 65×64×63 possibilities. As can be seen, in the disclosure, the prediction modes that can be selected from and the number of weight derivation modes that can be used may also be restricted, and then the number of such possible combinations is reduced accordingly.

Further, in the embodiment of the disclosure, the encoder may perform rate-distortion optimization (RDO) on all the possible combinations to determine a combination with the minimum cost.

If K=2, each combination is a combination of the first prediction mode, the second prediction mode, and the weight derivation mode.

Optionally, in order to reduce the time consumption of RDO, preliminary selection may be made on all the foregoing possible combinations, for example, preliminary selection is made by using an SAD, an SATD, etc. as an approximate cost to determine a specified number of candidate combinations of the first prediction mode, the second prediction mode, and the weight derivation mode. Then, RDO may be used for fine selection, to determine a combination of the first prediction mode, the second prediction mode, and the weight derivation mode with the minimum cost. In this way, the number of attempts is reduced by using some fast algorithms during preliminary selection. For example, if an angular prediction mode leads to high cost, several neighbouring prediction modes of the prediction mode will not be attempted.

It can be understood that, in the above preliminary selection and fine selection in the disclosure, the cost may include a cost of an overhead of encoding the first prediction mode, the second prediction mode, and the weight derivation mode in a bitstream. It is also possible to use an estimated cost of the overhead of the first prediction mode, the second prediction mode, and the weight derivation mode in the bitstream during the preliminary selection.

It can be understood that in the disclosure, during both preliminary selection and fine selection, a first prediction value will be determined according to the first prediction mode, a second prediction value will be determined according to the second prediction mode, the weight will be derived according to the weight derivation mode, and the prediction value in the disclosure will be determined according to the first prediction value, the second prediction value, and the weight. During SAD and SATD preliminary selection, the SAD and SATD are determined by using the current block and the prediction value corresponding to the current block. It should be noted that, deriving the weight according to the weight derivation mode may be understood as deriving a weight corresponding to each sample in the current block, or may be understood as deriving a weight matrix corresponding to the current block. When determining the prediction value of the current block based on the weights, the first prediction value and the second prediction value corresponding to each sample in the current block are determined, and the prediction value corresponding to each sample is determined according to the first prediction value, the second prediction value, and the weights corresponding to each sample, where the prediction value corresponding to each sample in the current block constitute the prediction value of the current block. Optionally, the prediction of the current block may be determined based on the weights on the block basis. For example, the first prediction value and the second prediction value of the current block are determined, and the first prediction value and the second prediction value of the current block are weighted according to the weight matrix of the current block to obtain a new prediction value of the current block.

In some embodiments, at the encoding end, before determining the weight derivation mode for the current block, whether to use two different prediction modes for weighted prediction of the current block needs to be determined. If it is determined at the encoding end that K different prediction modes are used for weighted prediction of the current block, the foregoing S201 is performed to determine the weight derivation mode for the current block.

In a possible implementation, at the encoding end, whether to use two different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether two different prediction modes can be used for prediction of the current block.

It can be understood that, in the embodiment of the disclosure, the prediction mode parameter may be understood as a flag bit indicating whether the GPM mode or the AWP mode is used. Specifically, the encoder may use a variable as the prediction mode parameter, so that the prediction mode parameter may be set by setting a value of the variable. Exemplarily, in the disclosure, if the GPM mode or the AWP mode is used for the current block, the encoder may set a value of the prediction mode parameter to indicate that the GPM mode or the AWP mode is used for the current block. Specifically, the encoder may set the value of the variable to 1. Exemplarily, in the disclosure, if the GPM mode or the AWP mode is not used for the current block, the encoder may set the value of the prediction mode parameter to indicate that the GPM mode or the AWP mode is not used for the current block. Specifically, the encoder may set the value of the variable to 0. Further, in the embodiments of the disclosure, after setting of the prediction mode parameter is completed, the encoder may signal the prediction mode parameter into a bitstream and transmit the bitstream to a decoder, so that the decoder can obtain the prediction mode parameter after parsing the bitstream.

It should be noted that, in the embodiment of the disclosure, the GPM mode or the AWP mode is a prediction method. Specifically, K different prediction modes are determined for the current block, K prediction values are determined according to the K different prediction modes, and then weights are determined to combine the K prediction values according to the weights, so as to obtain a new prediction value.

The K different prediction modes for the current block include the following examples.

Example 1: The K different prediction modes each are an intra prediction mode.

Example 2: The K different prediction modes each are an inter prediction mode.

Example 3: At least one of the K different prediction modes is an intra prediction mode, and at least one of the K different prediction modes is an inter prediction mode.

Example 4: At least one of the K different prediction modes is an intra prediction mode, and at least one of the K different prediction modes is a non-intra and non-inter prediction mode, for example, an IBC prediction mode or a palette prediction mode.

Example 5: At least one of the K different prediction modes is an inter prediction mode, and at least one of the K different prediction modes is a non-intra and non-inter prediction mode, for example, an IBC prediction mode or a palette prediction mode.

Example 6: None of the K different prediction modes is an intra prediction mode or an inter prediction mode. For example, one is an IBC prediction mode, and another is a palette prediction mode.

It should be noted that, there is no limitation on the types of the foregoing K different prediction modes in embodiments of the disclosure.

FIG. 15 is a schematic diagram illustrating prediction of the current block by using two prediction modes. As illustrated in FIG. 15, when predicting the current block, the first prediction mode may be used to determine the first prediction value, the second prediction mode may be used to determine the second prediction value, and then the first prediction value and the second prediction value may be combined based on weights, so as to obtain a new prediction value.

In some embodiments, limitations may be imposed on a size of the current block when applying the GPM mode or the AWP mode.

It may be understood that, in the prediction method provided in the embodiment of the disclosure, it is necessary to use the K different prediction modes to generate the K prediction values, which are then weighted to obtain a new prediction value, in order to reduce complexity while considering the trade-off between compression performance and complexity, the GPM mode or the AWP mode may not be used for blocks with certain sizes in the embodiment of the disclosure. Therefore, in the disclosure, at the encoding end, a size parameter of the current block may be firstly determined, and then whether to use the GPM mode or the AWP mode for the current block is determined according to the size parameter.

It should be noted that, in the embodiment of the disclosure, the size parameter of the current block may include a height and a width of the current block, and therefore, at the encoding end, the use of the GPM mode or the AWP mode may be restricted based on the height and the width of the current block.

Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold.

Exemplarily, in the disclosure, if the width of the current block is less than a third threshold and the height of the current block is greater than a fourth threshold, it is determined that the GPM mode or the AWP mode is used for the current block. As can be seen, one possible limitation is to use the GPM mode or the AWP mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

Further, in the embodiments of the disclosure, limitation on the size of a block for which the GPM mode or the AWP mode can be used may also be implemented through limitations on the sample parameter.

Exemplarily, in the disclosure, the encoder may firstly determine a sample parameter of the current block, and then determine, according to the sample parameter and a fifth threshold, whether the GPM mode or the AWP mode can be used for the current block. As can be seen, one possible limitation is to use the GPM mode or the AWP mode only when the number of samples in the block is greater than (or greater than or equal to) the fifth threshold. The value of the fifth threshold may be 8, 16, 32, etc.

That is, in the disclosure, the GPM mode or the AWP mode can be used for the current block only when the size parameter of the current block satisfies a size requirement.

Exemplarily, in the disclosure, a flag at a picture level may be used to determine whether the disclosure is applied to the current encoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

A flag below the picture level but above a CU level (such as tile, slice, patch, LCU, etc.) may be used to determine whether the disclosure is applied to that region.

S202, a template weight is determined according to the weight derivation mode.

In template matching, by utilizing correlation between neighbouring samples, some regions neighbouring the current block are taken as a template. Before coding the current block, blocks on the left and the top of the current block have already been encoded according to a coding order. In inter prediction, a best matching position of the template is found in a reference picture to determine motion information or a motion vector of the current block. In intra prediction, an intra prediction mode for the current block is determined by using the template.

There is no limitation on the shape of the template of the current block in the disclosure.

In some embodiments, the template includes at least one of a top encoded region, a left encoded region, or a top-left encoded region of the current block.

Optionally, a width of the top encoded region is the same as a width of the current block, a height of the left encoded region is the same as a height of the current block, a width of the top-left encoded region is the same as a width of the left encoded region, and a height of the top-left encoded region is the same as a height of the top encoded region.

As illustrated in Table 5 above, a template corresponding to the first prediction mode and a template corresponding to the second prediction mode each are a top encoded region of the current block, or a left encoded region of the current block, or a left encoded region and a top encoded region of the current block. In this way, during template matching, the template corresponding to the first prediction mode is used to determine the first prediction mode, and the template corresponding to the second prediction mode is used to determine the second prediction mode. For example, as illustrated in FIG. 16, taking a weight derivation mode whose GPM index is 2 as an example, a white area in a weight matrix of the current block means that a weight corresponding to a prediction value of the first prediction mode is 100%, and a black area means that a weight corresponding to a prediction value of the second prediction mode is 100%. As illustrated in FIG. 16, a first template corresponding to the first prediction mode is a top encoded region of the current block, a second template corresponding to the second prediction mode is a left encoded region of the current block, but a template close to the second prediction mode further includes part of the top encoded region besides the left region. Therefore, in the related art, template partitioning is not fine enough, and as a result, if a prediction mode is determined based on a template that is not fine enough, prediction mode determination will be inaccurate and prediction error will be high.

In order to solve the technical problem, in the disclosure, a finer partitioning of template can be achieved with aid of the weight derivation mode. For example, as illustrated in FIG. 17A, in the disclosure, a boundary line of a weight matrix corresponding to the weight derivation mode for the current block is extended to a template region for template partitioning. For example, a template on the right of the boundary line is referred to as a first template, and a template on the left of the boundary line is referred to as a second template. The first template corresponds to the first prediction mode, the second prediction mode corresponds to the second template, a weight of the first template is determined according to a weight corresponding to the first prediction mode, and a weight of the second template is determined according to a weight corresponding to the second prediction mode, for example, the weight of the first template is the same as the weight corresponding to the first prediction mode, and the weight of the second template is the same as the weight corresponding to the second prediction mode. During template matching, the first template may be used to derive the first prediction mode, and the second template may be used to derive the second prediction mode, thereby determining a prediction mode accurately and improving decoding effect.

In some embodiments, the first template and the second template partitioned according to the above method may not be rectangular. For example, as illustrated in FIG. 17A, the first template and the second template each have an oblique edge, and cost calculation for an irregular template is relatively complex.

In order to reduce complexity of template matching, in some embodiments, the weight matrix may be directly extended to a template region, for example, extended leftwards and upwards to cover the template, so as to determine the template weight. For example, as illustrated in FIG. 17B, a small rectangular region in the top-left of the current block may be added to the template, so that the template and the current block can constitute a rectangle. Alternatively, only the left part and the top part may be used as the template. As illustrated in FIG. 17B, the top-left region is exemplarily added, and regions in the left, the top-left, and the top in an upside-down L-shaped region are a template region, and a bottom-right rectangular region is the current block. In this case, part of the weight matrix extended to the top-left becomes a weight matrix of the template. In this way, the template does not need to be actually partitioned, but is simulately partitioned according to weights, that is, template partitioning is simulated according to a weight derivation mode, or a template weight is determined according to a weight derivation mode, and a cost of template matching is determined according to the template weight. Template partitioning may differ under different block shapes, but in the disclosure, there is no need to set various rules for blocks of various shapes, for example, there is no need to set a correspondence between prediction modes and templates as illustrated in Table 5. In addition, with regard to accuracy of "partitioning", the simulated partitioning in the disclosure is more precise and accurate than a method in which only a left region and a top region are differentiated.

In some embodiments, the left region and the top region of the current block illustrated in FIG. 17B may be used as the template of the current block, without considering the top-left matrix region.

During template matching, only one component (Y, Cb, Cr or R, G, B) may be used, for example, Y may be used in a YUV format because Y is dominant. Alternatively, all components may be used. For ease of illustration, one component is taken as an example in the disclosure, for example, template matching is performed exemplarily on a Y component, and the same applies to other components.

In the embodiment of the disclosure, the process of deriving the template weight according to the weight derivation mode may be combined with the process of deriving a weight of a prediction value, for example, the template weight and the weight of the prediction value are derived at the same time, where the weight of the prediction value may be understood as a weight corresponding to the prediction value. For example, the first prediction value is obtained according to the first prediction mode, the second prediction value is obtained according to the second prediction mode, a first weight of the first prediction value is determined according to the weight derivation mode, a second weight of the second prediction value is determined according to the weight derivation mode, and a sum of a product of the first prediction value and the first weight and a product of the second prediction value and the second weight is determined as a new prediction value.

In the disclosure, in order to distinguish from the template weight, the first weight and the second weight each are referred to as a weight of a prediction value.

In some embodiments, S202 includes the following steps S202-A and S202-B.

S202-A, an angle index and a distance index are determined according to a weight derivation mode.

S202-B, the template weight is determined according to the angle index, the distance index, and a size of the template.

In the disclosure, the template weight may be derived in the same manner as deriving a weight of a prediction value. For example, the angle index and the distance index are firstly determined according to the weight derivation mode, where the angle index may be understood as an angle index of a boundary line of each weight derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the template weight is determined according to the angle index, the distance index, and the size of the template.

The manner for deriving the template weight according to the weight derivation mode in S202-B includes, but is not limited to, the following manners.

Manner I: the template weight is determined directly according to the angle index, the distance index, and the size of the template. In this case, S202-B includes the following steps S202-B11 to S202-B13.

S202-B11, a first parameter of a sample in the template is determined according to the angle index, the distance index, and the size of the template.

S202-B12, a weight of the sample in the template is determined according to the first parameter of the sample in the template.

S202-B13, the template weight is determined according to the weight of the sample in the template.

In this implementation, the weight of the sample in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined according to the following manner.

Inputs to the process of deriving the template weight are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

$$nW = (cIdx == 0)?nCbW : nCbW * SubWidthC$$

$$nH = (cIdx == 0)?nCbH : nCbH * SubHeightC$$

$$shift1 = \text{Max}(5, 17 - BitDepth),$$

where BitDepth represents a coding bit depth;

$$offset1 = 1 \ll (shift1 - 1)$$

$$displacementX = angleIdx$$

$$displacementY = (angleIdx + 8)\%32$$

$$partFlip = (angleIdx >= 13 \;\&\&\; angleIdx <= 27)?0:1$$

$$shiftHor =$$

$$(angleIdx \% 16 == 8 || (angleIdx \% 16 != 0 \;\&\&\; nH >= nW))? 0:1$$

Offsets offsetX and offsetY are derived as follows:

if $shiftHor = 0$:

$$offsetX - (-nW) \gg 1$$

$$offsetY = ((-nH) \gg 1) + (angleIdx < 16)?(distanceIdx * nH) \gg 3 :$$

$$-((distanceIdx * nH) \gg 3))$$

otherwise (i.e. $shiftHor = 1$):

$$offsetX = ((-nW) \gg 1) + (angleIdx < 16)?(distanceIdx * nW) \gg 3 :$$

$$-((distanceIdx * nW) \gg 3))$$

$$offsetY - (-nH) \gg 1$$

A weight matrix wTemplateValue[x][y] (where x=−nTmW . . . nCbW−1, y=−nTmH . . . nCbH−1, except for the case where x>0 and y>0) of the template is derived as follows (it should be noted that in this example, the coordinate of a top-left corner of the current block is (0, 0)):

variables xL and yL are derived as follows:

$$xL = (cIdx == 0)?x : x * SubWidthC$$

$$yL = (cIdx == 0)?y : y * SubHeightC$$

disLut is determined according to Table 3 above;
the first parameter weightIdx is derived as follows:

$$weightIdx = (((xL + offsetX) \ll 1) + 1) * disLut[displacementX] +$$
$$(((yL + offsetY) \ll 1) + 1) * disLut[displacementY]$$

After the first parameter weightIdx is determined according to the foregoing method, a weight of a sample (x, y) of the template is determined according to weightIdx.

In the disclosure, the manner for determining the weight of the sample in the template according to the first parameter of the sample in the template in S202-B12 are not limited to the following manners.

Manner 1: A second parameter of the sample in the template is determined according to the first parameter of the sample in the template, and the weight of the sample in the template is determined according to the second parameter of the sample in the template.

The second parameter is also used for determining a weight. In some embodiments, the second parameter is also referred to as a weight index for a first component, and the first component may be a luma component, a chroma component, or the like.

For example, the weight of the sample in the template is determined according to the following formula:

$$weightIdxL = partFlip ? 32 + weightIdx : 32 - weightIdx$$
$$wTemplateValue[x][y] = Clip3(0, 8, (weightIdxL + 4) \gg 3)$$

wTemplateValue[x][y] is the weight of the sample (x, y) in the template. weightIdxL is the second parameter of the sample (x, y) in the template, and is also referred to as a weight index for the first component (for example, a luma component). wTemplateValue[x][y] is the weight of the sample (x, y) in the template. partFlip is an intermediate variable, and is determined according to the angle index angleIdx, for example, partFlip=(angleIdx>=13 && angleIdx<=27)?0:1 as described above, that is, partFlip=1 or 0. If partFlip=0, weightIdxL=32−weightIdx; and if partFlip=1, weightIdxL=32+weightIdx. It should be noted that, 32 herein is merely an example, and the disclosure is not limited thereto.

Manner 2: The weight of the sample in the template is determined according to the first parameter of the sample in the template, a first preset value, and a second preset value.

In order to reduce complexity of calculating the template weight, in manner 2, the weight of the sample in the template is limited to the first preset value or the second preset value, that is, the weight of the sample in the template is either the first preset value or the second preset value, thereby reducing complexity of calculating the template weight.

The value of each of the first preset value and the second preset value is not limited in the disclosure.

Optionally, the first preset value is 1.
Optionally, the second preset value is 0.
In an example, the weight of the sample in the template may be determined according to the following formula:

$$wTemplateValue[x][y] = (partFlip ? weightIdx : -weightIdx) > 0 ? 1 : 0$$

wTemplateValue[x][y] is the weight of the sample (x, y) in the template. In the foregoing "1:0", 1 is the first preset value and 0 is the second preset value.

In manner I above, the weight of each sample in the template is determined according to the weight derivation mode, and a weight matrix formed by the weight of each sample in the template is used as the template weight.

Manner II: A weight of the current block and the template weight are determined according to the weight derivation mode. That is, in manner II, a merge region consisting of the current block and the template is taken as a whole, and a weight of a sample in the merge region is derived according to the weight derivation mode. Based on this, S202-B includes the following steps S202-B21 and S202-B22.

S202-B21, a weight of a sample in a merge region consisting of the current block and the template is determined according to the angle index, the distance index, the size of the template, and a size of the current block.

S202-B22, the template weight is determined according to the size of the template and the weight of the sample in the merge region.

In manner II, the current block and the template are taken as a whole, the weight of the sample in the merge region consisting of the current block and the template is determined according to the angle index, the distance index, the size of the template, and the size of the current block, and then according to the size of the template, a weight corresponding to the template in the merge region is determined as the template weight, for example, as illustrated in FIG. 18, a weight corresponding to an L-shaped template region in the merge region is determined as the template weight.

In manner II, in a weight determination process, the template weight and the weight of a prediction value are determined, i. e. the weight of the prediction value is a weight corresponding to the merge region other than the template weight, so that a subsequent prediction process can be performed according to the weight of the prediction value, and the weight of the prediction value does not need to be determined again, thereby reducing the steps for prediction and improving prediction efficiency.

There is no limitation on the implementation of determining the weight of the sample in the merge region consisting of the current block and the template according to the angle index, the distance index, the size of the template, and the size of current block in the disclosure.

In some embodiments, determining the weight of the sample in the merge region in S202-B21 includes the following steps S202-B211 to S202-B212.

S202-B211, a first parameter of the sample in the merge region is determined according to the angle index, the distance index, and a size of the merge region.

S202-B212, the weight of the sample in the merge region is determined according to the first parameter of the sample in the merge region.

In this implementation, the weight of the sample in the merge region is determined according to the angle index, the distance index, and the size of the merge region, and a weight of each sample in the merge region forms a weight matrix.

In a possible implementation, an offset and the first parameter may be determined according to the following manner.

Inputs to the process of deriving the weight of the merge region are: as illustrated in FIG. 18, the width nCbW of the current block, the height nCbH of the current block, a width nTmW of a left template, a height nTmH of a top template, a "partition" angle index variable angleId of GPM, a distance index variable distanceIdx of GPM, a component index variable cIdx. Exemplarily, in the disclosure, a luma component is taken as an example, and therefore cIdx=0, which indicates the luma component.

Variables nW, nH, shift1, offset1, displacementX, displacementY, partFlip, and shiftHor are derived as follows:

$$nW = (cIdx == 0)?nCbW : nCbW * SubWidthC$$

$$nH = (cIdx == 0)?nCbH : nCbH * SubHeightC$$

$shift1 = \text{Max}(5, 17 - BitDepth),$ where BitDepth represents a coding bit depth;

$$offset1 = 1 << (shift1 - 1)$$

$$displacementX = angleIdx$$

$$displacementY = (angleIdx + 8)\%32$$

$$partFlip = (angleIdx >= 13 \ \&\& \ angleIdx <= 27)? 0:1$$

$shiftHor =$ $$(angleIdx \% 16 == 8||(angleIdx \% 16 != 0 \ \&\& \ nH >= nW))? 0:1$$

Offsets offsetX and offsetY are derived as follows:

if $shiftHor = 0$:

$$offsetX - (-nW) \gg 1$$

$offsetY = ((-nH) \gg 1) +$ $$(angleIdx < 16?(distanceIdx * nH) \gg 3 : -((distanceIdx * nH) \gg 3))$$

otherwise (i.e. $shiftHor = 1$):

$offsetX = ((-nW) \gg 1) +$ $$(angleIdx < 16?(distanceIdx * nW) \gg 3 : -((distanceIdx * nW) \gg 3))$$

$$offsetY - (-nH) \gg 1$$

The weight matrix wValueMatrix[x][y] (where x=−nTmW . . . nCbW−1, y=−nTmH . . . nCbH−1) of the sample in the merge region is derived as follows (it should be noted that in this example, the coordinate of a top-left corner of the current block is (0, 0)):
variables xL and yL are derived as follows:

$$xL = (cIdx == 0)?x : x * SubWidthC$$

$$yL = (cIdx == 0)?y : y * SubHeightC$$

disLut is determined according to Table 3;
the first parameter weightIdx is derived as follows:

$weightIdx = (((xL + offsetX) \ll 1) + 1) * disLut[displacementX] +$ $$(((yL + offsetY) \ll 1) + 1) * disLut[displacementY]$$

After the first parameter weightIdx is determined according to the foregoing method, a weight of a sample (x, y) in the merge region is determined according to weightIdx.

In the disclosure, the manner for determining the weight of the sample in the merge region according to the first parameter of the sample in the merge region in S202-B212 are not limited to the following manners.

Manner 1: A second parameter of the sample in the merge region is determined according to the first parameter of the sample in the merge region, and the weight of the sample in the merge region is determined according to the second parameter of the sample in the merge region.

For example, the weight of the sample in the merge region is determined according to the following formula:

$weightIdx = (((xL + offsetX) \ll 1) + 1) * disLut[displacementX] +$ $$(((yL + offsetY) \ll 1) + 1) * disLut[displacementY]$$

$$weightIdxL = partFlip?32 + weightIdx : 32 - weightIdx$$

$$wValueMatrix[x][y] = Clip3(0, 8(weightIdxL + 4) \gg 3)$$

wValueMatrix[x][y] is the weight of the sample (x, y) in the merge region. weightIdxL is the second parameter of the sample (x, y) in the merge region. wTemplateValue[x][y] is the weight of the sample (x, y) in the merge region.

Manner 2: The weight of the sample in the merge region is determined according to the first parameter of the sample in the merge region, a first preset value, and a second preset value.

Exemplarily, the weight of the sample in the merge region is the first preset value or the second preset value.

In order to reduce complexity of calculating the weight of the merge region, in manner 2, the weight of the sample in the merge region is limited to the first preset value or the second preset value, that is, the weight of the sample in the merge region is either the first preset value or the second preset value, thereby reducing complexity of calculating the weight of the merge region.

The value of each of the first preset value and the second preset value is not limited in the disclosure.

Optionally, the first preset value is 1.

Optionally, the second preset value is 0.

In an example, the weight of the sample in the merge region may be determined according to the following formula:

$$wTemplateValue[x][y] = (partFlip?weightIdx : -weightIdx) > 0?1:0$$

wValueMatrix[x][y] is the weight of the sample (x, y) in the merge region. In the foregoing "1:0", 1 is the first preset value and 0 is the second preset value.

In manner II above, the weight of each sample in the merge region consisting of the current block and the template is determined according to the weight derivation mode, and then a weight corresponding to the template in the merge region is determined as the template weight according to the size of the template. In addition, in manner II, a weight of a prediction value is also determined, and it is unnecessary to perform subsequent steps of determining the weight of the prediction value, thereby reducing the steps for prediction and improving prediction efficiency.

After the template weight is determined according to the foregoing steps, S203 is performed.

S203, at least one of the K prediction modes for the current block is determined according to the template weight.

The template weight in the disclosure may be understood as a template weight in determining the first prediction mode. For example, as illustrated in FIG. 17B, the black area in the template has less contribution to determination of the first prediction mode, for example, the weight is 0, and has more contribution to determination of the second prediction mode, for example, the weight is 1. The white area in FIG. 17B has more contribution to determination of the first prediction mode, for example, the weight is 1, and has less contribution to determination of the second prediction mode, for example, the weight is 0. The gray area in FIG. 17B has contribution to determination of both the first prediction mode and the second prediction mode.

Based on this, at least one of the K prediction modes may be determined according to the weight of the sample in the template. For example, the template weight is determined as a weight corresponding to the first prediction mode, and a weight corresponding to the second prediction mode may be understood as a weight obtained by subtracting the weight corresponding to the first prediction mode from a preset maximum weight value. Then the first prediction mode is determined according to the template and the weight corresponding to the first prediction mode, and the second prediction mode is determined according to the template and the weight corresponding to the second prediction mode.

In some embodiments, if a $j^{th}$ prediction mode in the K prediction modes is determined through template matching, determining at least one of the K prediction modes according to the template weight in S203 includes the following steps S203-A1 to S203-A4.

S203-A1, at least one candidate prediction mode is obtained.

The at least one candidate prediction mode may be understood as a candidate prediction mode corresponding to the $j^{th}$ prediction mode. In some embodiments, different prediction modes may correspond to different candidate prediction modes. In some embodiments, if two prediction modes are of the same type, for example, the two prediction modes each are an intra prediction mode, the two prediction modes may correspond to the same candidate prediction mode.

In the embodiment of the disclosure, at the encoding end, before determining the $j^{th}$ prediction mode, whether the $j^{th}$ prediction mode is determined through template matching is firstly determined.

In a possible implementation, at the encoding end, enable flag A is obtained, where flag A indicates whether the $j^{th}$ prediction mode is determined through template matching. Exemplarily, if the value of flag A is 1, it indicates that the $j^{th}$ prediction mode is determined through template matching; and if the value of the flag is 0, it indicates that the $j^{th}$ prediction mode is not determined through template matching.

Optionally, the foregoing enable flag may further indicate whether template matching is allowed to be used to determine a prediction mode for the current sequence or the current picture. If the enable flag indicates that template matching is allowed to be used to determine the prediction mode. In this case, the at least one candidate prediction mode is obtained, a cost of the candidate prediction mode is determined, and the $j^{th}$ prediction mode is determined according to the cost of the candidate prediction mode.

In a possible implementation, at the encoding end, it is determined by default that the $j^{th}$ prediction mode is determined through template matching. In this way, at the encoding end, when determining the $j^{th}$ prediction mode, the $j^{th}$ prediction mode is determined through template matching by default. Then at least one candidate prediction mode is obtained, a cost of the candidate prediction mode is determined, and the $j^{th}$ prediction mode is determined according to the cost of the candidate prediction mode.

In some embodiments, if the $j^{th}$ prediction mode is an inter prediction mode, the at least one candidate prediction mode includes one or more inter prediction modes, for example, includes at least one of skip, merge, a common inter prediction mode, unidirectional prediction, bidirectional prediction, or multi-hypothesis prediction.

In some embodiments, if the $j^{th}$ prediction mode is an intra prediction mode, the at least one candidate prediction mode includes at least one of a DC mode, a planar mode, or an angular mode. Optionally, the at least one candidate prediction mode includes an intra prediction mode in an MPM list.

In some embodiments, the at least one candidate prediction mode may further include modes such as IBC, palette, etc.

There is no limitation on the type(s) and the number of prediction modes in the at least one candidate prediction mode in the disclosure.

Optionally, the at least one candidate prediction mode is a preset mode.

Optionally, the at least one candidate prediction mode is a mode in the MPM list.

Optionally, the at least one candidate prediction mode is a set of candidate prediction modes determined according to some rules, such as equidistant selection.

S203-A2, a prediction value(s) of the template is obtained by predicting the template with the candidate prediction mode.

Exemplarily, for each candidate prediction mode in the at least one candidate prediction mode, the template is predicted with the candidate prediction mode to determine the prediction value of the template, where the prediction value of the template may be understood as a matrix formed by a prediction value of each sample in the template.

In some embodiments, the prediction value is also referred to as a prediction sample.

S203-A3, a cost of the candidate prediction mode is determined according to the prediction value of the template, a reconstructed value of the template, and the template weight.

Exemplarily, for each candidate prediction mode in the at least one candidate prediction mode, the cost of the candidate prediction mode is determined according to a prediction value of a sample corresponding to the candidate prediction mode, the reconstructed value of the template, and the template weight. For example, a loss between the prediction value of the sample and the reconstructed value is determined according to the prediction value of the sample and the reconstructed value, and the cost of the candidate prediction mode is determined according to the loss and the template weight.

In some embodiments, S203-A3 includes the following.

S203-A31, a template weight corresponding to the $j^{th}$ prediction mode is determined according to the template weight.

S203-A32, the cost of the candidate prediction mode is determined according to the prediction value of the template, the reconstructed value of the template, and the template weight corresponding to the $j^{th}$ prediction mode.

For example, if the $j^{th}$ prediction mode is the first prediction mode, the template weight determined may be determined as a template weight corresponding to the first prediction mode.

The manner for determining the cost of the candidate prediction modes in S203-A32 includes, but are not limited to, the following manners.

Manner I: The cost of the candidate prediction mode is determined by means of a matrix. Specifically, a loss is determined according to the prediction value of the template and the reconstructed value of the template, and the loss is recorded as a first loss. Since the prediction value of the template and the reconstructed value of the template are matrices, the first loss obtained is a matrix, for example, an absolute value of a difference between the prediction value of the template and the reconstructed value of the template is determined as the first loss. Then, the cost of the candidate prediction mode is determined according to the loss and the template weight corresponding to the $j^{th}$ prediction mode, where the template weight corresponding to the $j^{th}$ prediction mode is also a matrix. In this way, determination of the cost of the candidate prediction mode according to the loss and the template weight corresponding to the $j^{th}$ prediction mode is an operation between matrices, for example, a product of the first loss and the template weight corresponding to the $j^{th}$ prediction mode is determined as the cost of the candidate prediction mode.

Manner II: The cost of the candidate prediction mode is determined on a sample basis, that is, the foregoing S203-A32 includes the following.

S203-A321, for an $i^{th}$ sample in the template, a first loss between an $i^{th}$ prediction value corresponding to the $i^{th}$ sample in the prediction value of the template and an $i^{th}$ reconstructed value corresponding to the $i^{th}$ sample in the reconstructed value of the template is determined.

S203-A322, a cost of the candidate prediction mode at the $i^{th}$ sample is determined according to the first loss at the $i^{th}$ sample and a weight of the $i^{th}$ sample in the template weight corresponding to the $j^{th}$ prediction mode.

S203-A323, the cost of the candidate prediction mode is determined according to costs of the candidate prediction mode at samples in the template.

In manner II, for each sample in the template, a first loss of the candidate prediction mode at the sample is determined according to a prediction value of the sample and a reconstructed value of the sample, and the cost of the candidate prediction mode at the sample is determined according to the first loss at the sample and a weight of the sample.

For ease of illustration, taking the $i^{th}$ sample in the template as an example, the $i^{th}$ sample may be understood as any sample in the template, that is, the process of determining a cost at each sample in the template is the same, and reference can be made to the $i^{th}$ sample. Specifically, the prediction value of the template is obtained by predicting the template with the candidate prediction mode, the prediction value corresponding to the $i^{th}$ sample in the prediction value of the template is recorded as an $i^{th}$ prediction value, and the reconstructed value corresponding to the $i^{th}$ sample in the reconstructed value of the template is recorded as an $i^{th}$ reconstructed value. Then, the first loss of the candidate prediction mode at the $i^{th}$ sample is determined according to the $i^{th}$ prediction value and the $i^{th}$ reconstructed value. According to the above method, a first loss(es) of the candidate prediction mode at each sample or at multiple samples in the template is determined, and then the cost of the candidate prediction mode is determined according to the first loss at each sample or the multiple samples in the template. For example, a sum of costs of the candidate prediction mode at samples in the template is determined as the cost of the candidate prediction mode, or an average value of costs of the candidate prediction mode at samples in the template is determined as the cost of the candidate prediction mode. Determination of the cost of the candidate prediction mode according to the first loss at at least one sample in the template is not limited in the disclosure.

Exemplarily, taking an SAD cost as an example, the cost of the candidate prediction mode at the $i^{th}$ sample (x, y) in the template may be determined according to the following formula (3):

$$tempValueA[x][y] = recTemplateSamples[x][y]) * wTemplateValue[x][y] \quad (3)$$

Exemplarily, the cost of the candidate prediction mode is determined according to the following formula (4):

$$costCandA = \sum tempValueA[x][y] \quad (4)$$

abs(predTemplateSamplesCandA[x][y]−recTemplateSamples[x][y]) is an absolute value of a difference between the prediction value predTemplateSamplesCandA of sample (x, y) in the template and a reconstructed sample recTemplateSamples. The absolute value of the difference is referred to as the first loss corresponding to sample (x, y). The value is multiplied by a weight wTemplateValue[x][y] of the sample in a weight corresponding to the candidate prediction mode, so as to obtain tempValueA[x][y]. tempValueA[x][y] may be considered as the cost of the candidate prediction mode at sample (x, y). A total cost costCandA of the candidate prediction mode in the template is a sum of a cost at each sample in the template.

It should be noted that, the cost of the candidate prediction mode is determined exemplarily according to the SAD. Optionally, the cost of the candidate prediction mode may also be determined according to cost calculation methods such as SATD and MSE.

According to the foregoing method, the cost of the candidate prediction mode may be determined, and then the following step S203-A4 is performed.

S203-A4, the $j^{th}$ prediction mode is determined according to the cost of the at least one candidate prediction mode.

In the embodiment of the disclosure, if the $j^{th}$ prediction mode is determined through template matching, then according to the foregoing method, a cost of each candidate prediction mode is determined, and the $j^{th}$ prediction mode is determined according to the cost of each candidate prediction mode.

Example 1: A candidate prediction mode with the minimum cost among the at least one candidate prediction mode is determined as the $j^{th}$ prediction mode.

Example 2: One or more candidate prediction modes are selected from the at least one candidate prediction mode according to the cost of the candidate prediction mode, and the $j^{th}$ prediction mode is determined from the one or more candidate prediction modes.

In a possible implementation of example 2, at the encoding end, one candidate prediction mode is selected from the one or more candidate prediction modes as the $j^{th}$ prediction mode.

Specifically, the $j^{th}$ prediction mode is determined from the one or more candidate prediction modes. For example, the number of the one or more candidate prediction modes is M, and the encoding end sorts the M candidate prediction modes according to costs. For example, the M candidate prediction modes are sorted in an ascending order of cost, or the M candidate prediction modes are sorted in a descending order of cost. One candidate prediction mode B is determined from the sorted M candidate prediction modes as the $j^{th}$ prediction mode. Then, at the encoding end, an identifier of candidate prediction mode B is signalled into the bitstream, where the identifier of candidate prediction mode B may be a sequence number of candidate prediction mode B in the M candidate prediction modes, or may be a mode index number of candidate prediction mode B.

In another possible implementation of example 2, at the encoding end, an alternative prediction mode for the current block is obtained, a cost for predicting the template with the alternative prediction mode is determined, and according to the cost, one prediction mode is selected from the alternative prediction mode and the one or more candidate prediction modes as the $j^{th}$ prediction mode.

Optionally, the alternative prediction mode for the current block includes one or more of a prediction mode for a reconstructed coding block neighbouring the current block and/or a preset prediction mode.

It can be understood that, in the disclosure, the preset prediction mode may include one or more of multiple different modes such as a DC mode, a bilinear mode, and a planar mode.

Specifically, at the encoding end, the alternative prediction mode for the current block is obtained, for example, one or more of the prediction mode for a reconstructed coding block neighbouring the current block and/or the preset prediction mode is taken as the alternative prediction mode for the current block. Then, a cost for predicting the template with each alternative prediction mode is determined, for example, the current block is predicted with the alternative prediction mode to obtain a prediction value, and the prediction value is compared with the reconstructed value of the template to obtain a cost of the alternative prediction mode, where the cost of the alternative prediction mode may be a cost such as an SAD or an SATD. According to the cost of the alternative prediction mode and costs of the one or more candidate prediction modes, one prediction mode is selected from the alternative prediction mode and the one or more candidate prediction modes as the $j^{th}$ prediction mode, for example, a prediction mode with the minimum cost among the alternative prediction mode and the one or more candidate prediction modes is determined as the $j^{th}$ prediction mode.

It should be noted that, the alternative prediction mode for the current block is different from the one or more candidate prediction modes determined. That is, at the encoding end, a prediction mode which is the same as the one or more candidate prediction modes is removed from the prediction mode for a reconstructed coding block neighbouring the current block and/or the preset prediction mode, and the rest of the prediction modes is determined as the alternative prediction mode for the current block.

It can be understood that, for inter prediction, during template matching, "searching" may be performed on the basis of initial motion information. For each prediction mode, one motion information needs to be determined. Some pieces of motion information may be determined within a certain range around the initial motion information, so as to determine some prediction modes. For example, one initial motion information is given, where a motion vector thereof is (xInit, yInit). A search range is set, for example, a rectangular region from xInit−sR to xInit+sR in a horizontal direction and from yInit−sR to yInit+sR in a vertical direction, where sR may be 2, 4, 8, etc. Each motion vector in the rectangular region may be combined with other information, such as a reference picture index and a prediction list flag, of the initial motion information to determine one motion information, thereby determining one prediction mode. The at least one candidate prediction mode may include the determined prediction mode. For example, if GPM is used in a merge mode and the first prediction mode is determined through template matching, merge_gpm_idx0 may be used to determine one initial motion information from mergeCandList. Then $(2*sR+1)*(2*sR+1)$ pieces of motion information are determined according to the foregoing method, so as to determine some prediction modes, where these prediction modes each are a merge mode or are referred to as a template matching-based merge mode.

It should be noted that, if a set consisting of the at least one candidate prediction mode includes a large number of prediction modes, considering complexity, cost determination may not be performed for each candidate prediction mode in the at least one candidate prediction mode. In some embodiments, the process of determining the $j^{th}$ prediction mode according to the cost of the at least one candidate prediction mode may be extended to several rounds of processes from coarse selection to fine selection. For example, in an inter prediction mode, the motion vector supports fractional-sample accuracy, such as ¼, ⅛, or ¹⁄₁₆ accuracy. Therefore, a prediction mode with the lowest cost among a prediction mode with an integer-sample motion vector may be firstly chosen, and then a prediction mode with the lowest cost is selected from the prediction mode chosen and a prediction mode with a fractional-sample motion vector whose motion vector is near a motion vector of the mode chosen. For example, in an intra prediction mode, one or more intra prediction modes are firstly selected at a certain granularity according to the cost of the candidate prediction mode, and then screening is performed on the one or more intra prediction modes and neighbouring intra prediction modes of finer granularity.

In the embodiment of the disclosure, if the $j^{th}$ prediction mode in the K prediction modes is determined through template matching, at least one candidate prediction mode is obtained, a prediction value of the template in the candidate prediction mode is obtained by predicting the template with the candidate prediction mode, the cost of the candidate prediction mode is obtained according to a prediction value of the template and a reconstructed value of the template in the candidate prediction mode, and the $j^{th}$ prediction mode is obtained according to the cost of the candidate prediction mode.

In the foregoing embodiment, the process of determining the $j^{th}$ prediction mode in the K prediction modes is taken as an example for illustration, and the process of determining other prediction modes in the K prediction modes is consistent with the process of determining the $j^{th}$ prediction mode, and reference can be made thereto. For example, K=2. The first prediction mode and the second prediction mode are determined according to the method. Then, at the encoding end, the first prediction value is obtained according to the first prediction mode, the second prediction value is obtained according to the second prediction mode, and the first prediction value and the second prediction value are weighted to obtain a new prediction value.

In some embodiments, at the encoding end, after determining the $j^{th}$ prediction mode through template matching, flag A is signalled into the bitstream, where flag A indicates whether the $j^{th}$ prediction mode is determined through template matching.

According to the embodiment of the disclosure, after a $K^{th}$ prediction mode is determined according to the foregoing method, step S204 is performed, so as to determine a prediction value according to the K prediction modes and the weight derivation mode.

S204, a prediction value is determined according to the K prediction modes and the weight derivation mode.

Specifically, weights of prediction values are determined according to the weight derivation mode, K prediction values are determined according to the K prediction modes, the K prediction values are weighted according to the weights of prediction values, and a weighted result is determined as a new prediction value.

In the disclosure, the manner for determining the weights of the prediction values according to the weight derivation mode includes, but is not limited to, the following manners.

Manner I: If the template weight is determined according to the weight derivation mode but a weight of a prediction value of the current block is not yet determined during determination of the template weight, the foregoing step S204 includes the following steps.

S204-A1, K prediction values are determined according to the K prediction modes.

S204-A2, weights of the K prediction values are determined according to the weight derivation mode.

S204-A3, a new prediction value is determined according to the K prediction values and the weights of the K prediction values.

It should be noted that, in the disclosure, the weight derivation mode is used to determine weights of prediction values used for the current block. Specifically, the weight derivation mode may be a mode for deriving the weights of the prediction values. For a block of a given length and width, each weight derivation mode may be used to derive one weight matrix of prediction values. For blocks of the same size, weight matrices of prediction values derived from different weight derivation modes may be different.

Exemplarily, in the disclosure, there are 56 weight derivation modes for AWP in AVS3 and 64 weight derivation modes for GPM in VVC.

It can be understood that, in the embodiment of the disclosure, at the encoding end, when determining the prediction value based on the K prediction modes and the weights of the prediction values, the K prediction values may be firstly determined according to the K prediction modes, and then the K prediction values are weighted according to the weights of the prediction values, so as to obtain a new prediction value.

In manner I, it can be understood that, determination of the template weight according to the weight derivation mode and determination of the weights of the prediction values according to the weight derivation mode are two independent processes and do not interfere with each other. For example, the template weight is determined according to the weight derivation mode, and at least one of the K prediction modes is determined according to the template weight. The weights of the prediction values are determined according to the weight derivation mode, and then a final prediction value is obtained according to the K prediction modes and the weights of the prediction values.

In some embodiments, the weights of the prediction values may also be determined in the following manner II.

Manner II: If a weight of a sample in a merge region consisting of a template region and the current block is determined according to the weight derivation mode during determination of the template weight, S204 includes the following steps:

S204-B1, K prediction values are determined according to the K prediction modes.

S204-B2, weights of the K prediction values are determined according to the weight of the sample in the merge region.

S204-B3, a new prediction value is determined according to the K prediction values and the weights of the K prediction values.

In manner II, during weight derivation, the weight of the sample in the merge region is derived according to the weight derivation mode, and the merge region includes the current block and a template region of the current block, so that weights corresponding to the current block in the merge region are determined as the weights of the prediction values, and a weight corresponding to the template region in the merge region is determined as the template weight. That is, in manner II, the template region and the current block are taken as a whole, so that the template weight and the weights of the prediction values are derived in one step, thereby reducing steps for weight derivation and improving prediction effect.

In some embodiments, the foregoing prediction process is performed on a sample basis, and accordingly, the weight is a weight corresponding to a sample. In this case, when predicting the current block, sample A in the current block is predicted with each of the K prediction modes, so as to obtain K prediction values at sample A for the K prediction modes; weights of the K prediction values at sample A are determined according to the weight derivation mode; and the K prediction values are weighted so as to obtain a final prediction value of sample A. The foregoing steps are performed on each sample in the current block, and a final prediction value of each sample in the current block can be obtained, where the final prediction value of each sample in the current block forms a final prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights of prediction values corresponding to sample A, to obtain a final prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to weights of prediction values to obtain a new prediction value. For example, sample A is predicted with the first intra prediction mode to obtain a first prediction value of sample A, sample A is predicted with the second intra prediction mode to obtain a second prediction value of sample A, and the first prediction value and the second prediction value are weighted according to weights of prediction values corresponding to sample A, so as to obtain a new prediction value of sample A.

In some embodiments, if the $j^{th}$ prediction mode in the K prediction modes is an inter prediction mode, determining the prediction value according to the K prediction modes and the weight derivation mode in step S204 includes the following steps.

S204-C1, motion information is determined according to the $j^{th}$ prediction mode.

S204-C2, a $j^{th}$ prediction value is determined according to the motion information.

S204-C3, (K−1) prediction values are determined according to prediction modes other than the $j^{th}$ prediction mode in the K prediction modes.

S204-C4, weights of the K prediction values are determined according to the weight derivation mode.

S204-C5, a new prediction value is determined according to the $j^{th}$ prediction value, the (K−1) prediction values, and the weights of the prediction values.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to weights of prediction values to obtain a new prediction value. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. With regard to weights of prediction values of each sample in the current block, the first prediction value and the second prediction value of the current block are weighted on a sample basis, so as to obtain a new prediction value of the current block. For example, for sample A in the current block, a first prediction value corresponding to sample A in the first prediction value of the current block and a second prediction value corresponding to sample A in the second prediction value of the current block are weighted according to weights of prediction values of sample A, so as to obtain a new prediction value of sample A.

In some embodiments, if K>2, weights of prediction values corresponding to two prediction modes in the K prediction modes may be determined according to the weight derivation mode, and a weight(s) of a prediction value(s) corresponding to other prediction mode(s) in the K prediction modes may be a preset value(s). For example, K=3, a weight of a prediction value corresponding to the first prediction mode and a weight of a prediction value corresponding to the second prediction mode are derived according to the weight derivation mode, and a weight of a prediction value corresponding to a third prediction mode is a preset value. In some embodiments, if a total prediction-value weight corresponding to the K prediction modes is constant, for example, is 8, a weight of a prediction value corresponding to each of the K prediction modes may be determined according to a preset weight proportion. Assuming that the weight of the prediction value corresponding to the third prediction mode accounts for ¼ of the total prediction-value weight, it may be determined that the weight of the prediction value of the third prediction mode is 2, and the remaining ¾ of the total prediction-value weight is allocated to the first prediction mode and the second prediction mode. Exemplarily, if a weight of the prediction value corresponding to the first prediction mode derived according to the weight derivation mode is 3, it is determined that the weight of the prediction value corresponding to the first prediction mode is (¾)*3, and the weight of the prediction value corresponding to the second prediction mode is (¾)*5.

In some embodiments, at the encoding end, before performing the method in the embodiment of the disclosure, whether template matching is applicable to the current block needs to be determined. If it is determined at the encoding end that template matching is applicable to the current block, steps S201 to S204 are performed. If it is determined at the encoding end that template matching is not applicable to the current block, the K prediction modes are determined in other manners.

Exemplarily, at the encoding end, whether template matching is applicable to the current block is determined in the following manners.

Manner I: At the encoding end, whether template matching is applicable to the current block is determined according to the distribution of the template weight.

In a possible implementation, whether template matching is applicable to the current block may be determined according to the template weight.

In an example, if the number of samples with a weight greater than a first threshold in the template is greater than or equal to a preset threshold, it is determined that template matching is applicable to the current block, and then step S203 is performed to determine the at least one of the K prediction modes for the current block according to the template weight.

Optionally, the first threshold may be 0.

Optionally, the first threshold is a median value of weights, for example, 4.

Optionally, the preset threshold is a fixed value.

Optionally, the preset value is determined according to the size of the current block, for example, 1/m1 of the total number of samples in the current block, where m1 is a positive number.

Optionally, the preset value is determined according to the size of the template, for example, 1/m2 of the total number of samples in the template, where m2 is a positive number.

In another example, if the number of samples with a weight greater than the first threshold in the template is less than the preset threshold, the at least one of the K prediction modes for the current block is determined according to the weight derivation mode.

In the embodiment of the disclosure, at the encoding end, after determining the template weight according to the weight derivation mode according to the above step S202, whether template matching is applicable to the current block is determined according to a template weight corresponding to a sample in the template weight. Exemplarily, if the number of samples with a weight greater than the first threshold in the template is greater than or equal to the preset threshold, it indicates that an available template region corresponding to the first prediction mode in the template is large, and if the first prediction mode is determined through template matching, prediction effect may be improved. If the number of samples with a weight greater than the first threshold in the template is less than the preset threshold, it indicates that the available template region corresponding to the first prediction mode in the template is relatively small or does not exist. In this case, if the first prediction mode is determined through template matching, it will lead to adverse effect in addition to failure to improve compression efficiency.

In some embodiments, at the encoding end, a first flag is signalled into the bitstream, where the first flag indicates whether to use template matching to derive a prediction mode. In this way, at the decoding end, whether to use template matching to derive the prediction mode for the current block may be determined according to the first flag.

Exemplarily, if it is determined at the encoding end that template matching is to be used to derive the prediction mode for the current block, the first flag is set to 1, and the first flag set to 1 is signalled into the bitstream. If it is determined at the encoding end that template matching is not to be used to derive the prediction mode for the current block, the first flag is set to 0, and the first flag set to 0 is signalled into the bitstream. In this way, at the decoding end, after obtaining the bitstream, the first flag is obtained by decoding the bitstream, and whether to use template matching to derive the prediction mode for the current block is determined according to the first flag.

In some embodiments, if it is determined that template matching is not applicable to the current block, the first prediction mode and/or the second prediction mode is determined according to the weight derivation mode.

In the disclosure, the positions where the weight values change form a straight line (or curved line), or in the blending area as illustrated in FIG. 4 and FIG. 5, the positions where the weight values are the same form a straight line (or curved line). Such straight line may be called a boundary line. The boundary line itself also has an angle. The angle horizontal to the right may be set to 0 degrees, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a block, the corresponding texture is likely to show different characteristics on two sides of the boundary line, such as textures with two different angles on two sides of the boundary line respectively, or an angular texture on one side of the boundary line and a flat texture on the other side of the boundary line. Since the boundary line itself also has an angle, it may be assumed that the boundary line is obtained through angular prediction with a point, which may be close to some textures of the current block, so there is correlation between this straight line and the two prediction modes for the current block.

Specifically, in the disclosure, assuming that the boundary line is obtained through angular prediction with a point, at least one angular prediction mode may be found, which may be used to approximately create the boundary line. For example, a horizontal boundary line matches a horizontal prediction mode, such as mode 18 in VVC. A vertical boundary line matches a vertical intra prediction mode, such as mode 50 in VVC. A 45-degree boundary line may match a 45-degree intra prediction mode from bottom-left to top-right such as mode 66 in VVC, or a 225-degree intra prediction mode from top-right to bottom-left such as mode 2 in VVC. Thus, the weight derivation mode may match some intra prediction mode(s).

It should be noted that, in the disclosure, the weight derivation mode may also be the index of the weight, for example, the 56 modes of AWP may be considered as 56 weight derivation modes, and the 64 modes of GPM in VVC may be considered as 64 weight derivation modes.

In some embodiments, in addition to the intra angular prediction mode corresponding to the weight boundary line, some intra angular prediction modes related to the weight boundary line are also more likely to be used, such as intra prediction modes corresponding to angles near the boundary line or perpendicular to the boundary line.

In some embodiments, if the K prediction values each are obtained by predicting with an intra prediction mode, K different intra prediction modes should be used in GPM.

In some embodiments, if at least one of the K prediction values is obtained by predicting with an intra prediction mode and at least one of the K prediction values is obtained by predicting with another prediction method, only a small number of intra prediction modes need to be used in GPM. In this case, a smaller range of intra prediction modes may be provided for GPM to select from, thus saving overhead of a flag indicating which intra prediction mode is selected.

In some embodiments, in GPM, one prediction value is derived from intra prediction, and another prediction value is derived from inter prediction. Assume the intra prediction mode used in the disclosure is determined according to the weight derivation mode by default. For example, if the boundary line of the weight derivation mode is in the horizontal direction, such as modes with indexes 18, 19, 50, and 51 of GPM as illustrated in FIG. 4, the intra prediction mode is determined to be the horizontal mode 18. For another example, if the boundary line of the weight derivation mode is in the vertical direction, such as modes with indexes 0, 1, 36, and 37 of GPM as illustrated in FIG. 4, the intra prediction mode is determined to be the vertical mode 50.

In other words, in the disclosure, before determining at least one of the first prediction mode and the second prediction mode according to the weight derivation mode, a first prediction needs to be determined, that is, in the disclosure, before determining the at least one of the K prediction modes according to the weight derivation mode, types of the K prediction modes need to be determined. The prediction mode can be determined according to the weight derivation mode only if the prediction mode is an intra prediction mode.

Based on the above, before determining the at least one of the K prediction modes according to the weight derivation mode, the method in the embodiment of the disclosure further includes the following.

Step 21-0, a type flag is obtained, where the type flag indicates whether the K prediction modes each are an intra prediction mode.

Step 21-1, types of the K prediction modes are determined according to the type flag.

Hereinafter, K=2 is taken as an example.

Exemplarily, if the value of the type flag is a second value, it indicates that the first prediction mode is an intra prediction mode and the second prediction mode is an inter prediction mode, and in this case, mode0IsInter=0 and mode1IsInter=1.

Exemplarily, if the value of the type flag is a third value, it indicates that the first prediction mode is an inter prediction mode and the second prediction mode is an intra prediction mode, and in this case, mode0IsInter=1 and mode1IsInter=0.

Exemplarily, if the value of the type flag is a fourth value, it indicates that the first prediction mode and the second prediction mode are intra prediction modes, and in this case, mode0IsInter=0 and mode1IsInter=0.

The value of each of the first value, the second value, the third value, and the fourth value is not limited in the disclosure.

Optionally, the first value is 0.
Optionally, the second value is 1.
Optionally, the third value is 2.
Optionally, the fourth value is 3.

In an example, the type flag may be represented by the field "intra_mode_idx".

In the disclosure, at the encoding end, after determining the type of the first prediction mode and the type of the second prediction mode according to the type flag, the type flag needs to be signalled the bitstream during encoding, so as to determine the type of the first prediction mode and the type of the second prediction mode according to the type flag.

In the disclosure, at the encoding end, after determining the type of the first prediction mode and the type of the second prediction mode according to the type flag, if at least one of the first prediction mode and the second prediction mode is an intra prediction mode, the at least one of the first prediction mode and the second prediction mode is determined according to the weight derivation mode.

That is, in the disclosure, an intra prediction mode is determined according to the weight derivation mode. For example, if the first prediction mode and the second prediction mode are intra prediction modes, the first prediction mode and the second prediction mode are determined according to the weight derivation mode. For another example, if one of the first prediction mode and the second prediction mode is an intra prediction mode, the intra prediction mode is determined from the first prediction mode and the second prediction mode according to the weight derivation mode.

In the disclosure, the manner for determining the at least one of the K prediction modes according to the weight derivation mode includes, but is not limited to, the following manners.

Manner I: If the at least one of the K prediction modes is an intra prediction mode, an angle index is determined according to the weight derivation mode, and an intra prediction mode corresponding to the angle index is determined as one of the K prediction modes.

The angle index indicates an angle index of a boundary line of weights.

In some embodiments, the angle index is represented by the field "angleIdx".

Table 2 above shows a correspondence between merge_gpm_partition_idx and angleIdx. With reference to Table 2, the angle index may be derived according to the weight derivation mode.

In the disclosure, there is a correspondence between angle indices and intra prediction modes, that is, different angle indices correspond to different intra prediction modes.

Exemplarily, the correspondence between angle indices and intra prediction modes is that as illustrated in the foregoing Table 6.

In manner I, taking K=2 as an example, if the first prediction mode or the second prediction mode is an intra prediction mode, the angle index is determined according to the weight derivation mode, for example, the angle index corresponding to the weight derivation mode is derived according to Table 2. Then, the intra prediction mode corresponding to the angle index is determined according to Table 6 above, for example, the angle index is 2, and the intra prediction mode corresponding to the angle index is 42, and then the intra prediction mode 42 is determined as the first prediction mode or the second prediction mode.

Manner II: If the at least one of the K prediction modes is an intra prediction mode, an intra prediction mode corresponding to the weight derivation mode is determined, and the at least one of the K prediction modes is determined from the intra prediction mode corresponding to the weight derivation mode.

In manner II, taking K=2 as an example, if the first prediction mode and/or the second prediction mode is an intra prediction mode, the first prediction mode and/or second prediction mode is determined from the intra prediction mode corresponding to the weight derivation mode. For example, the first second prediction mode and/or the second prediction mode may be an intra prediction mode that is on or near the same line as a weight partition line (also known as the boundary line). Alternatively, the first prediction mode and/or second prediction mode may be an intra prediction mode that is perpendicular or near perpendicular to the weight partition line. For example, if the weight boundary line is horizontal, such as mode 18, 19, 50, or 51 in GPM in FIG. 4, the first prediction mode and/or second prediction mode may be horizontal mode 18 and vertical mode 50.

As can be seen from the above, there are many types of intra prediction modes corresponding to the weight derivation mode, including an intra prediction mode parallel to the boundary line of weights, an intra prediction mode perpendicular to the boundary line, and the like. In the disclosure, a flag(s) may be used to indicate which mode in the intra prediction modes corresponding to the weight derivation mode is selected as an intra prediction mode in the K prediction modes.

Exemplarily, taking K=2 as an example, if the first prediction mode is an intra prediction mode, a second flag is used to indicate a correspondence between the first prediction mode and the intra prediction modes corresponding to the weight derivation mode. For example, the second flag indicates that the first prediction mode is the intra prediction mode parallel to the boundary line of weights, or indicates that the first prediction mode is the intra prediction mode perpendicular to the boundary line of weights.

Exemplarily, if the second prediction mode is an intra prediction mode, a third flag is used to indicate a correspondence between the second prediction mode and the intra prediction modes corresponding to the weight derivation mode. For example, the third flag indicates that the second prediction mode is the intra prediction mode parallel to the boundary line of weights, or indicates that the second prediction mode is the intra prediction mode perpendicular to the boundary line of weights.

Based on this, in manner II, the manner for determining the first prediction mode and/or the second prediction mode according to the intra prediction mode corresponding to the weight derivation mode includes, but is not limited to, the following examples.

Example 1, if the first prediction mode is an intra prediction mode, the second flag is obtained, and an intra prediction mode corresponding to the second flag in the intra prediction modes corresponding to the weight derivation mode is determined as the first prediction mode.

Example 2, if the second prediction mode is an intra prediction mode, the third flag is obtained, and an intra prediction mode corresponding to the third flag in the intra prediction modes corresponding to the weight derivation mode is determined as the second prediction mode.

In some embodiments, the intra prediction mode corresponding to the weight derivation mode includes at least one of the intra prediction mode parallel to the boundary line of weights or the intra prediction mode perpendicular to the boundary line.

Optionally, if the second flag has a fifth value, such as 0, it indicates that the first prediction mode is the intra prediction mode parallel to the boundary line of weights in the intra prediction modes corresponding to the weight derivation mode. If the second flag has a sixth value, such as 1, it indicates that the first prediction mode is the intra prediction mode perpendicular to the boundary line of weights in the intra prediction modes corresponding to the weight derivation mode.

Optionally, if the third flag has the fifth value, such as 0, it indicates that the second prediction mode is the intra prediction mode parallel to the boundary line of weights in the intra prediction modes corresponding to the weight derivation mode. If the third flag has the sixth value, such as 1, it indicates that the second prediction mode is the intra prediction mode perpendicular to the boundary line of weights in the intra prediction modes corresponding to the weight derivation mode.

In some embodiments, the intra prediction mode corresponding to the weight derivation mode includes at least one of: the intra prediction mode parallel to the boundary line of weights, the intra prediction mode perpendicular to the boundary line, or a planar mode.

Optionally, if the second flag has the fifth value, such as 0, it indicates that the first prediction mode is the intra prediction mode parallel to the boundary line of weights in the intra prediction modes corresponding to the weight derivation mode. If the second flag has the sixth value, such as 1, it indicates that the first prediction mode is the intra prediction mode perpendicular to the boundary line of weights in the intra prediction modes corresponding to the weight derivation mode. If the second flag has a seventh value, such as 2, it indicates that the first prediction mode is the planar mode.

Optionally, if the third flag has the fifth value, such as 0, it indicates that the second prediction mode is the intra prediction mode parallel to the boundary line of weights in the intra prediction modes corresponding to the weight derivation mode. If the third flag has the sixth value, such as 1, it indicates that the second prediction mode is the intra prediction mode perpendicular to the boundary line of weights in the intra prediction modes corresponding to the weight derivation mode. If the third flag has the seventh value, such as 2, it indicates that the second prediction mode is the planar mode.

In an example, the field "intra_gpm_idx0" is used to represent the second flag.

In an example, the field "intra_gpm_idx1" is used to represent the third flag.

In the disclosure, if the first prediction mode is an intra prediction mode, the first prediction mode is determined according to the second flag as described above. If the second prediction mode is an intra prediction mode, the second prediction mode is determined according to the third flag as described above.

Exemplarily, the second flag (intra_gpm_idx0) and/or the third flag (intra_gpm_idx1) may be signalled into the bitstream in the manner illustrated in Table 7 above.

At the encoding end, the second flag and/or the third flag is signalled into the bitstream in the manner illustrated in Table 7 above. At the decoding end, the bitstream is decoded to obtain the second flag and/or the third flag, the first prediction mode is determined according to the second flag and/or the second prediction mode is determined according to the third flag, and then a prediction value is determined according to the first prediction mode, the second prediction mode, and weights.

In some embodiments, if the first prediction mode and the second prediction mode each are an intra prediction mode, the second flag and the third flag have different values. To ensure that the value of the second flag is different from the value of the third flag, a feasible way is to set the value of the second flag (intra_gpm_idx1) to be 0 or 1, and if intra_gpm_idx1 is greater than intra_gpm_idx0, intra_gpm_idx1 is incremented by 1.

With reference to the foregoing method, the at least one of K prediction modes is determined according to the weight derivation mode, the K prediction values are determined according to the K prediction modes, and a new prediction value is obtained according to the K prediction values and the weights of the prediction values.

In the prediction method provided in the embodiment of the disclosure, at the encoding end, the weight derivation mode for the current block is determined, the template weight is determined according to the weight derivation mode, the at least one of K prediction modes for the current block is determined according to the template weight, and the prediction value is determined according to the K prediction modes and the weight derivation mode. That is, in the disclosure, a template is simulately partitioned according to the weight. Template partitioning may differ under different block shapes, but in the method of the disclosure, there is no need to set various rules for blocks of various shapes, thereby improving accuracy and convenience of template partitioning. Since a prediction mode is derived based on a template partitioned accurately, it is possible to ensure accuracy of the prediction mode derived, thereby improving encoding effect.

It should be understood that, FIG. 14 to FIG. 19 are merely examples of the disclosure, and should not be construed as limitations on the disclosure.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all fall within the protection scope of the disclosure. For example, various technical features described in the foregoing implementations may be combined in any suitable manner without contradiction, and in order to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It should also be understood that, in various method embodiments of the disclosure, the magnitude of a sequence number of each of the foregoing processes does not mean an execution order, and an execution order of each process should be determined according to a function and an internal logic of the process, which shall not constitute any limitation on an implementation process of embodiments of the disclosure. In addition, the term "and/or" herein only describes an association between associated objects, which means that there can be three relationships. Specifically, A and/or B can mean A alone, both A and B exist, and B alone. Besides, the character "/" herein generally indicates that the associated objects are in an "or" relationship.

The method embodiments of the disclosure are described in detail above with reference to FIG. 14 to FIG. 19, and the apparatus embodiments of the disclosure are described in detail below with reference to FIG. 20 to FIG. 22.

Figures 20, 21:
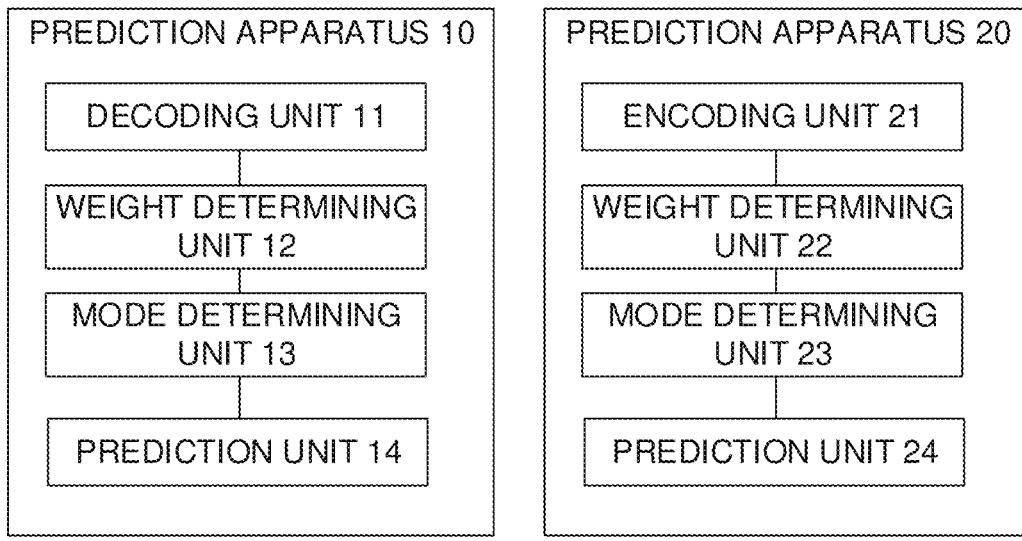
FIG. 20 is a schematic block diagram of a prediction apparatus provided in an embodiment of the disclosure.
FIG. 21 is a schematic block diagram of a prediction apparatus provided in an embodiment of the disclosure.

FIG. 20 is a schematic block diagram of a prediction apparatus provided in an embodiment of the disclosure. The prediction apparatus 10 is applied to the foregoing video decoder.

As illustrated in FIG. 20, the prediction apparatus 10 includes a decoding unit 11, a weight determining unit 12, a mode determining unit 13, and a prediction unit 14. The decoding unit 11 is configured to decode a bitstream to determine a weight derivation mode for a current block. The weight determining unit 12 is configured to determine a template weight according to the weight derivation mode. The mode determining unit 13 is configured to determine at least one of K prediction modes for the current block according to the template weight, where K is a positive integer and K>1. The prediction unit 14 is configured to determine a prediction value according to the K prediction modes and the weight derivation mode.

In some embodiments, the weight determining unit 12 is specifically configured to: determine an angle index and a distance index according to the weight derivation mode, and determine the template weight according to the angle index, the distance index, and a size of the template.

In some embodiments, the weight determining unit 12 is specifically configured to: determine a first parameter of a sample in the template according to the angle index, the distance index, and the size of the template, where the first parameter is used for determining a weight; determine a weight of the sample in the template according to the first parameter of the sample in the template; and determine the template weight according to the weight of the sample in the template.

In some embodiments, the weight determining unit 12 is specifically configured to: determine a second parameter of the sample in the template according to the first parameter of the sample in the template, where the second parameter is used for determining a weight; and determine the weight of the sample in the template according to the second parameter of the sample in the template.

In some embodiments, the weight determining unit 12 is specifically configured to determine the weight of the sample in the template according to the first parameter of the sample in the template, a first preset value, and a second preset value.

Optionally, the weight of the sample in the template is the first preset value or the second preset value.

Optionally, the first preset value is 1, and/or the second preset value is 0.

In some embodiments, the prediction unit 14 is specifically configured to: determine K prediction values according to the K prediction modes, determine weights of the K prediction values according to the weight derivation mode, and determine the prediction values according to the K prediction modes and the weights of the K prediction values.

In some embodiments, the weight determining unit 12 is specifically configured to: determine a weight of a sample in a merge region consisting of the current block and the template, according to the angle index, the distance index, the size of the template, and a size of the current block, and determine the template weight according to the size of the template and the weight of the sample in the merge region.

In some embodiments, the weight determining unit 12 is specifically configured to: determine a first parameter of the sample in the merge region according to the angle index, the distance index, and a size of the merge region, and determine the weight of the sample in the merge region according to the first parameter of the sample in the merge region.

In some embodiments, the weight determining unit 12 is specifically configured to: determine a second parameter of the sample in the merge region according to the first parameter of the sample in the merge region, and determine the weight of the sample in the merge region according to the second parameter of the sample in the merge region.

In some embodiments, the weight determining unit 12 is specifically configured to determine the weight of the sample in the merge region according to the first parameter of the sample in the merge region, a first preset value, and a second preset value.

Optionally, the weight of the sample in the merge region is the first preset value or the second preset value.

In some embodiments, the prediction unit 14 is specifically configured to: determine K prediction values according to the K prediction modes, determine weights of the K prediction values according to the weight of the sample in the merge region, and determine the prediction values according to the K prediction values and the weights of the K prediction values.

In some embodiments, the weight determining unit 12 is specifically configured to determine the weights of the prediction values according to weights corresponding to a sample in the current block in the merge region.

In some embodiments, a $j^{th}$ prediction mode in the K prediction modes is determined through template matching, and the mode determining unit 13 is specifically configured to: obtain at least one candidate prediction mode; obtain a prediction value of the template by predicting the template with the candidate prediction mode; determine a cost of the candidate prediction mode according to the prediction value of the template, a reconstructed value of the template, and the template weight; and determine the $j^{th}$ prediction mode according to the cost of the at least one candidate prediction mode, where j is a positive integer and j≤K.

In some embodiments, the mode determining unit 13 is specifically configured to: determine a template weight corresponding to the $j^{th}$ prediction mode according to the template weight, and determine the cost of the candidate prediction mode according to the prediction value of the template, the reconstructed value of the template, and the template weight corresponding to the $j^{th}$ prediction mode.

In some embodiments, the mode determining unit 13 is specifically configured to: for an $i^{th}$ sample in the template, determine a first loss between an $i^{th}$ prediction value corresponding to the $i^{th}$ sample in the prediction value of the template and an $i^{th}$ reconstructed value corresponding to the $i^{th}$ sample in the reconstructed value of the template, where i is a positive integer; determine a cost of the candidate prediction mode at the $i^{th}$ sample according to the first loss at the $i^{th}$ sample and a weight of the $i^{th}$ sample in the template weight corresponding to the $j^{th}$ prediction mode; and determine the cost of the candidate prediction mode according to costs of the candidate prediction mode at samples in the template.

In some embodiments, the mode determining unit 13 is specifically configured to: determine a sum of the costs of the candidate prediction mode at the samples in the template as the cost of the candidate prediction mode.

In some embodiments, the mode determining unit 13 is specifically configured to: determine a candidate prediction mode with the minimum cost among the at least one candidate prediction mode as the $j^{th}$ prediction mode.

In some embodiments, the mode determining unit 13 is specifically configured to: select one or more candidate prediction modes from the at least one candidate prediction mode according to the cost of the candidate prediction mode; and determine the $j^{th}$ prediction mode from the one or more candidate prediction modes.

In some embodiments, the mode determining unit 13 is specifically configured to: select one candidate prediction mode from the one or more candidate prediction modes as the $j^{th}$ prediction mode.

In some embodiments, the mode determining unit 13 is specifically configured to: obtain an alternative prediction mode for the current block; determine a cost for predicting the template with the alternative prediction mode; and select, according to the cost, one prediction mode from the alternative prediction mode and the one or more candidate prediction modes as the $j^{th}$ prediction mode.

Optionally, the candidate prediction mode for the current block includes one or more of a prediction mode for a reconstructed coding block neighbouring the current block and/or a preset prediction mode.

In some embodiments, the at least one of the K prediction modes is an intra prediction mode, an inter prediction mode, IBC, or palette.

In some embodiments, the mode determining unit 13 is further configured to: determining the at least one of the K prediction modes for the current block according to the template weight, if the number of samples with a weight greater than a first threshold in the template is greater than or equal to a preset threshold.

In some embodiments, the mode determining unit 13 is further configured to: determine the at least one of the K prediction modes for the current block according to the weight derivation mode, if the number of samples with a weight greater than the first threshold in the template is less than the preset threshold.

In some embodiments, the decoding unit 11 is further configured to decode the bitstream to obtain a first flag, where the first flag indicates whether to use template matching to derive a prediction mode. The weight determining unit 12 is specifically configured to determine the template weight according to the weight derivation mode if the first flag indicates to use template matching to derive the prediction mode.

In some embodiments, the mode determining unit 13 is further configured to determine the at least one of the K prediction modes for the current block according to the weight derivation mode, if the first flag indicates not to use template matching to derive the prediction mode.

In some embodiments, the at least one of the K prediction modes is an intra prediction mode, the mode determining unit 13 is further configured to: determine an angle index according to the weight derivation mode, and determine an intra prediction mode corresponding to the angle index as one of the K prediction modes.

In some embodiments, the at least one of the K prediction modes is an intra prediction mode, and the mode determining unit 13 is further configured to determine an intra prediction mode corresponding to the weight derivation mode, and determine the at least one of the K prediction modes according to the intra prediction mode corresponding to the weight derivation mode.

In some embodiments, the intra prediction mode corresponding to the weight derivation mode includes at least one of: an intra prediction mode parallel to a boundary line of weights, an intra prediction mode perpendicular to the boundary line, or a planar mode.

In some embodiments, a $j^{th}$ prediction mode in the K prediction modes is an inter prediction mode, and the prediction unit 14 is specifically configured to: determine motion information according to the $j^{th}$ prediction mode; determine a $j^{th}$ prediction value according to the motion information; determine (K-1) prediction values according to prediction modes other than the $j^{th}$ prediction mode in the K prediction modes; determine weights of the K prediction values according to the weight derivation mode; and determine the prediction value according to the $j^{th}$ prediction value, the (K-1) prediction values, and the weights of the K prediction values.

In some embodiments, the template includes at least one of a top decoded region, a left decoded region, or a top-left decoded region of the current block.

Optionally, a width of the top decoded region is the same as a width of the current block, a height of the left decoded region is the same as a height of the current block, a width of the top-left decoded region is the same as a width of the left decoded region, and a height of the top-left decoded region is the same as a height of the top decoded region.

It should be understood that, the apparatus embodiments and the method embodiments may correspond to each other, and for similar elaborations, reference can be made to the method embodiments, which will not be elaborated again herein to avoid redundancy. Specifically, the apparatus 10 illustrated in FIG. 20 may perform the prediction method at the decoding end in the embodiment of the disclosure, and the foregoing and other operations and/or functions of various units in the apparatus 10 are respectively intended to implement corresponding processes in the foregoing methods such as the prediction method at the decoding end, which are not described again herein for brevity.

FIG. 21 is a schematic block diagram of a prediction apparatus provided in an embodiment of the disclosure. The prediction apparatus is applied to the foregoing encoder.

As illustrated in FIG. 21, the prediction apparatus 20 may include an encoding unit 21, a weight determining unit 22, a mode determining unit 23, and a prediction unit 24. The encoding unit 21 is configured to determine a weight derivation mode for a current block. The weight determining unit 22 is configured to determine a template weight according to the weight derivation mode. The mode determining unit 23 is configured to determine at least one of K prediction modes for the current block according to the template weight, where K is a positive integer and K>1. The prediction unit 24 is configured to determine a prediction value according to the K prediction modes and the weight derivation mode.

In some embodiments, the weight determining unit 22 is specifically configured to: determine an angle index and a distance index according to the weight derivation mode, and determine the template weight according to the angle index, the distance index, and a size of the template.

In some embodiments, the weight determining unit 22 is specifically configured to: determine a first parameter of a sample in the template according to the angle index, the distance index, and the size of the template, where the first parameter is used for determining a weight; determine a weight of the sample in the template according to the first parameter of the sample in the template; and determine the template weight according to the weight of the sample in the template.

In some embodiments, the weight determining unit 22 is specifically configured to: determine the second parameter of the sample in the template according to the first parameter of the sample in the template, and determine the weight of the sample in the template according to the second parameter of the sample in the template.

In some embodiments, the weight determining unit 22 is specifically configured to: determine the weight of the sample in the template according to the first parameter of the sample in the template, a first preset value, and a second preset value.

Optionally, the weight of the sample in the template is the first preset value or the second preset value.

In some embodiments, the weight determining unit 22 is further configured to determine weights of prediction values according to the weight derivation mode. The prediction unit 24 is configured to determine the prediction value according to the K prediction modes and the weights of the prediction values.

In some embodiments, the weight determining unit 22 is specifically configured to determine a weight of a sample in a merge region consisting of the current block and the template according to the angle index, the distance index, the size of the template, and a size of the current block; and determine the template weight according to the size of the template and the weight of the sample in the merge region.

In some embodiments, the weight determining unit 22 is specifically configured to determine a first parameter of the sample in the merge region according to the angle index, the distance index, and a size of the merge region, where the first parameter is used for determining a weight; and determine the weight of the sample in the merge region according to the first parameter of the sample in the merge region.

In some embodiments, the weight determining unit 22 is specifically configured to: determine a second parameter of the sample in the merge region according to the first parameter of the sample in the merge region, where the second parameter is used for determining a weight; and determine the weight of the sample in the merge region according to the second parameter of the sample in the merge region.

In some embodiments, the weight determining unit 22 is specifically configured to: determine the weight of the sample in the merge region according to the first parameter of the sample in the merge region, a first preset value, and a second preset value.

Optionally, the weight of the sample in the merge region is the first preset value or the second preset value.

In some embodiments, the weight determining unit 22 is further configured to determine weights of prediction values according to the weight of the sample in the merge region. The prediction unit 24 is configured to determine the prediction value according to the K prediction modes and the weights of the prediction values.

In some embodiments, the weight determining unit 22 is specifically configured to determine the weights of the prediction values according to weights corresponding to a sample in the current block in the merge region.

In some embodiments, a $j^{th}$ prediction mode is determined through template matching, and the mode determining unit 23 is specifically configured to: obtain at least one candidate prediction mode; obtain a prediction value of the template by predicting the template with the candidate prediction mode; determine a cost of the candidate prediction mode according to the prediction value of the template, a reconstructed value of the template, and the template weight; and determine the $j^{th}$ prediction mode according to the cost of the at least one candidate prediction mode.

In some embodiments, the mode determining unit 23 is specifically configured to: determine a template weight corresponding to the $j^{th}$ prediction mode according to the template weight; and determine the cost of the candidate prediction mode according to the prediction value of the template, the reconstructed value of the template, and the template weight corresponding to the $j^{th}$ prediction mode.

In some embodiments, the mode determining unit 23 is specifically configured to: for an $i^{th}$ sample in the template, determine a first loss between an $i^{th}$ prediction value corresponding to the $i^{th}$ sample in the prediction value of the template and an $i^{th}$ reconstructed value corresponding to the $i^{th}$ sample in the reconstructed value of the template; determine a cost of the candidate prediction mode at the $i^{th}$ sample according to the first loss at the $i^{th}$ sample and a weight of the $i^{th}$ sample in the template weight corresponding to the $j^{th}$ prediction mode; and determine the cost of the candidate prediction mode according to costs of the candidate prediction mode at samples in the template.

In some embodiments, the mode determining unit 23 is specifically configured to determine a sum of the costs of the candidate prediction mode at the samples in the template as the cost of the candidate prediction mode.

In some embodiments, the mode determining unit 23 is specifically configured to determine a candidate prediction mode with the minimum cost among the at least one candidate prediction mode as the $j^{th}$ prediction mode.

In some embodiments, the mode determining unit 23 is specifically configured to: select one or more candidate prediction modes from the at least one candidate prediction mode according to the cost of the candidate prediction mode; and determine the $j^{th}$ prediction mode according to the one or more candidate prediction modes.

In some embodiments, the mode determining unit 23 is specifically configured to select one candidate prediction mode from the one or more candidate prediction modes as the $j^{th}$ prediction mode.

In some embodiments, the mode determining unit 23 is specifically configured to obtain an alternative prediction mode for the current block; determine a cost for predicting the template with the alternative prediction mode; and select, according to the cost, one prediction mode from the alternative prediction mode and the one or more candidate prediction modes as the $j^{th}$ prediction mode.

Optionally, the candidate prediction mode for the current block includes one or more of a prediction mode for a reconstructed coding block neighbouring the current block and/or a preset prediction mode.

In some embodiments, the at least one of the K prediction mode is an intra prediction mode, an inter prediction mode, IBC, or palette.

In some embodiments, the mode determining unit 23 is specifically configured to: determine the at least one of the K prediction modes for the current block according to the template weight, if the number of samples with a weight greater than a first threshold in the template is greater than or equal to a preset threshold.

In some embodiments, the mode determining unit 23 is further configured to: determine the at least one of the K prediction modes for the current block according to the weight derivation mode, when the number of samples with a weight greater than the first threshold in the template is less than the preset threshold.

In some embodiments, the mode determining unit 23 is further configured to signal a first flag into a bitstream, where the first flag indicates whether to use template matching to derive a prediction mode.

In some embodiments, the at least one of the K prediction modes is an intra prediction mode, and the mode determining unit 23 is specifically configured to: determine an angle index according to the weight derivation mode; and determine an intra prediction mode corresponding to the angle index as one of the K prediction modes.

In some embodiments, the at least one of the K prediction modes is an intra prediction mode, and the mode determining unit 23 is specifically configured to: determine an intra prediction mode corresponding to the weight derivation mode; and determine the at least one of the K prediction modes according to the intra prediction mode corresponding to the weight derivation mode.

In some embodiments, the intra prediction mode corresponding to the weight derivation mode includes at least one of: an intra prediction mode parallel to a boundary line of weights, an intra prediction mode perpendicular to the boundary line, or a planar mode.

In some embodiments, a $j^{th}$ prediction mode in the K prediction modes is an inter prediction mode, and the prediction unit 24 is specifically configured to: determine motion information according to the $j^{th}$ prediction mode; determine a $j^{th}$ prediction value according to the motion information; determine (K−1) prediction values according to prediction modes other than the $j^{th}$ prediction mode in the K prediction modes; determine weights of the K prediction values according to the weight derivation mode; and determine the prediction value according to the $j^{th}$ prediction value, the (K−1) prediction values, and the weights of the K prediction values.

In some embodiments, the template includes at least one of a top encoded region, a left encoded region, or a top-left encoded region of the current block.

Optionally, a width of the top encoded region is the same as a width of the current block, a height of the left encoded region is the same as a height of the current block, a width of the top-left encoded region is the same as a width of the left encoded region, and a height of the top-left encoded region is the same as a height of the top encoded region.

It should be understood that, the apparatus embodiments and the method embodiments may correspond to each other, and for similar elaborations, reference can be made to the method embodiments, which will not be described again herein to avoid redundancy. Specifically, the apparatus 20 illustrated in FIG. 21 may correspond to a corresponding entity for performing the prediction method at the encoding end according to the embodiment of the disclosure, and the foregoing and other operations and/or functions of various units in the apparatus 20 are respectively intended to implement corresponding processes of various methods such as the prediction method at the encoding end, which will not be repeated herein for brevity.

The apparatus and system of embodiments of the disclosure are described above from the perspective of functional units with reference to the accompanying drawings. It should be understood that, the functional unit may be implemented in the form of hardware, or may be implemented by an instruction in the form of software, or may be implemented by a combination of hardware and software unit. Specifically, each step of the method embodiments of the disclosure may be completed by an integrated logic circuit of hardware in a processor and/or an instruction in the form of software. The steps of the method disclosed in embodiments of the disclosure may be directly implemented by a hardware decoding processor, or may be performed by hardware and software units in the decoding processor. Optionally, the software unit may be located in a storage medium such as a random access memory (RAM), a flash memory, a read only memory (ROM), a programmable ROM (PROM), or an electrically erasable programmable memory, registers, and the like. The storage medium is located in a memory. The processor reads the information in the memory, and completes the steps of the foregoing method embodiments with the hardware of the processor.

Figure 22:
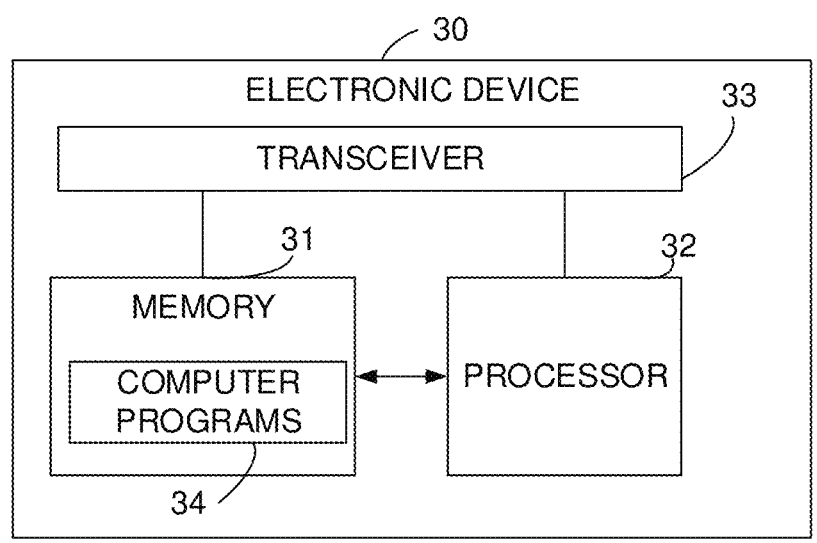
FIG. 22 is a schematic block diagram of an electronic device provided in embodiments of the disclosure.

FIG. 22 is a schematic block diagram of an electronic device provided in embodiments of the disclosure.

As illustrated in FIG. 22, the electronic device 30 may be a video encoder or a video decoder according to embodiments of the disclosure. The electronic device 30 may include a memory 31 and a processor 32. The memory 31 is configured to store computer programs 34 and transmit the program codes 34 to the processor 32. In other words, the processor 32 may call the computer programs 34 from the memory 31 to implement the method in embodiments of the disclosure.

For example, the processor 32 may be configured to perform the steps in the method 200 described above according to instructions in the computer programs 34.

In some embodiments of the disclosure, the processor 32 may include, but is not limited to: a general-purpose processor, a digital signal processor (DSP), an application specific integrated circuit (ASIC), a field programmable gate array (FPGA), or other programmable logic devices, discrete gates or transistor logic devices, discrete hardware components, etc.

In some embodiments of the disclosure, the memory 31 includes, but is not limited to: a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

In some embodiments of the disclosure, the computer program 34 may be divided into one or more units, and the one or more units are stored in the memory 31 and executed by the processor 32 to complete the method provided in the disclosure. The one or more units may be a series of computer program instruction segments capable of performing particular functions, where the instruction segments are used for describing the execution of the computer program 34 in the electronic device 30.

As illustrated in FIG. 22, the electronic device 30 may further include a transceiver 33. The transceiver 33 may be connected to the processor 32 or the memory 31.

The processor 32 can control the transceiver 33 to communicate with other devices, and specifically, can send information or data to other devices, or receive information or data sent by other devices. The transceiver 33 may further include an antenna, where one or more antennas may be provided.

It should be understood that, various components in the electronic device 30 are connected via a bus system. In addition to a data bus, the bus system further includes a power bus, a control bus, and a status signal bus.

Figure 23:
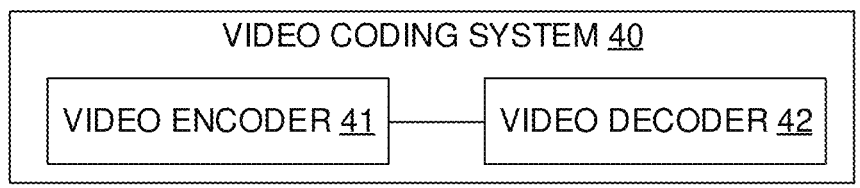
FIG. 23 is a schematic block diagram of a video coding system provided in embodiments of the disclosure.

FIG. 23 is a schematic block diagram of a video coding system provided in embodiments of the disclosure.

As illustrated in FIG. 23, the video coding system 40 may include a video encoder 41 and a video decoder 42. The video encoder 41 is configured to perform the video encoding method in embodiments of the disclosure, and the video decoder 42 is configured to perform the video decoding method in embodiments of the disclosure.

The disclosure further provides a computer storage medium. The computer storage medium is configured to store computer programs. The computer programs, when executed by a computer, are operable with the computer to perform the method in the foregoing method embodiments. Alternatively, embodiments of the disclosure further provide a computer program product. The computer program product includes instructions which, when executed by a computer, are operable with the computer to perform the method in the foregoing method embodiments.

The disclosure further provides a bitstream. The bitstream is generated according to the encoding method. Optionally, the bitstream contains the first flag, or contains the first flag and the second flag.

When implemented by software, all or some the above embodiments can be implemented in the form of a computer program product. The computer program product includes one or more computer instructions. When the computer instructions are applied and executed on a computer, all or some the operations or functions of the embodiments of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disk, a hard disk, or a magnetic tape), an optical medium (such as a digital video disc (DVD)), or a semi-conductor medium (such as a solid state disk (SSD)), etc.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure. For example, various functional units described in various embodiments of the disclosure may be integrated into one processing unit or may be present as a number of physically separated units, and two or more units may be integrated into one.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

I claim:

1. A prediction method, applied to a decoder and comprising:
    decoding a bitstream to determine a weight derivation mode for a current block;
    determining a weight of a template according to the weight derivation mode;
    determining at least one of K prediction modes for the current block according to the weight of the template, wherein K is a positive integer and K>1; and
    determining a prediction value according to the K prediction modes and the weight derivation mode.

2. The method of claim 1, wherein determining the weight of the template according to the weight derivation mode comprises:
    determining an angle index and a distance index according to the weight derivation mode; and
    determining the weight of the template according to the angle index, the distance index, and a size of the template.

3. The method of claim 2, wherein determining the weight of the template according to the angle index, the distance index, and the size of the template comprises:
    determining a first parameter of a sample in the template according to the angle index, the distance index, and the size of the template, wherein the first parameter is used for determining a weight;
    determining a weight of the sample in the template according to the first parameter of the sample in the template; and
    determining the weight of the template according to the weight of the sample in the template.

4. The method of claim 3, wherein determining the weight of the sample in the template according to the first parameter of the sample in the template comprises:
    determining a second parameter of the sample in the template according to the first parameter of the sample in the template, wherein the second parameter is used for determining a weight; and
    determining the weight of the sample in the template according to the second parameter of the sample in the template.

5. The method of claim 3, wherein determining the weight of the sample in the template according to the first parameter of the sample in the template comprises:
    determining the weight of the sample in the template according to the first parameter of the sample in the template, a first preset value, and a second preset value, wherein the weight of the sample in the template is the first preset value or the second preset value, wherein the first preset value is 1, and/or the second preset value is 0.

6. The method of claim 3, wherein determining the prediction value according to the K prediction modes and the weight derivation mode comprises:
    determining K prediction values according to the K prediction modes;
    determining weights of the K prediction values according to the weight derivation mode; and determining the prediction value according to the K prediction modes and the weights of the K prediction values.

7. The method of claim 1, wherein when a $j^{th}$ prediction mode in the K prediction modes is determined through template matching, determining the at least one of the K prediction modes according to the weight of the template comprises:
   obtaining at least one candidate prediction mode;
   obtaining a prediction value of the template by predicting the template with the candidate prediction mode;
   determining a cost of the candidate prediction mode according to the prediction value of the template, a reconstructed value of the template, and the weight of the template; and
   determining the $j^{th}$ prediction mode according to the cost of the at least one candidate prediction mode, wherein j is a positive integer and j≤K.

8. The method of claim 7, wherein determining the cost of the candidate prediction mode according to the prediction value of the template, the reconstructed value of the template, and the weight of the template comprises:
   determining a weight of the template corresponding to the $j^{th}$ prediction mode according to the weight of the template; and
   determining the cost of the candidate prediction mode according to the prediction value of the template, the reconstructed value of the template, and the weight of the template corresponding to the $j^{th}$ prediction mode.

9. The method of claim 8, wherein determining the cost of the candidate prediction mode according to the prediction value of the template, the reconstructed value of the template, and the weight of the template corresponding to the $j^{th}$ prediction mode comprises:
   for an $i^{th}$ sample in the template, determining a first loss between an $i^{th}$ prediction value corresponding to the $i^{th}$ sample in the prediction value of the template and an $i^{th}$ reconstructed value corresponding to the $i^{th}$ sample in the reconstructed value of the template, wherein i is a positive integer;
   determining a cost of the candidate prediction mode at the $i^{th}$ sample according to the first loss at the $i^{th}$ sample and a weight of the $i^{th}$ sample in the weight of the template corresponding to the $j^{th}$ prediction mode; and
   determining the cost of the candidate prediction mode according to costs of the candidate prediction mode at samples in the template.

10. The method of claim 9, wherein determining the cost of the candidate prediction mode according to the costs of the candidate prediction mode at the samples in the template comprises:
    determining a sum of the costs of the candidate prediction mode at the samples in the template as the cost of the candidate prediction mode.

11. The method of claim 1, wherein the at least one of the K prediction modes is an intra prediction mode, an inter prediction mode, intra block copy (IBC), or palette, wherein determining the at least one of the K prediction modes for the current block according to the weight of the template comprises:
    determining the at least one of the K prediction modes for the current block according to the weight of the template, when the number of samples with a weight greater than a first threshold in the template is greater than or equal to a preset threshold.

12. The method of claim 1, wherein when a $j^{th}$ prediction mode in the K prediction modes is an inter prediction mode, determining the prediction value according to the K prediction modes and the weight derivation mode comprises:
    determining motion information according to the $j^{th}$ prediction mode;
    determining a $j^{th}$ prediction value according to the motion information;
    determining (K−1) prediction values according to prediction modes other than the $j^{th}$ prediction mode in the K prediction modes;
    determining weights of the K prediction values according to the weight derivation mode; and
    determining the prediction value according to the $j^{th}$ prediction value, the (K−1) prediction values, and the weights of the K prediction values.

13. A prediction method, applied to an encoder and comprising:
    determining a weight derivation mode for a current block;
    determining a weight of a template according to the weight derivation mode;
    determining at least one of K prediction modes for the current block according to the weight of the template, wherein K is a positive integer and K>1; and
    determining a prediction value according to the K prediction modes and the weight derivation mode.

14. The method of claim 13, wherein when a $j^{th}$ prediction mode in the K prediction modes is determined through template matching, determining the at least one of the K prediction modes according to the weight of the template comprises:
    obtaining at least one candidate prediction mode;
    obtaining a prediction value of the template by predicting the template with the candidate prediction mode;
    determining a cost of the candidate prediction mode according to the prediction value of the template, a reconstructed value of the template, and the weight of the template; and
    determining the $j^{th}$ prediction mode according to the cost of the at least one candidate prediction mode, wherein j is a positive integer and j≤K.

15. The method of claim 14, wherein determining the $j^{th}$ prediction mode according to the cost of the at least one candidate prediction mode comprises:
    determining a candidate prediction mode with the minimum cost among the at least one candidate prediction mode as the $j^{th}$ prediction mode.

16. The method of claim 14, wherein determining the $j^{th}$ prediction mode according to the cost of the at least one candidate prediction mode comprises:
    selecting one or more candidate prediction modes from the at least one candidate prediction mode according to the cost of the candidate prediction mode; and
    determining the $j^{th}$ prediction mode according to the one or more candidate prediction modes.

17. The method of claim 16, wherein determining the $j^{th}$ prediction mode from the one or more candidate prediction modes comprises:
    selecting one candidate prediction mode from the one or more candidate prediction modes as the $j^{th}$ prediction mode.

18. The method of claim 16, wherein determining the $j^{th}$ prediction mode from the one or more candidate prediction modes comprises:
    obtaining an alternative prediction mode for the current block;
    determining a cost for predicting the template with the alternative prediction mode; and selecting, according to the cost, one prediction mode from the alternative prediction mode and the one or more candidate prediction modes as the $j^{th}$ prediction mode.

19. The method of claim 18, wherein the candidate prediction mode for the current block comprises one or more of a prediction mode for a reconstructed coding block neighbouring the current block and/or a preset prediction mode.

20. A method for bitstream transmission, comprising:
obtaining, by a processor, a bitstream; and
transmitting the bitstream;
wherein the bitstream is generated by performing steps of:
determining, by the processor, a weight derivation mode for a current block;
determining, by the processor, a weight of a template according to the weight derivation mode;
determining, by the processor, at least one of K prediction modes for the current block according to the weight of the template, wherein K is a positive integer and K>1; and
determining, by the processor, a prediction value according to the K prediction modes and the weight derivation mode.

\* \* \* \* \*